United States Patent
Zhou et al.

(10) Patent No.: US 10,841,242 B2
(45) Date of Patent: Nov. 17, 2020

(54) SYSTEMS AND METHODS TO SCALE A NETWORK MONITORING FABRIC

(71) Applicant: Big Switch Networks LLC, Santa Clara, CA (US)

(72) Inventors: Shudong Zhou, Fremont, CA (US); Sandip Shah, Milpitas, CA (US); Andrew Shaw, Palo Alto, CA (US); Anurag Chowdhary, Pleasanton, CA (US)

(73) Assignee: Big Switch Networks LLC, Santa Clara, CA (US)

( * ) Notice: Subject to any disclaimer, the term of this patent is extended or adjusted under 35 U.S.C. 154(b) by 0 days.

(21) Appl. No.: 16/282,090

(22) Filed: Feb. 21, 2019

(65) Prior Publication Data

US 2020/0274825 A1    Aug. 27, 2020

(51) Int. Cl.
*H04L 12/933* (2013.01)
*H04L 12/24* (2006.01)
(Continued)

(52) U.S. Cl.
CPC .......... *H04L 49/15* (2013.01); *H04L 41/0806* (2013.01); *H04L 43/08* (2013.01); *H04L 49/25* (2013.01); *H04L 49/70* (2013.01)

(58) Field of Classification Search
CPC ......... H04L 49/15; H04L 49/25; H04L 49/70; H04L 43/08; H04L 41/0806
See application file for complete search history.

(56) References Cited

U.S. PATENT DOCUMENTS 7,310,306 B1 * 12/2007 Cheriton ................ H04L 45/00
                                                       370/218
7,327,688 B2    2/2008 Burwell et al.
(Continued)

FOREIGN PATENT DOCUMENTS

CN        107710684      2/2018
EP         3275126      11/2019
(Continued)

OTHER PUBLICATIONS

"U.S. Appl. No. 15/081,166, Notice of Allowance dated Jan. 10, 2018", 19 pgs.
(Continued)

*Primary Examiner* — Michael C Lai
(74) *Attorney, Agent, or Firm* — Schwegman Lundberg & Woessner, P.A.

(57) ABSTRACT

Systems and methods to scale a network monitoring fabric are described. The system uploads a virtual tool, over a network, to a monitoring fabric. The monitoring fabric includes a first plurality of switches including a second plurality of switches for monitoring a production network. Next, the system configures the monitoring fabric to receive a first portion of traffic information from the production network and communicate the first portion of traffic information to the virtual tool. Next, the system receives a duplicate of the first portion of the traffic information from the production network as first traffic information. The first traffic information is received at a first ingress interface providing access to the monitoring fabric. Finally, the system forwards the first traffic information in the monitoring fabric to the first instance of the first virtual tool.

20 Claims, 42 Drawing Sheets

(51) Int. Cl.
    *H04L 12/26*     (2006.01)
    *H04L 12/947*     (2013.01)
    *H04L 12/931*     (2013.01)

(56) References Cited

U.S. PATENT DOCUMENTS

| | | | |
|---|---|---|---|
| 7,418,492 | B1 | 8/2008 | Cohen et al. |
| 7,729,240 | B1* | 6/2010 | Crane ................ H04L 43/0894 370/229 |
| 7,889,748 | B1* | 2/2011 | Leong ................ H04L 12/4645 370/249 |
| 7,995,580 | B2 | 8/2011 | Patel et al. |
| 8,615,008 | B2 | 12/2013 | Natarajan et al. |
| 8,687,629 | B1 | 4/2014 | Kompella et al. |
| 8,862,706 | B2 | 10/2014 | Wittenschlaeger |
| 10,097,413 | B2* | 10/2018 | Zhou ................ H04L 41/0816 |
| 10,142,263 | B2* | 11/2018 | Raney ................ H04L 43/026 |
| 10,205,648 | B1* | 2/2019 | Guo ................ H04L 43/12 |
| 10,419,327 | B2* | 9/2019 | Izard ................ H04L 43/04 |
| 2005/0108444 | A1 | 5/2005 | Flauaus et al. |
| 2005/0254490 | A1 | 11/2005 | Gallatin et al. |
| 2008/0025322 | A1 | 1/2008 | Tadimeti et al. |
| 2009/0245258 | A1 | 10/2009 | Tanaka et al. |
| 2009/0290501 | A1* | 11/2009 | Levy ................ H04L 49/70 370/250 |
| 2012/0131674 | A1 | 5/2012 | Wittenschlaeger |
| 2012/0320917 | A1 | 12/2012 | Song |
| 2013/0094515 | A1 | 4/2013 | Gura et al. |
| 2013/0159864 | A1* | 6/2013 | Smith ................ H04L 43/50 715/734 |
| 2013/0259037 | A1 | 10/2013 | Natarajan et al. |
| 2014/0029622 | A1* | 1/2014 | Bettink ................ H04L 47/10 370/394 |
| 2014/0355613 | A1 | 12/2014 | Pope et al. |
| 2015/0067125 | A1* | 3/2015 | Madani ................ H04L 41/0853 709/223 |
| 2015/0156098 | A1 | 6/2015 | Richards et al. |
| 2015/0172143 | A1 | 6/2015 | Degioanni et al. |
| 2016/0285685 | A1* | 9/2016 | Zhou ................ H04L 41/0816 |
| 2017/0324632 | A1* | 11/2017 | Arora ................ H04L 63/1441 |
| 2018/0375727 | A1 | 12/2018 | Izard et al. |

FOREIGN PATENT DOCUMENTS

| | | |
|---|---|---|
| WO | 2016160553 | 10/2016 |
| WO | 2020172445 | 8/2020 |

OTHER PUBLICATIONS

"U.S. Appl. No. 15/081,166, Notice of Allowance dated Jun. 4, 2018", 19 pgs.
"European Application Serial No. 16773827.7, Response Filed Apr. 18, 2019 Communication Pursuant to Article 94(3) EPC dated Dec. 12, 2018", 15 pgs.
"European Application Serial No. 16773827.7, Communication Pursuant to Article 94(3) EPC dated Dec. 12, 2018", 7 pgs.
"International Application Serial No. PCT US2016 024178, International Search Report dated Jun. 17, 2016", 3 pgs.
"International Application Serial No. PCT US2016 024178, Written Opinion dated Jun. 17, 2016", 12 pgs.
"International Application Serial No. PCT US2016 024178, International Preliminary Report on Patentability dated Oct. 12, 2017", 13 pgs.
"European Application Serial No. 16773827.7, Extended European Search Report dated Feb. 28, 2018", 11 pgs.
Chao, H J, "PetaStar: A Petabit Photonic Packet Switch", IEEE Journal of Selected Areas in Communications. vol. 21, No. 7., (Sep. 2003), 1096-1112.
"Chinese Application Serial No. 201680029959.5, Office Action dated Mar. 5, 2019", w/ English Translation, 20 pgs.
"Chinese Application Serial No. 201680029959.5, Response Filed Jul. 22, 2019 to Office Action dated Mar. 5, 2019", w/ English Claims, 22 pgs.
"Chinese Application Serial No. 201680029959.5, Office Action dated Oct. 11, 2019", w/ English Translation, 13 pgs.
"Chinese Application Serial No. 201680029959.5, Response filed Dec. 26, 2019 to Office Action dated Oct. 11, 2019", w/o English Claims, 8 pgs.
"U.S. Appl. No. 16/121,247, Non Final Office Action dated Jan. 14, 2020", 12 pgs.
"Chinese Application Serial No. 201680029959.5, Decision of Rejection dated Mar. 4, 2020", w/ English Translation, 12 pgs.
"U.S. Appl. No. 16/121,247, Response filed May 12, 2020 to Non Final Office Action dated Jan. 14, 2020", 8 pgs.
"U.S. Appl. No. 16/121,247, Notice of Allowance dated May 20, 2020", 10 pgs.
"Chinese Application Serial No. 201680029959.5, Decision of Reexamination dated Jul. 15, 2020", 1 pg.
"Chinese Application Serial No. 201680029959.5, Response filed Jun. 19, 2020 to Decision of Rejection dated Mar. 4, 2020", w/o English Claims, 14 pgs.
"International Application Serial No. PCT/US2020/019088, International Search Report dated May 29, 2020", 5 pgs.
"International Application Serial No. PCT/US2020/019088, Written Opinion dated May 29, 2020", 8 pgs.
"U.S. Appl. No. 16/121,247, Non Final Office Action dated", 14 pgs.

* cited by examiner

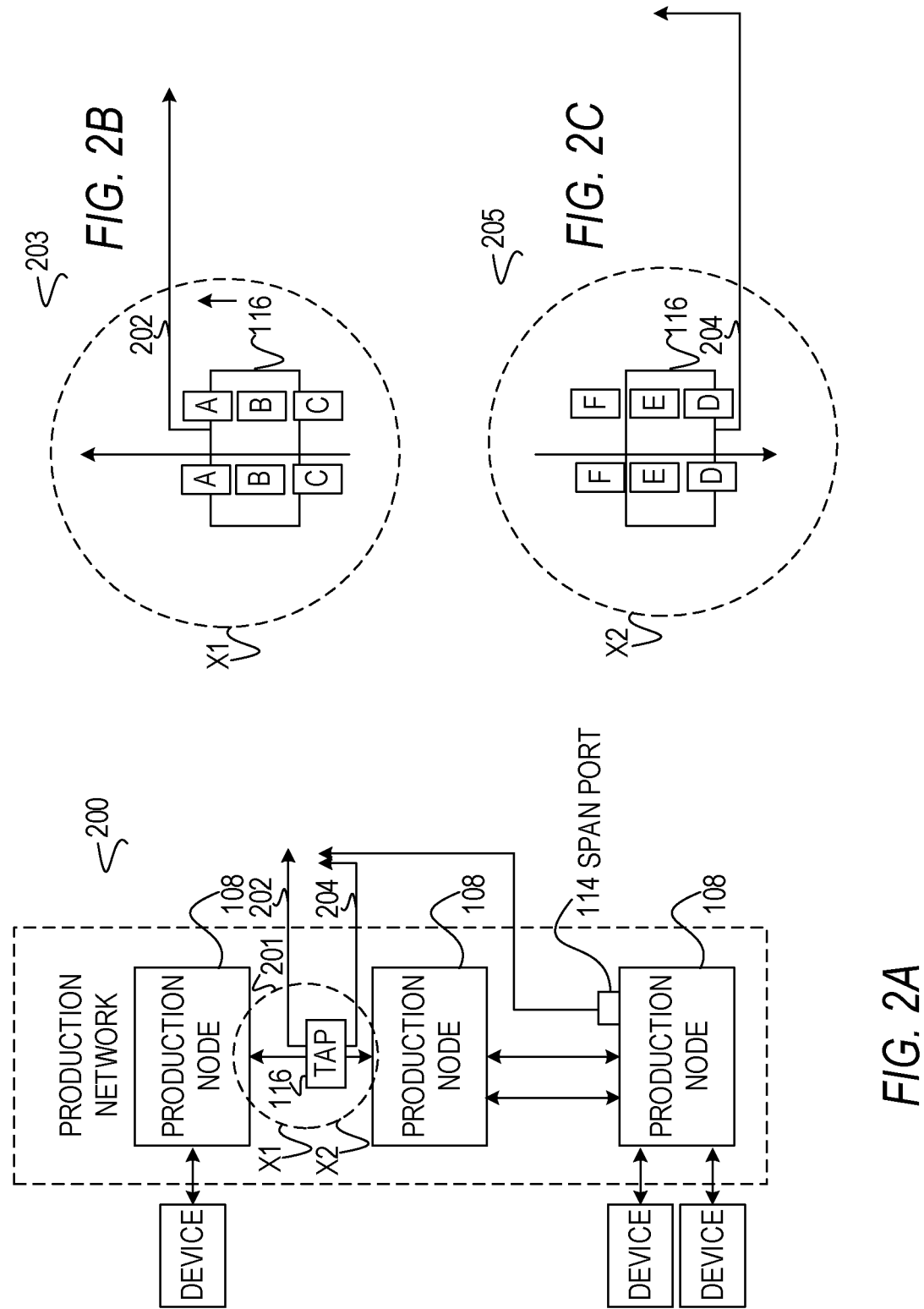

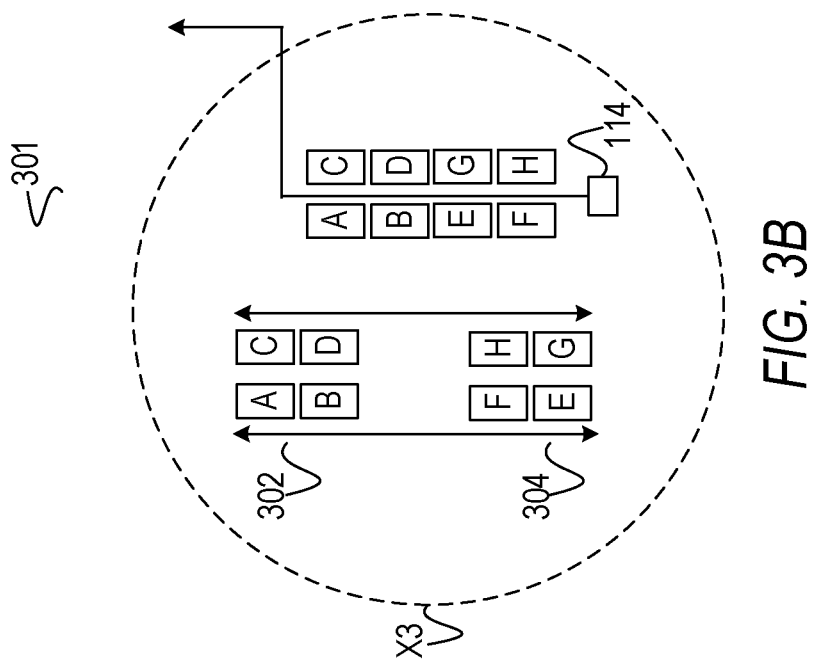
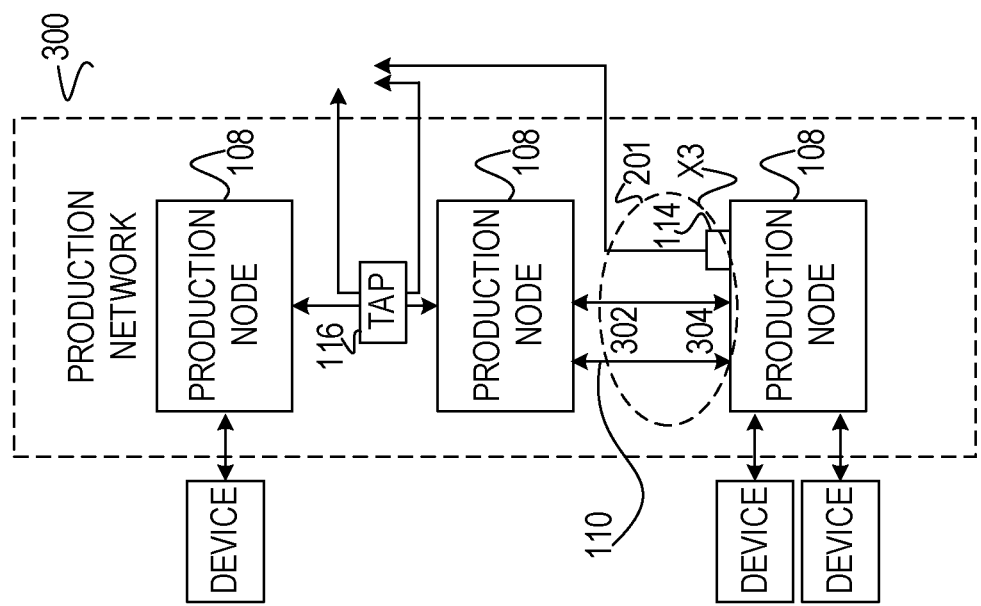
FIG. 3B
FIG. 3A

| COMMAND / PARAMETER(S) | DESCRIPTION |
|---|---|
| 4052 — UPLOAD VT<br>A) NETWORK PATH - FROM<br>B) NETWORK PATH - TO | UPLOAD A VIRTUAL TOOL |
| 4054 — ADD POLICY<br>A) VIRTUAL TOOL IDENTIFIER<br>B) INGRESS INTERFACE IDENTIFIER<br>C) SERVER IDENTIFIER<br>D) NIC IDENTIFIER<br>E) [VIRTUAL SWITCH IDENTIFIER]<br>F) VNIC IDENTIFER<br>G) VM IDENTIFIER<br>H) [EGRESS INTERFACE IDENTIFIER] | ADD A VIRTUAL TOOL & MONITOR TRAFFIC INFORMATION |
| 4056 — DELETE POLICY<br>A) SERVER IDENTIFIER<br>B) VIRTUAL MACHINE IDENTIFIER | DELETE POLICY |
| 4068 — DISPLAY TRAFFIC<br>A) SERVER IDENTIFIER<br>B) VIRTUAL MACHINE IDENTIFIER | DISPLAY VIRTUAL TOOL TRAFFIC |

*FIG. 5C*

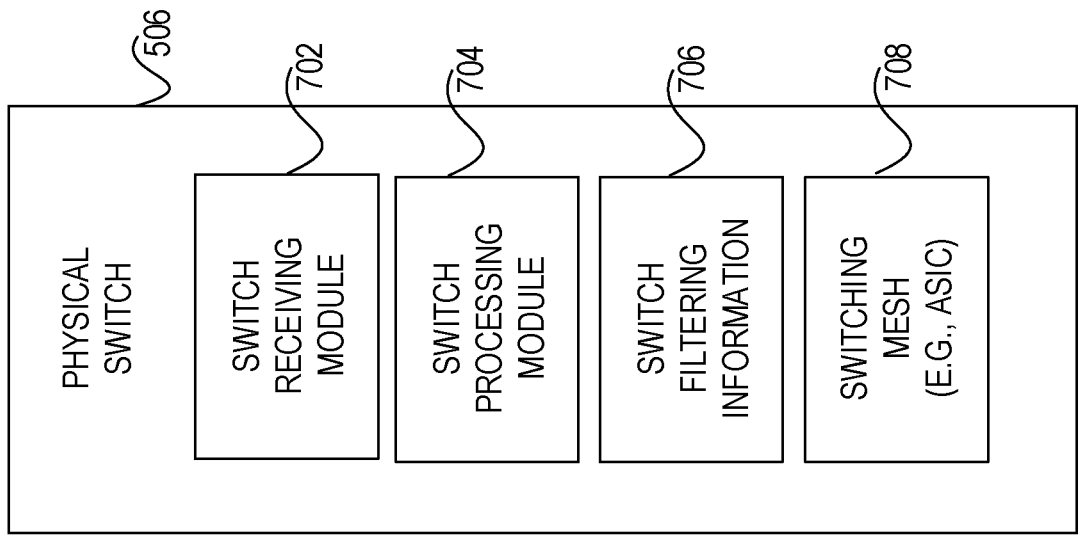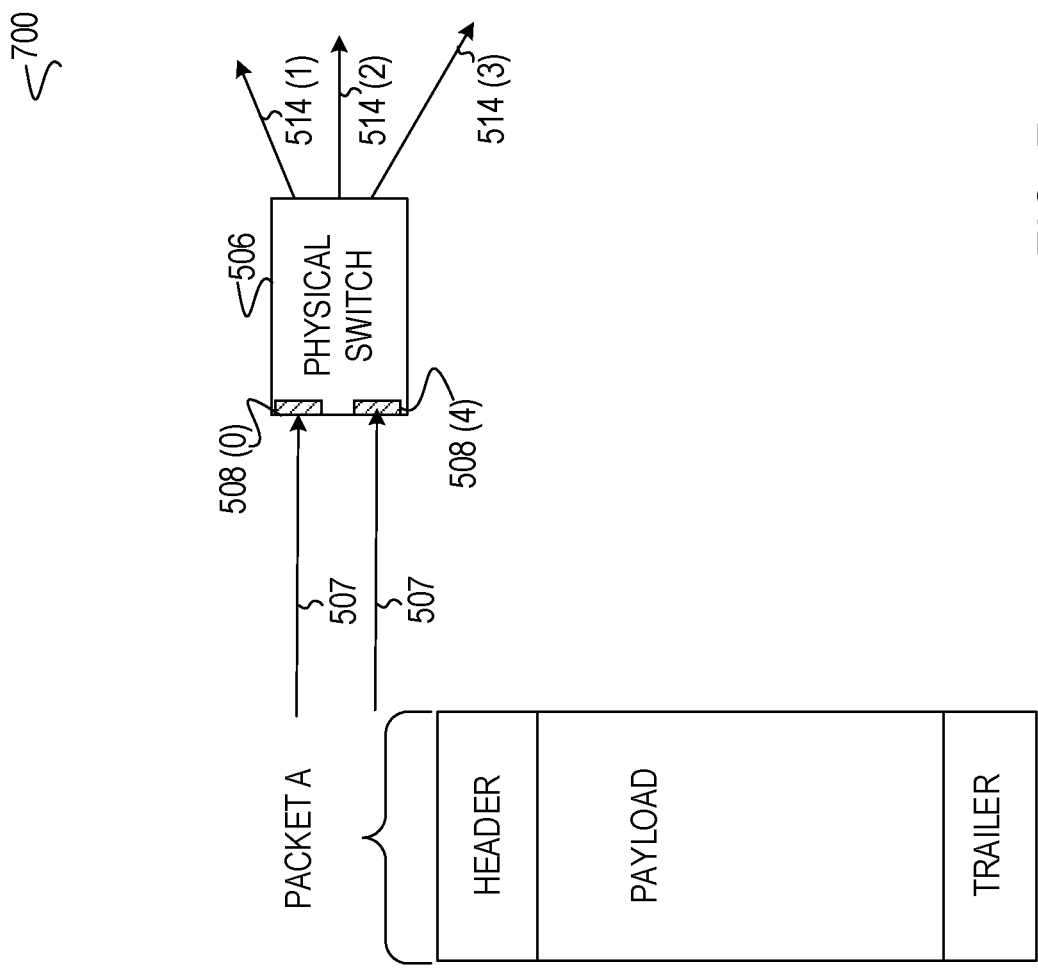
FIG. 7

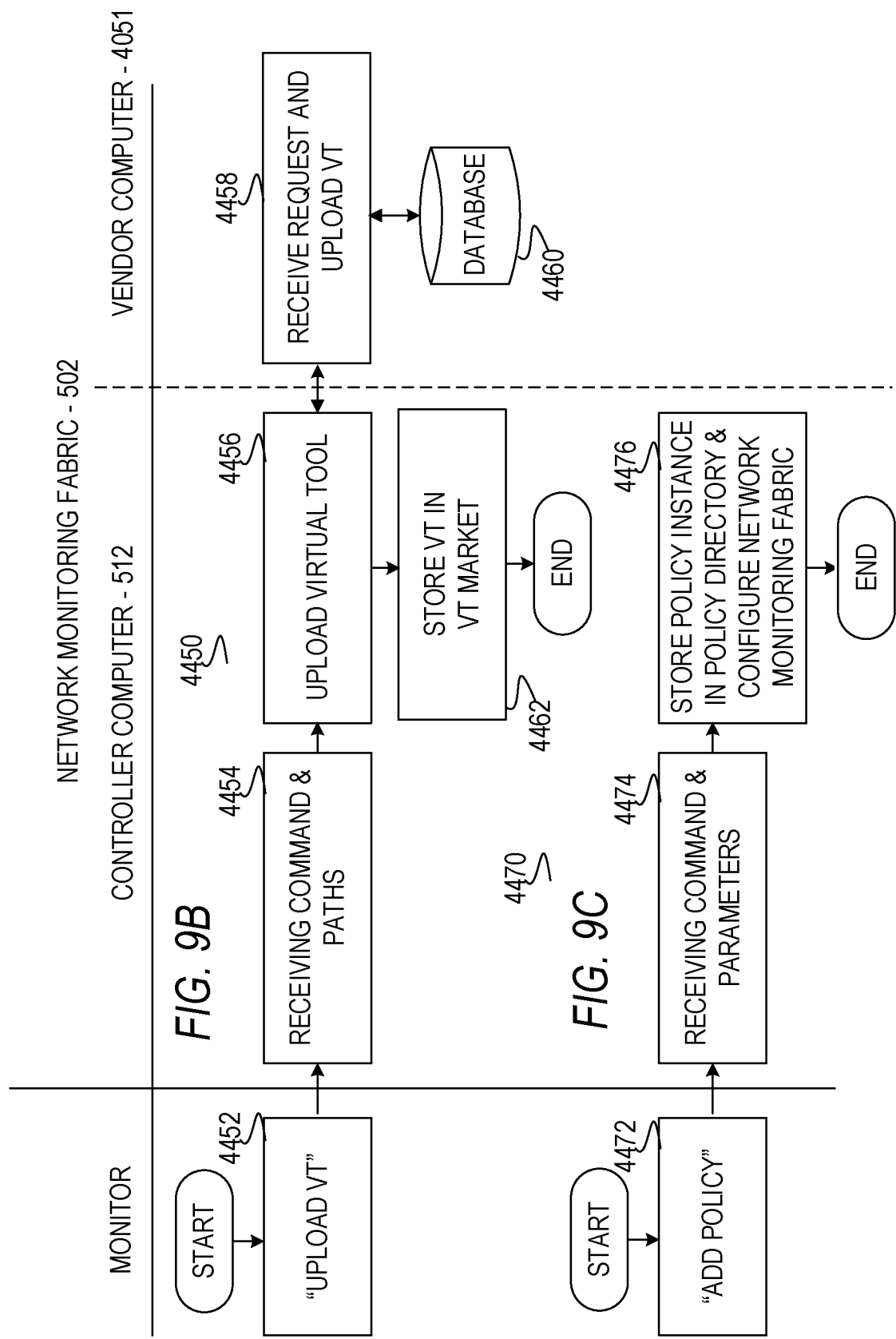

4600

| VIRTUAL TOOL (VT) MARKET | | |
|---|---|---|
| DESCRIPTION | BILLING | IMAGE |
| XYZ Inc. – DATA MONITOR | QTY TRAFFIC | VIRTUAL MACHINE & DOCK CONTAINER |
| ABC LLC – TOOL | QTY TRAFFIC & SUBSCRIBE | DOCKER CONTAINER |
| DEF LLC – TOOL | SUBSCRIBE | VIRTUAL MACHINE |

| XYZ INC – DATA MONITOR<br>SERVER MACHINE 12<br>VIRTUAL MACHINE - 1 ||||||||
|---|---|---|---|---|---|---|---|
| HOST | AVG BITS/S || AVG PACKETS/S || AVG NEW CONNECTIONS ||
| WEBSERVER 21 | -13% | 316.00 | 29% | < 1 | 10% | 133 |
| WEBSERVER 30 | 20% | 222.00 | 32% | 11 | 30% | 75 |
| WEBSERVER 19 | -1% | 11.00 | 2% | 1 | 10% | 13 |
| ANALYTICS ||||||||

| OBSERVED IP TRACKER | | | | | | |
|---|---|---|---|---|---|---|
| FILTER TABLE ROWS | | | | | FILTER | ✕ 🗗 |
| SWITCH ALIAS | SWITCH | INTERFACE | TAP INTERFACE | OBSERVED IPS | | |
| BT-SWITCH1 | 00:00:5C:16:C7:17:C1:3B | ETHERNET3 | DT-LEAF1A | VLAN 0 | VLAN 2 | VLAN 3 |
| | | | | 10.1.0.0/20 | 10.1.10.0/27 | 10.1.10.128/27 |
| | | | | VLAN 4 | VLAN 5 | VLAN 5 |
| | | | | 10.1.11.1/32 | 10.1.11.128/27 | 10.1.0.72/29 |
| | | | | VLAN 7 | | |
| | | | | 10.1.0.81/32 | | |
| BT-SWITCH1 | 00:00:5C:16:C7:17:C1:3B | ETHERNET4 | DT-LEAF1B | VLAN 0 | VLAN 2 | VLAN 3 |
| | | | | 10.1.0.0/20 | 10.1.10.0/27 | 10.1.10.129/32 |
| | | | | VLAN 4 | VLAN 5 | VLAN 6 |
| | | | | 10.1.11.1/32 | 10.1.11.128/27 | 10.1.0.76/32 |

FIG. 12A

| DHCP TRACKER | | | | |
|---|---|---|---|---|
| FILTER TABLE ROWS | | | | |
| SERVER ADDRESS | CLIENT COUNT | LEASE TIME | RELAY | SUBNETS |
| 10.1.5.200 | 284 | 0 secs | | 10.2.2.0/23, 10.1.6.0/24, 10.1.7.0/24, 10.1.8.0/23, 10.1.10.0/25, and 3 More... |
| 10.3.0.4 | 153 | 8 hours | ✓ | 10.8.0.0/18, 10.8.67.0/24, 10.9.16.0/23, 10.9.18.0/23 |
| 10.3.0.5 | 1 | 1 hour | - | 10.2.0/22 |
| 10.3.0.6 | 41 | 10 mins | - | 10.4.4.0/24, 10.4.100.0/24, 10.5.0.0/24, 10.5.6.0/24 |
| 10.3.0.7 | 19 | 1 hour, 50 mins | - | 10.6.0.0/15 |
| 10.3.0.9 | 23 | 10 mins | - | 10.2.16 |
| 192.168.100.1 | 9 | 5 mins | - | 192.168.100.0/24 |

| TOPOLOGY | |
|---|---|
| SELECT POLICY ▽ FILTER ✕ | |

SWITCH
- ALIAS BT-SWITCH1
- DPID 00:00:5C:16:C17:17:C1:3B
- CONNECTED SINCE TODAY, 3:06:32PM PDT
- CONNECTED TIME 2.9 HOUR
- IP ADDRESS 10.2.8.123:58090
- # INTERFACES 54

INTERFACE
- NAME ETHERNET34
- HARDWARE ADDRESS 5C:16:C7:17:C1:5D
- NUMBER 34

TAP CONFIGURATION
- STATE UP   NAME T5-LAB-MGMT
- SPEED GBIT/S   ROLE FILTER
- DIRECTION RX   VLAN 1034

CONNECTED DEVICE
- DEVICE NAME T5-ALPHA-LAB
- DEVICE DESCRIPTION GIGABIT ETHERNET SWITCH
- CHASSIS ID FC:75:16:96:5F:00
- PORT ID FC:75:16:96:60:16
- PORT DESCRIPTION D-LONK DGS-3420-28TC R1.00.024 PORT 23 ON UNIT 1
- MANAGEMENT ADDRESS —
- PROTOCOL LLDP

| BT-CONTROLLER1(CONFIG)# SHOW BIGTAP TCP-CONNECTIONS | | | | | |
|---|---|---|---|---|---|
| # | TCP CLIENT | CLIENT HOST TCP SERVER | SERVER HOST | APPLICATION | CONNECTION START |
| 1 | 10.0.16.51:53423 | 10.9.19.214:8009 | | | NOW |
| 2 | 10.9.19.242:3712 | 10.8.23.70:443 | | HTTPS | 8 SEC |
| 3 | 115.231.222.45:35644 | 173.227.38.53:22 | | SSH | 2 SEC |
| 4 | 173.227.38.50:19321 | 72.1.46.86:443 | PANASONIC.PROV.PHONE.COM | HTTPS | 7 SEC |
| 5 | 173.227.38.50:19380 | 74.125.224.0:443 | WWW3.L.GOOGLE.COM | HTTPS | 1 SEC |

*FIG. 12D*

HOST TRACKER

FILTER TABLE ROWS

[FILTER] ×

| HOST NAME | FILTER INTERFACE | FILTER INTERFACE COUNT | IP ADDRESS | MAC ADDRESS | VENDOR | VLAN IDs | EXTRA INFO | FIRST SEEN | LAST SEEN |
|---|---|---|---|---|---|---|---|---|---|
| WIN-RR1E04LOAKF | LAB-LEAF2A | 1 | 10.8.4.70 | 00:50:56:A6:6F:63 | VMWARE, INC. | 0 | DHCP SERVER 10.3.0.4 EXPIRES 7 HRS | 21 HOURS | 33 SEC |
| WEB-64 | LAB-LEAF2A | 1 | 10.8.4.137 | 00:50:56:A2:36:C9 | VMWARE, INC. | 0 | - | 15 HOURS | 4 HOURS |
| WEB-1 | LAB-LEAF2A | 1 | 10.2.18.194 | 00:50:56:9A:B1:B0 | VMWARE, INC. | 0 | DHCP SERVER 10.3.0.9 EXPIRES 7 MIN | 22 HOURS | 15 SEC |

| BT-CONTROLLER1(CONFIG)# SHOW BIGTAP DNS-QUERIES | | | | | |
|---|---|---|---|---|---|
| # | CLIENT IP | CLIENT NAME | TARGET IP | TARGET NAME | QUERY TIME |
| 1 | 10.1.10.18 | | 74.125.224.0 | WWW3.L.GOOGLE.COM | 18 SEC |
| 2 | 10.1.10.18 | | 74.125.224.1 | WWW3.L.GOOGLE.COM | 18 SEC |
| 3 | 10.1.10.18 | | 74.125.224.14 | WWW3.L.GOOGLE.COM | 18 SEC |
| 4 | 10.1.10.18 | | 74.125.224.2 | WWW3.L.GOOGLE.COM | 18 SEC |
| 5 | 10.1.10.18 | | 74.125.224.3 | WWW3.L.GOOGLE.COM | 18 SEC |
| 6 | 10.1.10.18 | | 74.125.224.4 | WWW3.L.GOOGLE.COM | 18 SEC |

*FIG. 12F*

| SERVER ADDRESS | SERVER NAME | SUBNETS |
| --- | --- | --- |
| 4.2.2.1 | A.RESOLVERS.LEVEL3.NET | 173.227.38.50/32 |
| 4.2.2.2 | B.RESOLVERS.LEVEL3.NET | 173.227.38.50/32 |
| 4.2.2.3 | C.RESOLVERS.LEVEL3.NET | 173.227.38.50/32 |
| 4.2.2.4 | D.RESOLVERS.LEVEL3.NET | 173.227.38.50/32 |

FIG. 12G

SYSTEMS AND METHODS TO SCALE A NETWORK MONITORING FABRIC

TECHNICAL FIELD

This disclosure relates to the technical field of data communications and more particularly to systems and methods to scale a network monitoring fabric.

BACKGROUND

A production network may interconnect multiple devices by utilizing multiple technologies. Sometimes the production network does not function as anticipated. In such cases, the traffic being communicated in the production network may be passively monitored with one or more tools. The tools may be utilized to identify a problem, design a workaround to avoid the problem, and test a long-term solution that solves the problem. However, the tools may be expensive and difficult to manage.

BRIEF DESCRIPTION OF THE DRAWINGS

FIG. 2A is a block diagram illustrating duplication of traffic information, according to example embodiments;

FIG. 2B is a block diagram illustrating duplication of traffic information, according to example embodiments;

FIG. 2C is a block diagram illustrating duplication of traffic information, according to example embodiments;

FIG. 3A is a block diagram illustrating duplication of traffic information, according to example embodiments;

FIG. 3B is a block diagram illustrating duplication of traffic information, according to example embodiments;

FIG. 5C is a block diagram illustrating commands, according to an embodiment;

FIG. 7 is a block diagram illustrating a physical switch, according to an embodiment;

FIG. 9B is a flowchart illustrating a command, according to an example embodiment, to upload a virtual tool;

FIG. 9C is a flowchart illustrating a command, according to an example embodiment, to add a policy;

FIGS. 10A-10B are schematic diagrams illustrating user interfaces, according to some example embodiments;

FIGS. 12A-12G are schematic diagrams illustrating user interfaces, according to various example embodiments;

DETAILED DESCRIPTION

Figure 1:
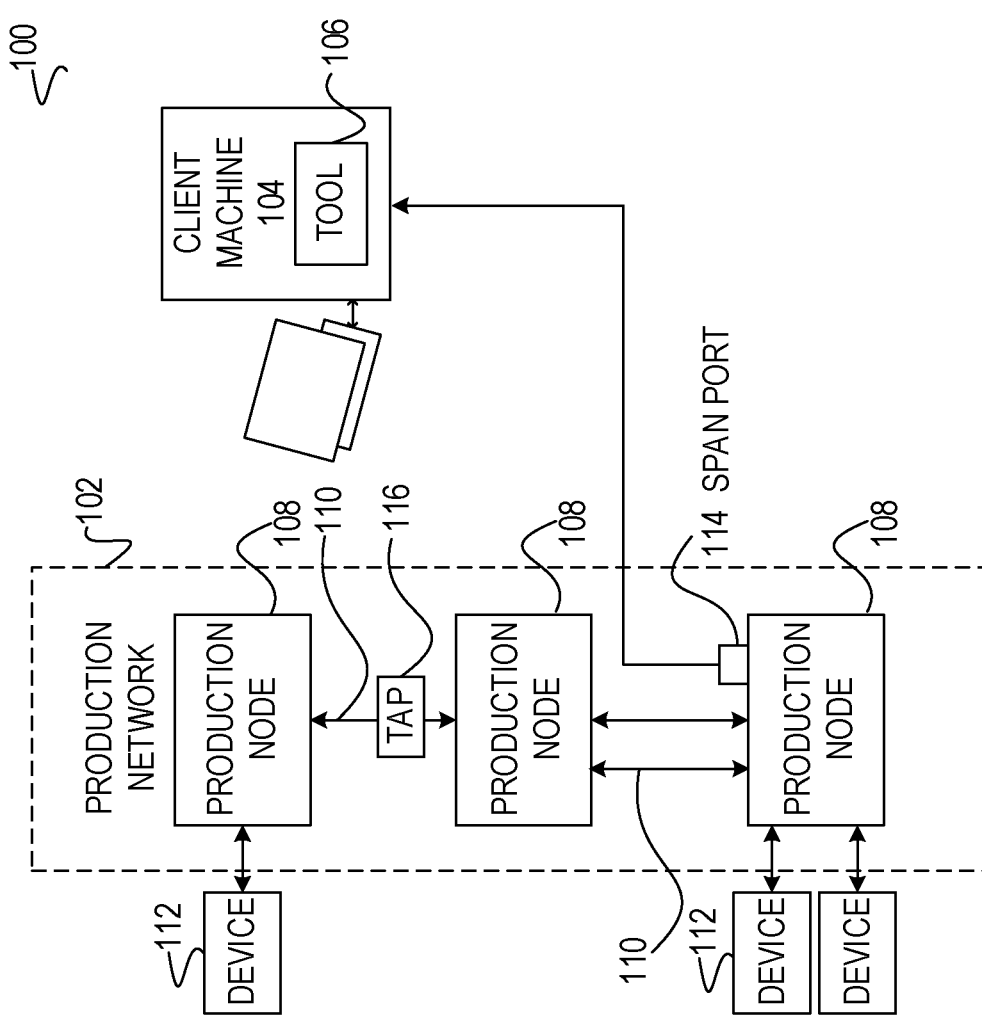
FIG. 1 is a block diagram illustrating a system, according to an embodiment, to monitor traffic information.

FIG. 1 is a block diagram illustrating a system 100, according to an embodiment, to monitor traffic information. The system 100 is found in the prior art and is associated with deficiencies. The system 100 may include a production network 102 for communicating traffic information and a client machine 104 including a tool 106 (e.g., tool module) that is utilized to monitor the traffic information on the production network 102. The production network 102 may include production nodes 108 (e.g., switching machines) that are connected with production links 110. The production links 110 may be used to communicate the traffic information (e.g., north/south direction) among the production nodes 108. The production network 102 may further include devices 112 that are connected to the production network 102 that may originate and/or terminate the traffic information. For example, a device 112 may originate traffic information (e.g., packets, frames, etc.) that is received by a production node 108 at the top of the production network 102 that, in turn, communicates the traffic information over a production link 110 to a production node 108 in the middle of the production network 102 that, in turn, communicates the traffic information over a production link 110 to a production node 108 at the bottom of the production network 102 that, in turn, communicates the traffic information to a connecting device 112.

The production network 102 may further include monitoring mechanisms in the form of a switched port analyzer 114 (SPAN port 114) and a tap 116. Nevertheless, one having ordinary skill in the art recognizes that the number and placement of monitoring mechanisms is not limited. The SPAN port 114 is located on the production node 108 at the bottom the production network 102. The SPAN port 114 may be configured by an administrator of the production network 102 to communicate a duplicate of the traffic information to the client machine 104, where it is received by the tool 106. The administrator may configure a duplication of the traffic information to be performed at designated access points in the production network 102. For example, the designated access points may include a port on a production node 108 for transmitting traffic information to a device 112, a port on a production node 108 for receiving traffic information from a device 112, a port on a production node 108 for receiving traffic information from a production link 110, and a port on a production node 108 for transmitting traffic information over a production link 110. For example, the administrator may configure a duplication of the traffic information that is being received from the device 112 that is connected to the production node 108 at the top of the production network 102 and a forwarding of the duplicated traffic information to the SPAN port 114. Further, for example, the administrator may configure a duplication of the traffic information that is being received from both devices 112 that are connected to the production node 108 at the bottom of the production network 102 and a forwarding of the duplicated traffic information to the SPAN port 114. Further, for example, the administrator may configure a duplication of the traffic information that is being received from the production links 110 that are connected to any of the production nodes 108 and a forwarding of the duplicated traffic information to the SPAN port 114.

The tap 116 is located on a production link 110 connecting the production node 108 at the top of the production network 102 with the production node 108 in the middle of the production network 102. The tap 116 may be configured by an administrator of the production network 102 to communicate to the client machine 104 a duplicate of the traffic information that is being communicated in either or both directions over the production link 110.

The system 100 is associated with deficiencies. First, the tool 106 cannot be connected to the tap 116 and the SPAN port 114 at the same time. Rather, the tool 106 is connected to one monitoring mechanism at a time. Second, disconnect and reconnect operations may result in the dispatch of service personnel to site. Third, the traffic information is being communicated to the tool 106 without filtration. Fourth, the tools 106 are generally expensive (e.g., $10K). Fifth, the tools 106 may be heavy, bulky, and difficult to effectively position in the field. Accordingly, a supply of tools 106 adequate for a desired level of service may be prohibited by budget.

The production network 102 may be embodied as an enterprise network, a global network, a regional network, multiple sub-networks, public networks (e.g., Internet), private networks, and the like. The production network 102 may include one or more proprietary networks. The production network 102 may be operated by different legal entities and comprised of equipment provided by different vendors. The production network 102 may include one or more local area networks (LANs), one or more wide area networks (WANs), and/or other types of networking technologies that are used to interconnect the devices 112. The production network 102 may be embodied in any topology. Each production node 108 may include one or more server machines, routers, bridges, and/or other computing devices to facilitate transmission of the traffic information. The production links 110 may utilize T1, E1, Synchronous Optical Networking (SONET), Digital Subscriber Line (DSL), or any other transmission technology that facilitates the communication of the traffic information. The devices 112 may originate and/or terminate any type of traffic information including voice, data, multimedia, or the like. The tool 106 may be embodied as passive performance analytic tools, passive security analytic tools, and the like. Passive performance analytic tools may include a service assurance analyzer, an application performance analyzer, a unified communications voice over Internet protocol analyzer, a web monitor, and the like. Passive security analytic tools may include a network discovery analyzer, a flow data analyzer, a metadata analyzer, a data recorder, a network forensics analyzer, a lawful interceptor, a data loss preventer, a compliance audit monitor, and the like.

FIG. 2A is a block diagram illustrating a duplication 200, according to example embodiments, of traffic information 201. The duplication 200 may be of the traffic information 201 being communicated in one or both directions over the tap 116. For example, a magnification "×1" of the tap 116 illustrates the duplication of the traffic information 201 that is being communicated in a northerly direction 202, as illustrated in FIG. 2B. Further, for example, a magnification "×2" of the tap 116 illustrates the duplication of the traffic information 201 that is being communicated in a southerly direction 204, as illustrated in FIG. 2C.

FIG. 2B is a block diagram illustrating a duplication 203, according to example embodiments, of the traffic information 201. The duplication 203 includes the magnification "×1" (e.g., see also FIG. 2A) of traffic information 201 that is being communicated in the northerly direction 202. Specifically, the magnification "×1" illustrates the traffic information 201, in the form of packets "A," "B," and "C," as being duplicated by the tap 116 before being communicated by the tap 116 to the tool 106 (not shown).

FIG. 2C is a block diagram illustrating a duplication 205, according to example embodiments, of the traffic information 201. The duplication 205 includes the magnification "×2" (e.g., see also FIG. 2A) of the traffic information 201 that is being communicated in the southerly direction 204. Specifically, the magnification "×2" illustrates the traffic information 201, in the form of packets "D," "E," and "F," as being duplicated by the tap 116 before being communicated by the tap 116 to the tool 106 (not shown).

FIG. 3A is a block diagram illustrating a duplication 300, according to example embodiments of the traffic information 201. The duplication 300 of the traffic information 201 may be performed in one or both directions for the two production links 110 connecting the production node 108 in the middle and the production node 108 on the bottom. A magnification "×3" of the SPAN port 114 illustrates the duplication 300 of the traffic information 201 being performed in a northerly direction 302 over both production links 110 and the duplication 300 being performed in a southerly direction 304 over the same two production links 110. The magnification "×3" is further illustrated in FIG. 3B.

FIG. 3B is a block diagram illustrating a duplication 301, according to example embodiments of the traffic information 201. The duplication 301 of the traffic information 201 may be performed in one or both directions for the two production links 110 connecting the production node 108 in the middle and the production node 108 on the bottom. The magnification ×3 (e.g., see also FIG. 3A) of the SPAN port 114 illustrates the duplication 301 of the traffic information 201 being performed in a northerly direction 302 over both production links 110 and the duplication 301 being performed in a southerly direction 304 over the same two production links 110. For example, the traffic information 201 being communicated in the northerly direction 302 over first (e.g., packet "A" and "packet B") and second (e.g., packet "C" and packet "D") production links 110 may be duplicated before being communicated over the SPAN port 114 to the tool 106 (not shown). Further, for example, the traffic information 201 being communicated in the southerly direction 304 over first (e.g., packet "E" and packet "F") and second (e.g., packet "G" and packet "H") production links 110 may be duplicated before being communicated over the SPAN port 114 to the tool 106 (not shown).

Figure 4:
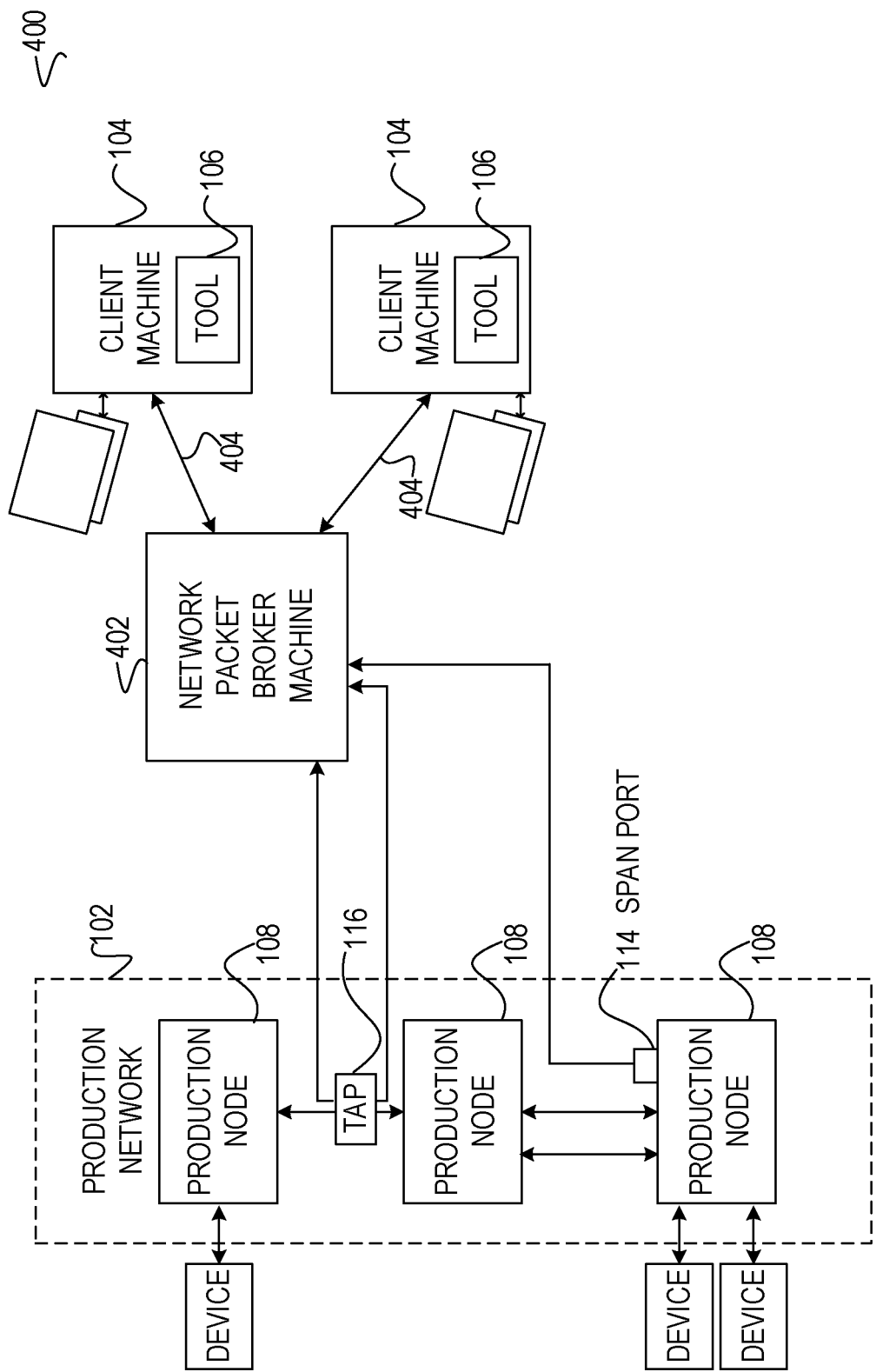
FIG. 4 is a block diagram illustrating a system, according to an embodiment, to monitor traffic information.

FIG. 4 is a block diagram illustrating a system 400, according to an embodiment, to monitor traffic information. The system 400 is associated with deficiencies. The system 400 may include a network packet broker machine 402 (e.g., network packet broker). The system 400 exhibits an improvement over the system 100; nevertheless, the network packet broker machine 402 (e.g., network packet broker) has the disadvantage of connecting only a small number of production nodes 108 to a few tools 106, making it unsuitable for monitoring a large production network 102.

Figure 5A:
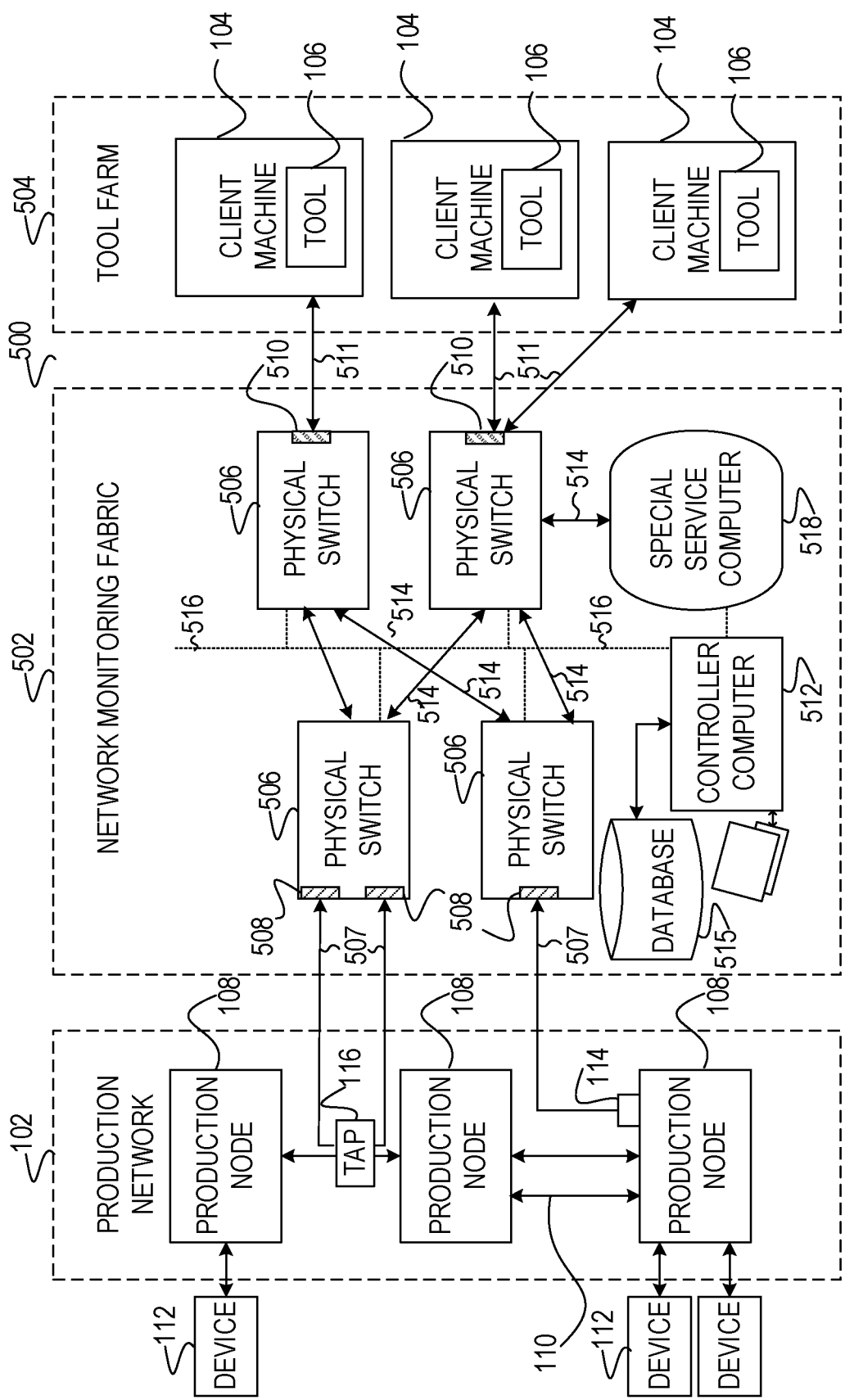
FIG. 5A is a block diagram illustrating a system, according to an embodiment, to build a network monitoring fabric.

FIG. 5A is a block diagram illustrating a system 500, according to an embodiment, to build a network monitoring fabric. The system 500 may include a production network 102, a network monitoring fabric 502, and a tool farm 504. The system 500 exhibits improvements over the systems 100 and 400; nevertheless, the system 500, according to the embodiment illustrated, includes tools that do not automatically scale because the tools are external (e.g., tool farm) to the network monitoring fabric 502. The system 500, according to another embodiment, may include tools that scale (e.g., virtual tools), as described later in this document. The production network 102 is as previously described. The tool farm 504 may include one or more client machines 104 each including one or more tools 106. The network monitoring fabric 502 may be utilized by the tools 106 in the tool farm 504 to monitor a duplicate of any traffic information 201 in the production network 102. Accordingly, the network monitoring fabric 502 enables any tool 106 in the tool farm 504 to monitor any duplicate of the traffic information 201 received by the network monitoring fabric 502.

The traffic information 201 may generally flow north (e.g., top of FIG. 5) to south (e.g., bottom of FIG. 5) and/or south to north in the production network 102. In contrast, the traffic information 201 flows from west (e.g., left side of FIG. 5) to east (e.g., right side of FIG. 5) over the network monitoring fabric 502 where it is monitored at the tool farm 504. The traffic information 201 typically does not flow from east to west over the network monitoring fabric 502 as the network monitoring fabric 502 is solely for monitoring the traffic information 201 in the production network 102. To this end, the network monitoring fabric 502 may include a plurality of switches (e.g., physical switches 506 (e.g., white box switches) and/or virtual switches (not shown)) that are connected together with fabric links 514, a control link 516 that connects each of the switches with a controller computer 512, a database 515, and a monitor that is communicatively coupled to the controller computer 512, and a special service computer 518. A duplicate of the traffic information 201 may be received over ingress links 507 at ingress interfaces 508 of the switches that, in turn, forward the traffic information 201 via one or more switches in an easterly direction to exit the network monitoring fabric 502 through egress interfaces 510 that are connected to egress links 511 that, in turn, are connected to the client machines 104 in the tool farm 504.

The switches (e.g., physical switches 506 (e.g., white box switches) and/or virtual switches (not shown)) may be configured by the controller computer 512 in multiple ways. First, the switches may be configured by the controller computer 512 to receive the traffic information 201 at a particular ingress interface 508 and to forward the traffic information 201 over the fabric links 514 connecting the switches to exit the network monitoring fabric 502 at a particular egress interface 510. Accordingly, the switches may be configured by the controller computer 512 to forward the traffic information 201 to the appropriate tool 106 notwithstanding the location of the tool 106 or the location of the monitoring mechanism (e.g., tap 116, SPAN port 114).

Second, the switches (e.g., physical switches 506 (e.g., white box switches) and/or virtual switches (not shown)) may be configured by the controller computer 512 to receive the traffic information 201 at a particular ingress interface 508 and to communicate the traffic information 201 over the control link 516 to the controller computer 512 that, in turn, stores the traffic information 201 in the database 515. In some embodiments, the controller computer 512 may further communicate the traffic information 201 to the special service computer 518, as described below. The controller computer 512 may be utilized to perform a forensic analysis on the traffic information 201 as being received or as stored. For example, the controller computer 512 may facilitate the querying of traffic information 201 in the database 515 to display the traffic information 201 and to characterize the traffic information 201, as described later in this document. It will be appreciated that the characterizing of the traffic information 201 may be utilized to facilitate an optimal building of the network monitoring fabric 502 to enhance the monitoring of the traffic information 201 by the tool farm 504.

Third, the switches (e.g., physical switches 506 (e.g., white box switches) and/or virtual switches (not shown)) may be configured by the controller computer 512 to communicate the traffic information 201 to the special service computer 518 and to receive the traffic information 201 from the special service computer 518. Accordingly, the switches may be configured by the controller computer 512 to forward the traffic information 201 through the special service computer 518 before the traffic information 201 is forwarded over the network monitoring fabric 502 via one or more switches to exit at a particular egress interface 510. Forwarding the traffic information 201 to the special service computer 518 may facilitate removal by the special service computer 518 of duplicate traffic information 201 resulting from the ubiquitous placement of monitoring mechanisms (e.g., taps 116, SPAN ports 114) in the production network 102. Forwarding the traffic information 201 to the special service computer 518 may further facilitate time-stamping of the traffic information 201 by the special service computer 518. In one embodiment, the special service computer 518 may further communicate the time-stamped traffic information 201 over the control link 516 to the controller computer 512 that, in turn, stores the time-stamped traffic information 201 in the database 515 for subsequent forensic analysis, described later in this document.

Fourth, the switches (e.g., physical switches 506 (e.g., white box switches) and/or virtual switches (not shown)) may be configured by the controller computer 512 to filter the traffic information 201 that is received at an ingress interface 508. For example, the switches may be configured by the controller computer 512 to filter the traffic information 201 (e.g., packets) based on traffic type (e.g., web traffic), internet protocol source address, or any other traffic information 201, as described later in this document.

The switches (e.g., physical switches 506 (e.g., white box switches) and/or virtual switches (not shown)) and the special service computer 518 may be configured by the controller computer 512 by utilizing the control link 516. For example, the controller computer 512 may communicate configuration information over the control link 516 to a switch that, in turn, receives the configuration information and utilizes the configuration information to configure the operation of the switch. Further, for example, the controller computer 512 may communicate the configuration information over the control link 516 to the special service computer 518 that, in turn, receives the configuration information and utilizes the configuration information to configure operation of the special service computer 518. The network monitoring fabric 502 may be scaled. Accordingly, one having ordinary skill in the art will recognize that the number of switches may be increased to expand the capacity and interconnectivity of the network monitoring fabric 502.

Broadly, the system 500 to build a network monitoring fabric 502 may operate as follows. The network monitoring fabric 502 may receive a duplicate of a first portion of traffic information 201 from a production network 102 as first traffic information 201. For example, the first traffic information 201 may originate at multiple monitoring mechanisms (e.g., taps 116, SPAN ports 114) that are configured or manually inserted by an administrator for the production network 102. The first traffic information 201 may be received over ingress links 507 by the network monitoring fabric 502, at ingress interfaces 508, and by switches (e.g., physical switches 506 (e.g., white box switches) and/or virtual switches (not shown)). The switches, in turn, may communicate the first traffic information 201 over the control link 516 to the controller computer 512 that, in turn, stores the first traffic information 201 in the database 515. The controller computer 512 may utilize the first traffic information 201 that is stored in the database 515 to configure multiple (e.g., a second plurality of) switches in the network monitoring fabric 502 to forward a second portion of the traffic information 201, as second traffic information 201, to the tool farm 504. For example, an administrator may identify a particular type of traffic (e.g., web traffic) based on a forensic analysis of the first traffic information 201 that is stored in the database 515. That is, the administrator may identify that a particular type of traffic is of interest for further analysis by a tool 106 in the tool farm 504. In response to the configuration of the switches, the network monitoring fabric 502 may begin receiving a duplicate of the second portion of the traffic information 201 from the production network 102, as second traffic information 201. The second traffic information 201 may be received at a first ingress interface 508 and forwarded in the network monitoring fabric 502 with the second plurality of switches over one or more egress interfaces 510 to a tool farm 504 including a plurality of tools 106 that are utilized to monitor the traffic information 201 that originated in the production network 102.

Figure 5B:
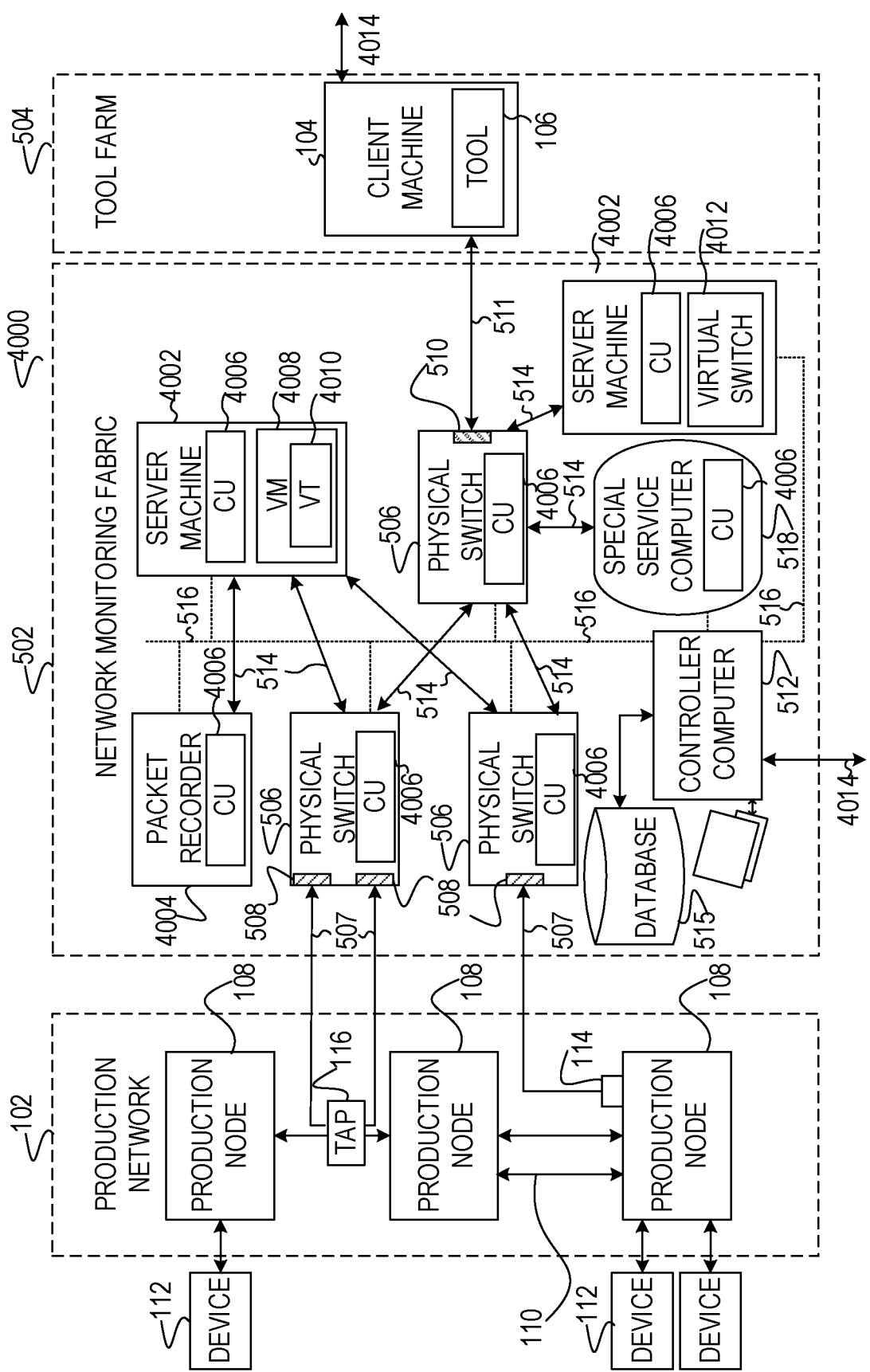
FIG. 5B is a block diagram illustrating a system, according to an embodiment, to scale a network monitoring fabric.

FIG. 5B is a block diagram illustrating a system 4000, according to an embodiment, to scale a network monitoring fabric. The system 4000 corresponds to the system 500 in FIG. 5A. Accordingly, the same or similar references have been used to indicate the same or similar features unless otherwise indicated. The network monitoring fabric 502 further includes a server machine 4002 and packet recorder machine 4004. The physical switches 506, the server machine 4002, the packet recorder machine 4004, virtual switches 4012, and the special service computer 518 may each include one or more control units 4006 (illustrated CU), for communicating with the controller computer 512. The control unit 4006 (CU) enables a network architecture that supports centralized control over network entities that are produced by different manufacturers. For example, the controller computer 512 may be communicatively coupled via the control links 516 to the control units 226, in network entities including the physical switches 214, the server machines 4002, and the special service computer 518, to implement a network configuration and to perform other types of centralized control. The potential incompatibilities between each of the different entities is overcome by incorporating the control unit 4006, also referred to herein as a controller client or control module, into each of the entities. Accordingly, a centralized cross-platform controller, such as the controller computer 512, may interact with each of the control units 226 over respective network control links 516 to allow network equipment of different manufacturers to be centrally managed.

The switches include physical switches 506 and virtual switches 4012. The physical switches 506 are switches implemented in hardware computing devices. The virtual switches 206 are switches implemented as software within hardware computing devices, such as the hardware server machine 4002, as described further in FIG. 5C. For simplicity, the term "switch" is used to describe physical switches 506 and virtual switches 4012, unless otherwise specified.

Virtual Tools

The server machine 4002 may be configured to include one or more virtual machines 4008 (VM) that respectively include one or more virtual tools 4010. In some embodiments, the server machine 4002 may additionally be configured to include one or more virtual switches 4012.

The virtual tools 4010 may be downloaded from the controller computer 512 into the virtual machine 4008 on the server machine 4002. For example, an administrator, utilizing a monitor coupled to the controller computer 512, may select a virtual tool 4010 from a virtual tool market (not shown) and download the virtual tool 4010 to the server machine 4002. The virtual tool market may be stored in the database 515. The virtual tool market may receive tools from virtual tool vendors who upload the virtual tools 4010, over a network (e.g., Internet), from vendor computers that are located remotely to the network monitoring fabric 502.

Accordingly, a tool 106, external to the network monitoring fabric 502, may correspond to a virtual tool 4010, internal to the network monitoring fabric 502. In some embodiments, the administrator may upload virtual tools from vendor computers via the controller computer 512. Accordingly, the number of virtual tools and the types of virtual tools 4010 may be easily scaled in the network monitoring fabric by adding server machines 4002 and configuring the server machines 4002 with virtual tools 4010 that are selected from a tool market stored in the database 515.

Operation

The system 4000 to scale a network monitoring fabric may operate as follows. An administrator may execute a first command (e.g., upload virtual tool) from a monitor that is coupled to the controller computer 512. The first command may execute to retrieve a copy of software that embodies the virtual tool 4010. The virtual tool 4010 may be retrieved from a vendor computer and stored in a tool market in the database 515. The command may retrieve the virtual tool by utilizing a network link 4014 (e.g., connected to Internet) that enables a connection from the controller computer 512 to a vendor computer (not shown).

The administrator may execute a second command (e.g., add policy) from the monitor coupled to the controller computer 512 to configure the network monitoring fabric 502. The administrator may execute the second command causing the controller computer 512 to receive traffic information from the production network 102 at an ingress interface 508, as previously described, and process the traffic information with the virtual tool 4010. For example, the second command may cause the controller computer 512 to configure the server machine 4002 and one or more physical switches 506 and/or virtual switches 4012. The controller computer 512 may configure the server machine 4002 by downloading the virtual machine 4008 in the server machine 4002 and downloading the virtual tool 4010 to the server machine 4002 for execution in the virtual machine 4008. The controller computer 512 may further configure the server machine 4002 by establishing connections inside the server machine 4002 to transport the traffic information from a network interface card of the server machine 4002 to the virtual tool 4010. Execution of the second command may further cause the controller computer 512 to configure one or more physical switches 506 and/or virtual switches 4012 to receive the traffic information from the production network 102 at an ingress interface 508 and transport the traffic information to the network interface card of the server machine 4002. Responsive to the configuration, as described above, the network monitoring fabric 502 may receive a duplicate of the traffic information from the production network 102 at a first ingress interface 508 providing access to the network monitoring fabric 502 and forward the duplicated traffic information, via the configured physical switches 506 and or virtual switches, to the virtual tool 4010.

The administrator may further execute a third command (e.g., display traffic) from the monitor to display output generated by the virtual tool. For example, an execution of the third command may cause the controller computer 512 to receive virtual tool interface information from over the network monitoring fabric 502 and utilize the virtual tool interface information to display user interfaces on the monitor coupled to the controller computer 512. In some embodiments, two or more virtual tools 4010 may be pipelined together. According to this embodiment, the two or more virtual tools 4010 may be pipelined together before the virtual tool interface information is received by the controller computer 512. For example, the network monitoring fabric 502 may be configured to host a first virtual tool at a first server machine 4002 and a second virtual tool (e.g., analytics tool) at a second server machine 4002 before the virtual tool interface information is received by the controller computer 512. For example, the first virtual tool 4010 may communicate the first virtual tool interface information, over the network monitoring fabric 502, to the second virtual tool 4010, located at a second server machine 4002, and the second virtual tool 4010 may communicate the second virtual tool interface information to the controller computer 512 that, in turn, utilizes the second virtual tool interface information to display one or more user interfaces on the monitor. In some embodiments, a tool 106 (not a virtual tool 4010), in the tool farm 504, may be utilized. According to this embodiment, the tool 106 (e.g., analytics tool) may be hosted by a client machine 104. For example, the tool 106 may receive the first virtual tool interface information from over an egress link 511, generate the second virtual tool interface information based on the first virtual tool interface information, and communicate the second virtual tool interface information to the controller computer 512. For example, the controller computer 512 may retrieve the second virtual tool interface information from the client machine 104 hosting the tool 106 (e.g., analytic) by utilizing a network link 4014, connected to a network (e.g., Internet), as previously described.

Packet Recorder

The packet recorder machine 4004 may be configured by the controller computer 512 to store and playback traffic information. The store and playback feature may facilitate multiple playbacks of the same traffic information to different versions of a virtual tool 4010. For example, a first copy of the duplicated traffic information may be received from the production network 102 by the virtual tool 4010 and a second copy of the duplicated traffic information may be received and stored by the packet recorder machine 4004. Accordingly, a first version of a virtual tool virtual tool 4010 (e.g., malware detecting virtual tool) may be upgraded at the server machine 4002 to a second version of the virtual tool 4010 and the traffic information may be played back to the second version of the virtual tool for processing by the second version of the virtual tool 4010.

FIG. 5C is a block diagram illustrating commands 4050, according to an embodiment, to scale a network monitoring fabric. In the left column are commands/parameters and in the right column are corresponding descriptions. The commands may be entered at a monitor that is coupled to the controller computer 512. The commands may include an upload virtual tool command 4052 (e.g., "upload vt"), an add policy command 4054 (e.g., "add policy"), a delete policy command 4056 (e.g., "delete policy"), and a display traffic command 4068 (e.g., "display traffic").

Upload Virtual Tool Command

The upload virtual tool command 4052 (e.g., "upload vt") may be utilized to upload a virtual tool 4010 to the tool store. For example, the virtual tool 4010 may be uploaded to the tool store in the database 515. The upload virtual tool command 4052 may receive parameters including:

"A" parameter—network path—to retrieve the virtual tool 4010

"B" parameter—network path—to store the virtual tool 4010 (e.g., tool market)

Finally, the upload virtual tool command 4052 allocates and returns a virtual tool identifier that is used to identify the virtual tool 4010.

Add Policy Command

The add policy command 4054 (e.g., "add policy") may be executed to select a virtual tool 4010, store parameters in the database 515, install the virtual tool 4010 at a server machine 4002, and enable monitoring of traffic information. The add policy command 4054 may include the following parameters:

"A" parameter—ingress interface identifier
"B" parameter—virtual tool identifier
"C" parameter—server machine identifier
"D" parameter—network interface card identifier
"E" parameter—[virtual switch identifier] optional
"F" parameter—virtual network interface card identifier
"G" parameter—virtual machine identifier
"H" parameter—[egress interface identifier] optional.

The ingress interface identifier uniquely identifies an ingress interface 508 in the network monitoring fabric 502. The ingress interface 508 may be connected to an ingress link 507 that, in turn, is connected to a monitoring mechanism (e.g., tap 116, SPAN port 114) that, in turn, is connected to the production network 102. The ingress link 507 may transport a duplicate of traffic information from the production network into the network monitoring fabric 502.

Parameters "B"-"G" form an element that may repeated causing the controller computer 512 to pipeline the elements together. The virtual tool identifier uniquely identifies the virtual tool 4010 in the virtual tool market information 4354 (e.g., virtual tool market). The server machine identifier uniquely identifies the server machine 4002 in the network monitoring fabric 502. The remaining parameters "D"-"G" identify elements inside the server machine 4002 that transport the traffic information 201 to the virtual tool 4010 identified by the virtual tool identifier. The network interface card identifier uniquely identifies a network interface card in the server machine 4002. The virtual switch identifier is an optional parameter that uniquely identifies a virtual switch 4012 in the server machine 4002. If a virtual switch identifier is not entered, then traffic information 201 is not routed through a virtual switch 4012 inside the identified server machine 4002. The virtual network interface card identifier uniquely identifies a virtual network interface inside the server machine 4002.

As mentioned above, the parameters "B" through "G" may be repeated to identify a set of virtual tools 4010 that are pipelined together in the network monitoring fabric 502. For example, a first virtual tool 4010 (e.g., malware detection) that is identified by the parameters "B"-"G" may be pipelined to a second virtual tool (e.g., analytics) that is identified by a second set of the parameters "B"-"G." Accordingly, the traffic information 201 may be transported to the first virtual tool 4010 and the output of the first virtual tool 4010 may be transported to the second virtual tool 4010, and so on, until the output is transported to the final virtual tool 4010.

The egress interface identifier is an optional parameter. The egress interface identifier identifies an egress interface 510 for transporting the output of a single virtual tool 4010 or the output the last virtual tool 4010 in a pipeline of virtual tools 4010 out of the network monitoring fabric 502 via the identified egress interface 510, as previously described.

Delete Policy Command

Figure 5D:
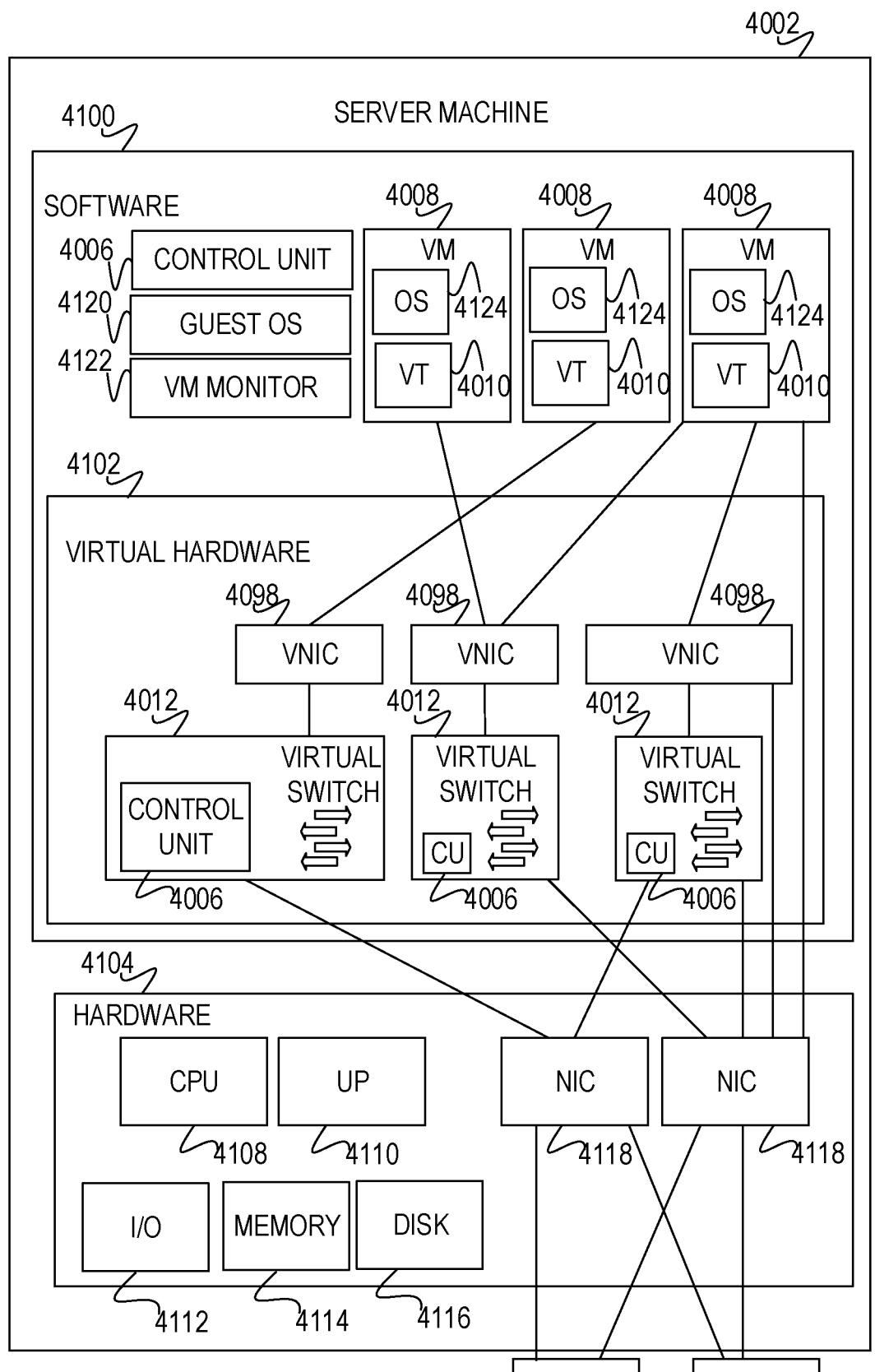
FIG. 5D is a block diagram illustrating a server machine, according to an embodiment.

The delete policy command may be used to delete a policy created with the add policy command. The delete policy command may include the following parameters:

"A" parameter—server machine identifier
"B" parameter—virtual machine identifier Display Traffic Command The display traffic command 4068 may be used to display the output of a virtual tool 4010 executing in a virtual machine to process traffic information 201. The display traffic command may include the following parameters:

"A" parameter—server machine identifier
"B" parameter—virtual machine identifier FIG. 5D is a block diagram illustrating the server machine 4002, according to an embodiment. The server machine 4002 includes software 4100 and hardware 4104. The software 4100 includes virtual hardware 4102. The server machine 4002 may host one or more virtual tools 4010 and one or more virtual switches 4012.

The hardware 4104 may include hardware components including a central processing unit (CPU) 4108, microprocessor 4110 for specialized services such as graphics, Input/Output (I/O) circuitry 4112, memory 4114, non-volatile storage 4116, and a one or more network interface cards (NICs) 4118, which may be connected to one or more networks via links. For example, the network interface cards 4118 may be connected to the network monitoring fabric 502 via the fabric link 514 and the control link 516. The NICs 4118 provide connectivity (e.g., over the control links 516 and/or fabric links 514 to the hardware 4104, virtual hardware 4102, and the software 4100. For example, the NICs 4118 may provide connectivity, over the control link 516, between the control computer 512 and the control units 4006 on the server machine 4002. Further, the NICs 4118 may provide connectivity, over the fabric links 514 to the hardware components, virtual switches 4012, virtual network interface cards (VNICs) 4098, and virtual machines 4008 on the server machine 4002.

The virtual hardware 4102 may include virtual switches 4012 and VNICs 4098. A virtual switch 4012 virtualizes a physical switch 506. For example, the virtual switch 4012 may virtualize a physical switch 506 by receiving and forwarding (e.g., switching) packets. The virtual switch 4012 may forward packets at layer 2 or at layer 3 of the International Organization for Standardization (ISO) network model. The virtual switch 4012 may access one or more virtual machines 4008 by utilizing a VNIC 4098. Further, the virtual switch 4012 may be connected via multiple VNICs 4098 to one or more virtual machines 4008.

The software 4100 may include a control unit 4006, a guest operating system (GUEST OS) 4120, a virtual machine monitor (VM MONITOR) 4122, and one or more virtual machines 4008 (VM). The control unit 4006 may be communicatively coupled to the controller computer 512 via the NICs 4118. The virtual machine monitor 4122 may create and run the virtual machines 4008 and is also referred to as a hypervisor. Each virtual machine 4008 may host an operating system 4124 and a virtual tool 4010. In some embodiments, different versions of the same virtual tool 4010 may be hosted by different virtual machines 4008 on the server machine 4002. In some embodiments, the virtual machine 4008 may also be referred to as a guest machine. In some embodiments, the virtual machine monitor 4122 may be any combination of software, firmware, and hardware that runs the virtual machines 4008. In some embodiments, the software 4100 may include a docker engine hosting one or more docker containers and infrastructure (e.g., binaries/libraries). Like a virtual machine 4008, the docker container may host a virtual tool 4010. The docker engine, docker containers, and associated infrastructure may be communicatively coupled to the other elements (e.g., VNICS 4098, NICS 4118, etc.) in the server machine 4002. The virtual machine monitor 4122 may present the guest operating system 4120 to the virtual machine 4008 as a virtual operating platform, and the virtual machine monitor 4122 manages the execution of the guest operating system 4120. The virtual machine monitor 4122 may present a virtual hardware platform to the virtual machines 4008, and any physical hardware component maybe virtualized to provide virtual hardware 4102 to the virtual machines 4008. Each virtual machine 4008 may include an operating system 4124 and a virtual tool 4010. The virtual tool 4010 may be communicatively coupled to the controller computer 512. For example, the virtual tool 4010 may communicatively coupled to the controller computer 512 via the virtual machine 4008 that is hosting the virtual tool 4010 and/or one or more VNICs 4098 and/or one or more NICs 4118. In this example, the virtual tool 4010 may receive/transmit information 201 via the virtual machine 4008 that, in turn, receives/transmits traffic information 201 via one or more VNICs 4098 and/or via one or more NICs 4118. Accordingly, the virtual tool 4010 may be communicatively coupled to the production network 102. For example, the virtual tool 4010 may receive the traffic information 201 (e.g., first traffic information, second traffic information, third traffic information, etc.) via the virtual machine 4008 hosting the virtual tool 4010, that, in turn, receives the traffic information 201 from one or more VNICs 4098 and/or one or more NICs 4118 that, in turn, receives the traffic information 201 from one or more fabric links 514 that, in turn, receives the traffic information 201 via one or more switches (e.g., physical switch 506 and/or virtual switch 4012 that, in turn, receives the traffic information 201 from the production network 102.

It will be appreciated that FIG. 5D does not illustrate every possible connection in the virtual hardware 4102, the hardware 4104, and the software 4100. Each VNIC 4098 may be communicatively coupled to each virtual switch 4012 in the server machine 4002, each virtual machine 4008 in the server machine 4002, and each NIC 4118 in the server machine 4002. Each NIC 4118 may be communicatively coupled to each virtual switch 4012 in the server machine 4002, each virtual machine 4008 in the server machine 4002, the control link 516, and the fabric link 514. Multiple instances of a variety of operating systems may share the virtual hardware 4102.

Figure 5E:
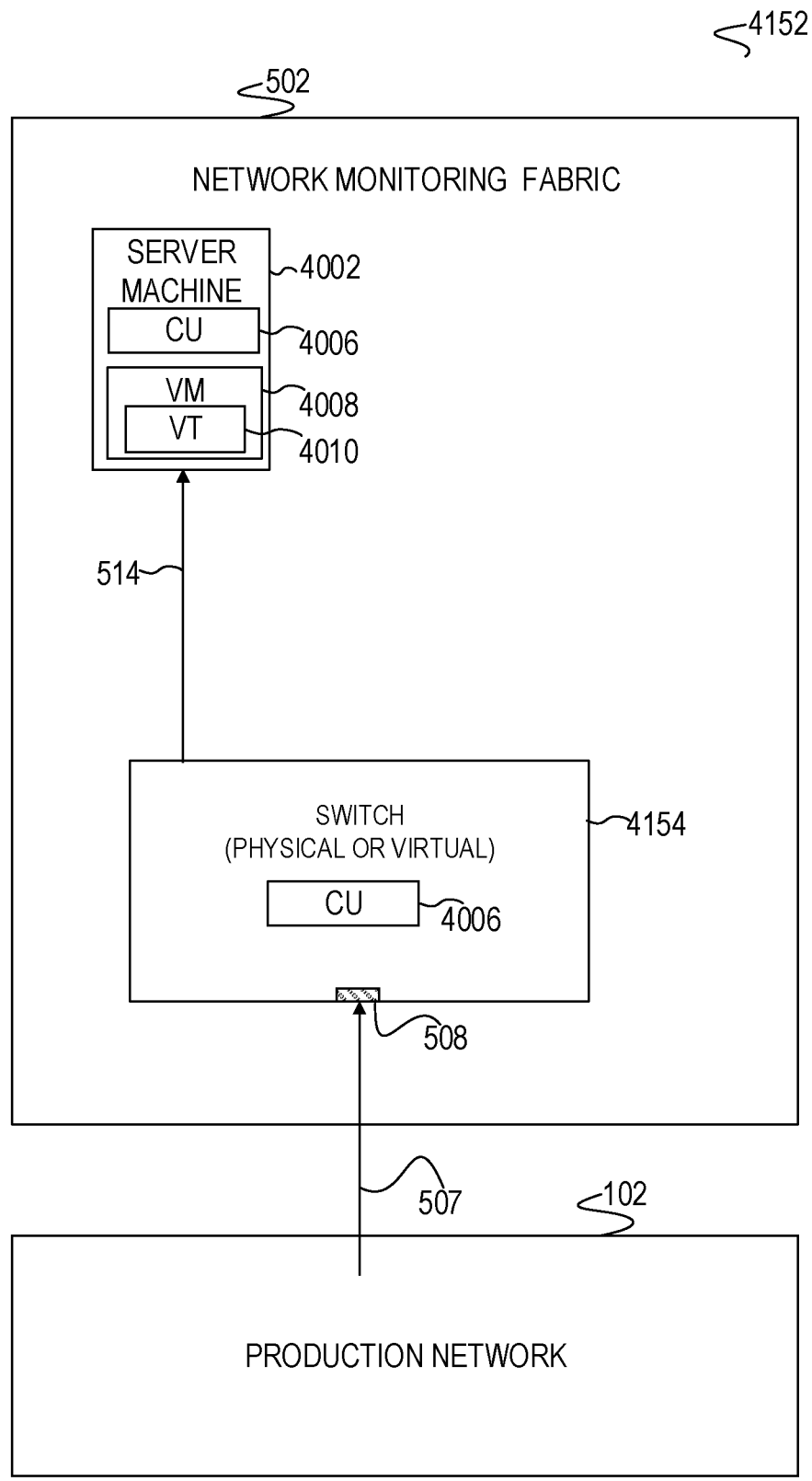
FIG. 5E is a block diagram illustrating a system, according to an embodiment, to automatically scale a virtual tool.

FIG. 5E is a block diagram illustrating a system 4152, according to an embodiment, to automatically scale a virtual tool. The system 4152 corresponds to the system 500 in FIG. 5A and the system 4000 in FIG. 5B. Accordingly, the same or similar references have been used to indicate the same or similar features unless otherwise indicated. The network monitoring fabric 502 includes a server machine 4002 including a virtual tool 4010 (e.g., first instance of a first virtual tool). The virtual tool 4010 may be associated with a policy instance 4308 (e.g., first policy instance) (not shown). The virtual tool 4010 is connected over a fabric link 514 (e.g., first fabric link) to a switch 4154 (e.g., physical switch 506/virtual switch 4012). The switch 4154 may include an ingress interface 508 that is connected to an ingress link 507 that is connected to a monitoring mechanism (e.g., SPAN port 114, tap 116) (not shown) (see FIG. 5B) in the production network 102. The ingress link 507 may receive traffic information 201 from the production network 102 that, in turn, is communicated by the switch 4154, over the network monitoring fabric 502, to the first instance of the first virtual tool 4010. It will be appreciated that for brevity sake multiple elements that were previously illustrated in the network monitoring fabric 502 and the production network 102 (e.g., production node, production link, SPAN port 114, tap 116, controller computer 512, control links 516, and the like) are not illustrated here but are nevertheless present. It will further be appreciated that one or more switches (e.g., physical switch 506/virtual switch 4012) may be between the switch 4154 and the server machine 4002. In this instance, the traffic information 201 may be forwarded over the one or more switches from the switch 4154 to the server machine 4002.

The system 4152 automatically scales the virtual tool 4010 (e.g., first instance of the first virtual tool) based on a predetermined threshold associated with the virtual tool 4010. For example, consider a virtual tool 4010 that measures the rate of web traffic (e.g., traffic information 201) and reaches its capacity to process the web traffic at a predetermined threshold rate (e.g., 5K packets per second). In this instance, the reliability of the virtual tool 4010 may be impaired because the rate of web traffic being measured exceeds the capacity of the virtual tool 4010 to process the web traffic. The system 4152 may identify the rate of web traffic (e.g., traffic information 201) has exceeded the predetermined threshold rate associated with the first instance of the virtual tool 4010 in multiple ways. According to a first embodiment, the controller computer 512 may receive a message that is pushed from the virtual tool 4010. For example, the virtual tool 4010 may identify the rate of web traffic has exceeded the predetermined threshold and, responsive to the identification, communicate a message to the controller computer 512 indicating the web traffic has exceeded the predetermined threshold.

According to a second embodiment, the controller computer 512 may receive messages from the virtual tool 4010 reporting the rate of web traffic. For example, the virtual tool 4010 may be configured by the controller computer 512 to periodically (e.g., 500 millisecond period) communicate a message to the controller computer 512, the message indicating the rate of the web traffic. In this example, the controller computer 512 may receive the message and identify the rate of web traffic has exceeded the predetermined threshold.

According to a third embodiment, the switch 4154 including the ingress interface 508 for receiving the traffic information 201 (e.g., web traffic) may identify the rate of web traffic has exceeded the predetermined threshold.

According to a fourth embodiment, a switch other than the switch including the ingress interface, that is used for forwarding the traffic information 201 (e.g., web traffic) to the virtual tool 4010 may identify the rate of web traffic has exceeded the predetermined threshold and communicate a message to the controller computer 512 indicating the same.

Figure 5F:
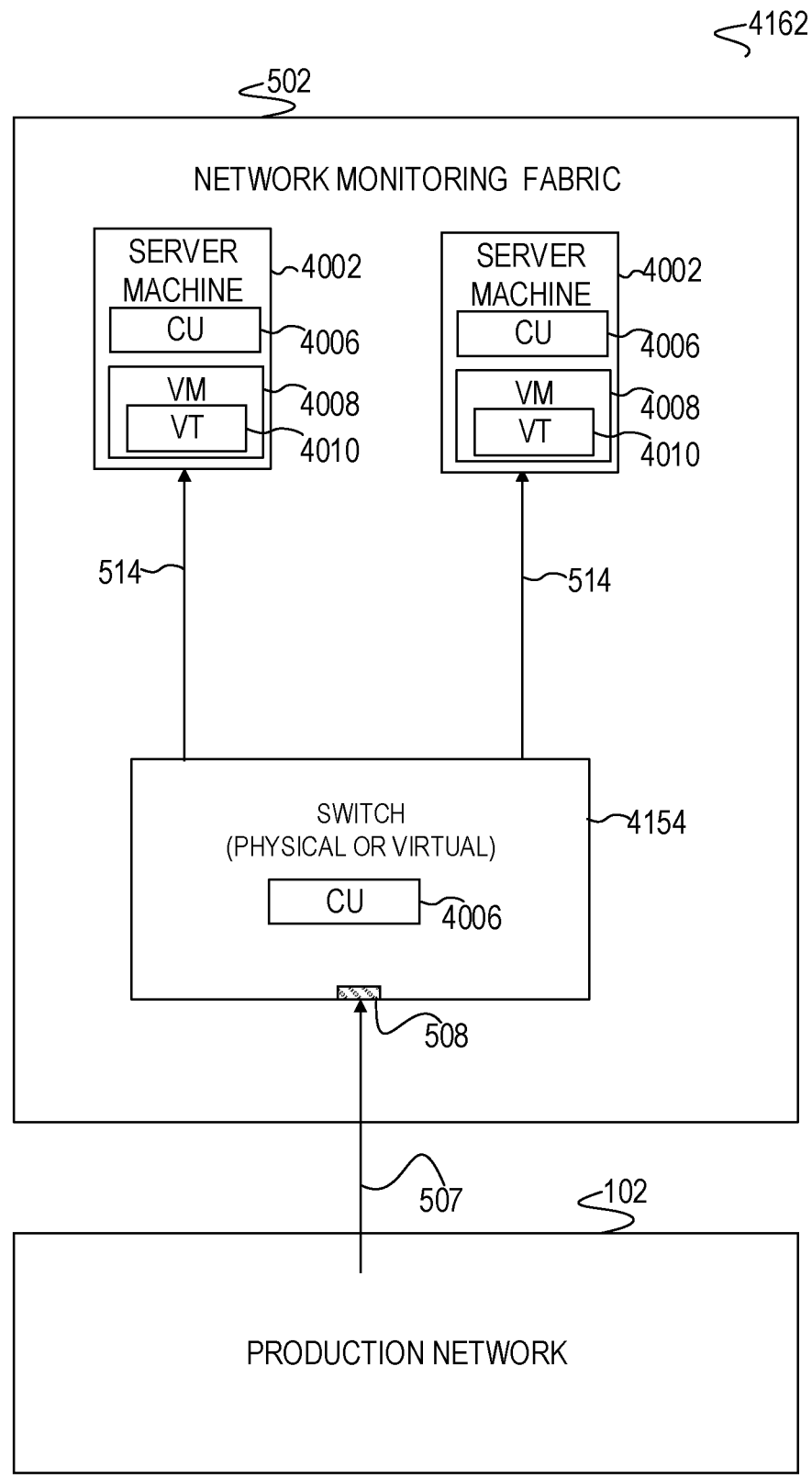
FIG. 5F is a block diagram illustrating a system, according to an embodiment, to automatically scale a virtual tool.
Figure 5G:
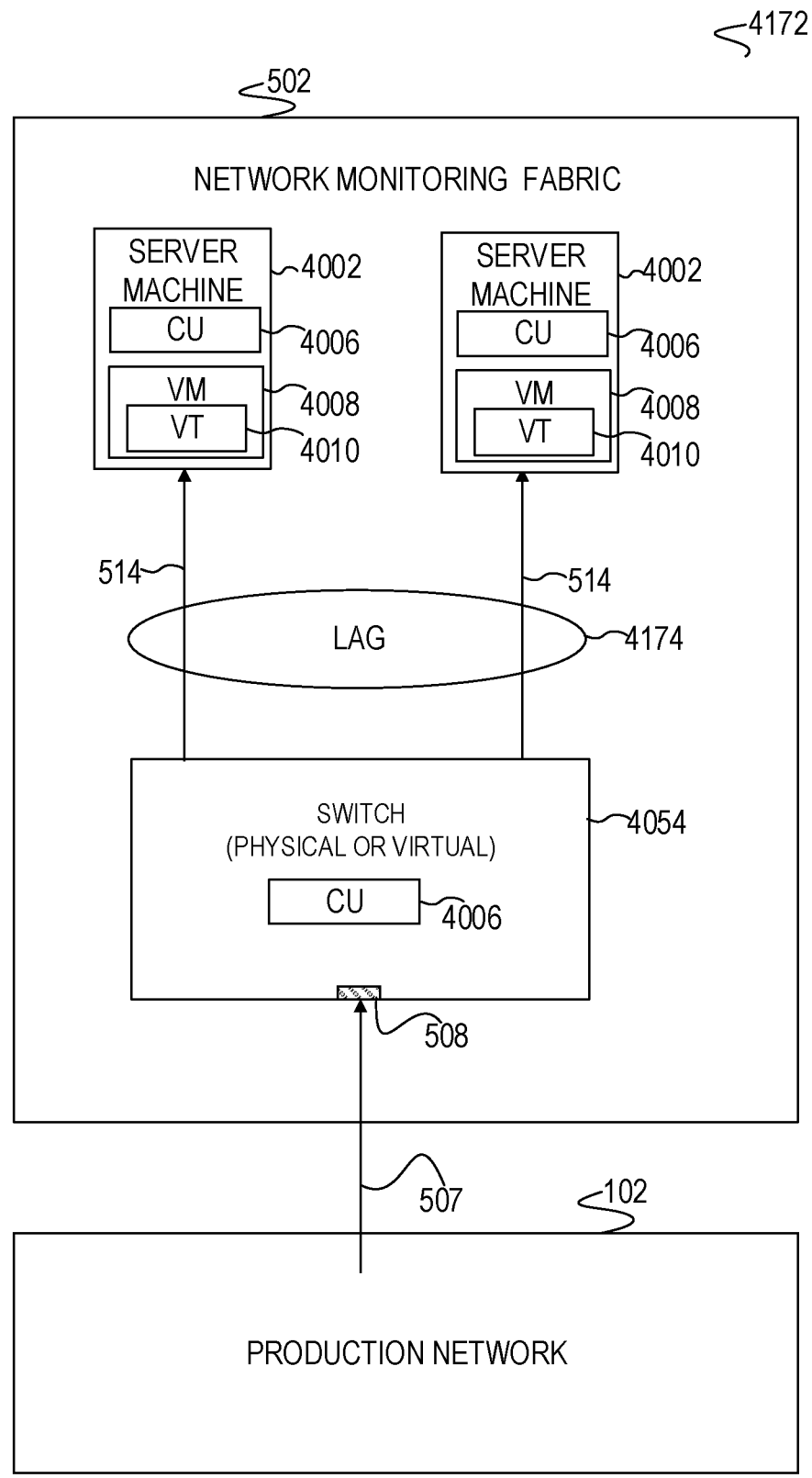
FIG. 5G is a block diagram illustrating a system, according to an embodiment, to automatically scale a virtual tool.

Responsive to identification of the rate of web traffic as exceeding the predetermined threshold, the controller computer 512 may automatically launch a second instance of the virtual tool 4010 (e.g., first virtual tool), as further illustrated in FIG. 5F and in FIG. 5G.

FIG. 5F is a block diagram illustrating a system 4162, according to an embodiment, to automatically scale a virtual tool. The system 4162 corresponds to the system 500 in FIG. 5A, the system 4000 in FIG. 5B, and the system 4152 in FIG. 5E. Accordingly, the same or similar references have been used to indicate the same or similar features unless otherwise indicated. The network monitoring fabric 502 includes a server machine 4002 on the left (e.g., first server machine) including a virtual tool 4010 (e.g., first instance of a first virtual tool) and a server machine 4002 on the right (e.g., second server machine) including a virtual tool 4010 (e.g., second instance of the first virtual tool). The first instance of the first virtual tool is connected over a fabric link 514 (e.g., first fabric link) to a switch 4154 (e.g., physical switch 506 or virtual switch 4012). In like manner, the second instance of the first virtual tool is connected over a fabric link 514 (e.g., second fabric link) to the switch 4154.

The system 4162 includes the controller computer 512 (not shown) analyzing the web traffic (e.g., first traffic information) and partitioning the web traffic based on sources of the web traffic. For example, the controller computer 512 may analyze the web traffic to identify a first set of hosts originating 52% of the web traffic in the production network 102 (e.g., numbered from 1-499). Further for example, the controller computer 512 may analyze the web traffic to identify a second set of hosts originate 48% of the web traffic in the production network are (e.g., numbered from 500 to 999). Continuing with the example, the controller computer 512 may partition the web traffic for the first set of hosts (e.g., second traffic information) to the first instance of a virtual tool 4010 (e.g., on the left) and the web traffic for the second set of hosts (e.g., third traffic information) to a second instance of the virtual tool 4010 (e.g., on the right).

Broadly, the system 4162 may operate as follows. First, the controller computer 512, may identify the rate of web traffic as exceeding the predetermined threshold. For example, the controller computer 512, may identify the rate of web traffic as exceeding the predetermined threshold as described in association with FIG. 5E. Second, the controller computer 512 may respond to the identification of the rate of web traffic as exceeding the predetermined threshold by allocating a policy instance 4308 (e.g., second policy instance) based on the first policy instance. For example, the controller computer 512 may identify the type of virtual tool 4010 being utilized based on the first policy instance and utilize the same type of virtual tool 4010 in the second policy instance. Continuing with the example, the controller computer 512 may identify whether a virtual machine 4008 or a docker container is being utilized in the first policy instance and utilize the same type of computing environment in the second policy instance.

Third, the controller computer 512 may identify a server machine (e.g., second server machine) and configure a server machine 4002 (e.g., second server machine) to host the second instance of the virtual tool 4010. For example, the controller computer 512 may identify a server machine 4002 by determining whether a server machine 4002 has processing capacity to host the second instance of the first virtual tool 4010. The controller computer 512 may identify the server machine 4002 by determining whether any server machine 4002 in the network monitoring fabric 502 has enough processing capacity to host the second instance of the first virtual tool 4010. Continuing with the example, the controller computer 512 may evaluate capacity for a single server machine 4002 by identifying the virtual tool(s) 4010 configured for each server machine 4008 and the processing burden associated with each of the virtual tool(s) 4010. Further, the controller computer 512 may configure the server machine 4002 as described in association with FIG. 9E.

Fourth, the controller computer 512 may reconfigure filtering for the first instance of the first virtual tool. For example, the controller computer 512 may configure the network monitoring fabric 502 to stop receiving all of the web traffic (e.g., first traffic information), as specified by the policy instance 4308 (e.g., first policy instance), and to start receiving web traffic for the first set of hosts (e.g., second traffic information) (e.g., second portion of the traffic information). The controller computer 512 may reconfigure the filtering as generally described in association with FIG. 6.

Fifth, the controller computer 512 may configure filtering for the second instance of the first virtual tool. For example, the controller computer 512 may configure the network monitoring fabric 502 to receive web traffic for the second set of hosts (e.g., third traffic information) (e.g., third portion of the traffic information). The controller computer 512 may configure filtering as generally described in association with FIG. 6.

Sixth, the controller computer 512 may configure the network monitoring fabric 502 to forward web traffic for the second set of hosts (e.g., third traffic information) (e.g., third portion of the traffic information) (e.g., traffic information 201) from the switch 4154 to the second instance of the first virtual tool. Recall that one or more switches (e.g., physical switch 506/virtual switch 4012) may be between the switch 4154 and the server machine 4002. In this instance, the traffic information 201 may be forwarded over the one or more switches from the switch 4154 to the server machine 4002 hosting the second instance of the first virtual tool. For example, the controller computer 512 may configure the one or more switches (e.g., physical switches 506/virtual switches 4012) to forward the third traffic information from the switch 4154 to the virtual tool 4010 (e.g., second instance of the first virtual tool) that is hosted in the second server machine. Further recall that the controller computer 512 need not configure the network monitoring fabric 502 to forward web traffic for the first set of hosts (e.g., second traffic information) (e.g., second portion of the traffic information) (e.g., traffic information 201) as this has already been configured responsive to the "add policy" command.

FIG. 5G is a block diagram illustrating a system 4172, according to an embodiment, to automatically scale a virtual tool. The system 4172 corresponds to the system 500 in FIG. 5A, the system 4000 in FIG. 5B, and the system 4152 in FIG. 5E. Accordingly, the same or similar references have been used to indicate the same or similar features unless otherwise indicated. The system 4172 includes a server machine 4002 on the left including a virtual tool 4010 (e.g., first instance of a first virtual tool) and a server machine 4002 on the right including a virtual tool 4010 (e.g., second instance of the first virtual tool). The first instance of the first virtual tool is connected over a fabric link 514 (e.g., first fabric link) to a switch 4154 (e.g., physical switch 506). In like manner, the second instance of the first virtual tool is connected over a fabric link 514 (e.g., second fabric link) to the switch 4154. The first fabric link and the second fabric link are treated by the switch 4154 as members of a link aggregation group 4174 (LAG). For example, the first fabric link is a first member of the link aggregation group 4174 and the second fabric link is a second member of the link aggregation group 4174. As is known by one having ordinary skill in the art, a link aggregation group 4174 has member links (e.g., first fabric link, second fabric link) that operate as a single logical link (e.g., single trunk). For example, the bandwidth of the single logical link may be the combined bandwidth the member links in a link aggregation group 4174. In one embodiment, the member links operate at the same speed.

Broadly, the system 4172 may operate as follows. First, the controller computer 512 may identify the rate of web traffic as exceeding the predetermined threshold, as described in association with FIG. 5E.

Second, the controller computer 512 may respond to web traffic exceeding the predetermined threshold by identifying a server machine (e.g., second server machine) to host the second instance of the virtual tool 4010 and configuring the server machine. For example, the controller computer 512 may identify the server machine 4002 by determining whether any server machine 4002 in the network monitoring fabric 502 has enough processing capacity to host the second instance of the first virtual tool 4010. Continuing with the example, the controller computer 512 may evaluate capacity for a single server machine 4002 by identifying the virtual tool(s) 4010 configured for each server machine 4008 and the processing burden associated with each of the virtual tool(s) 4010. The controller computer 512 may configure the second server machine based on the first policy instance. For example, the controller computer 512 may identify the type of virtual tool 4010 based on the first policy instance and configure the second server machine to host the same type of virtual tool 4010. Further for example, the controller computer 512 802 may identify whether a virtual machine 4008 or a docker container is being utilized based on the first policy instance and configure the second server machine accordingly. In one example, the controller computer 512 may configure the server machine 4002 as described in association with FIG. 9E.

Third, the controller computer 512 may configure one or more switches in the network monitoring fabric 502 to forward the first traffic information from the switch 4154, over the second fabric link included in the link aggregation group, to the second instance of the first virtual tool. Recall that the one or more switches (e.g., physical switch 506/ virtual switch 4012) may be between the switch 4154 and the second server machine. In this instance, the traffic information 201 may be forwarded from the switch 4154, over the fabric link 514 on the right (e.g., second member of the link aggregation group), via the one or more switches to the server machine 4002 hosting the second instance of the first virtual tool. Further recall that the controller computer 512 need not configure the network monitoring fabric 502 to forward traffic information 201 from the switch 4154 to the second instance of the first virtual tool as this has already been configured responsive to the "add policy" command.

Figure 6:
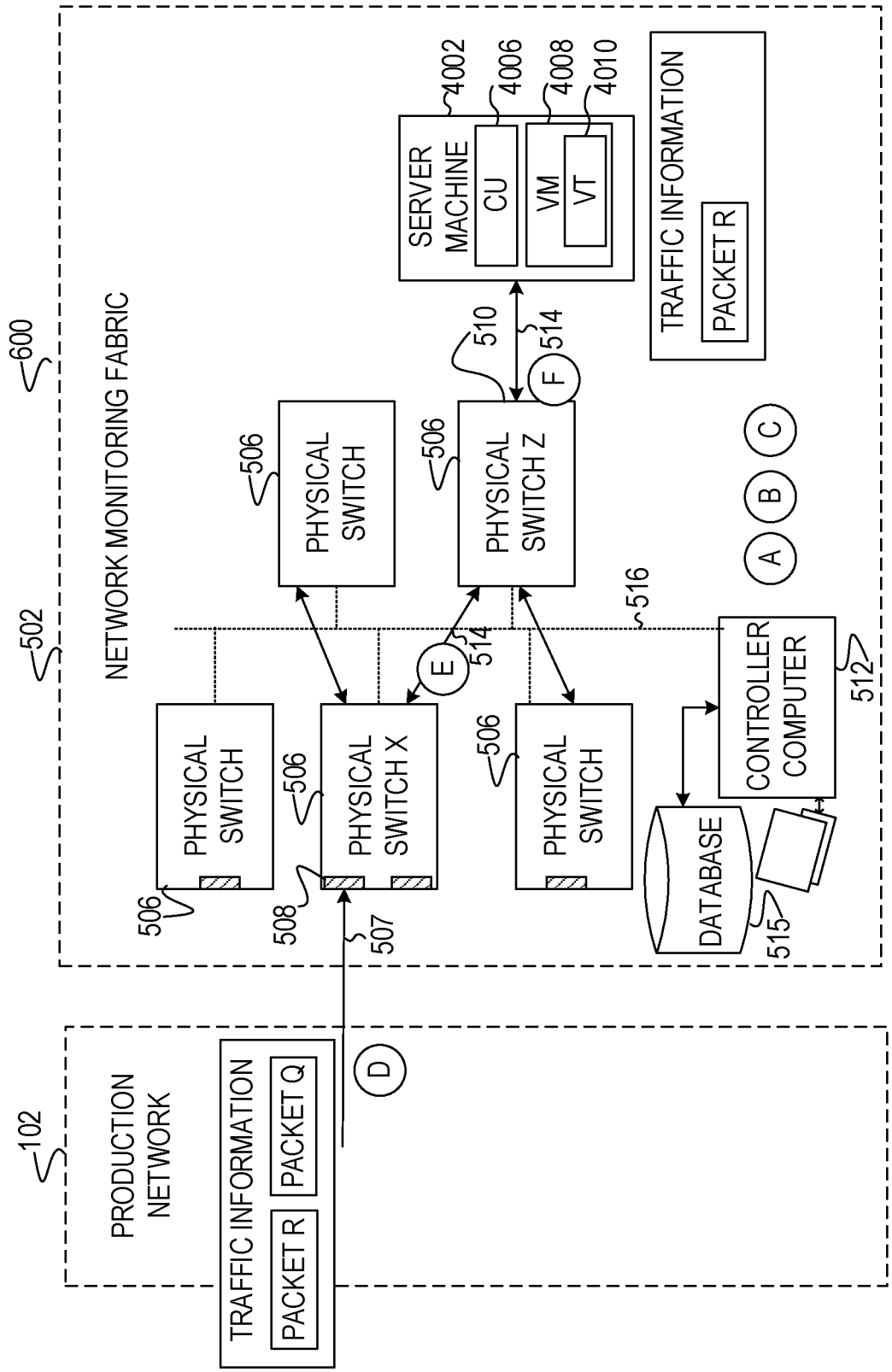
FIG. 6 is a block diagram illustrating a system, according to an embodiment, to filter traffic information.

FIG. 6 is a block diagram illustrating a system 600, according to an embodiment, to filter traffic. The system 600 illustrates, in further detail, the controller computer 512 configuring the filtering and forwarding of traffic information 201. In addition, the system 600 further illustrates the filtering and forwarding of the traffic information 201.

Configuring, Filtering and Forwarding

At operation "A," the controller computer 512 may communicate configuration information over the control link 516 to the physical switch "X" 506. For example, according to an embodiment, the configuration information may be received and executed by the physical switch "X" 506 to configure the physical switch "X" 506 to filter the traffic information 201 entering the physical switch "X" 506 at the upper ingress interface 508 to match the traffic type "web traffic." At operation "B," according to an embodiment, the controller computer 512 may communicate configuration information over the control link 516 to the physical switch "X" 506 that configures the physical switch "X" 506 to forward matching traffic information 201 to the physical switch "Z" 506. Accordingly, the configuration information may be utilized to configure the physical switch "X" 506 to receive traffic information 201 on the upper ingress interface 508, identify a matching type of traffic information 201 (e.g., web traffic), and forward the matching traffic information 201 over the fabric link 514 that is connected to the physical switch "Z" 506. At operation "C," the controller computer 512 may communicate configuration information over the control link 516 to the physical switch "Z" 506 to forward the traffic information 201 that is being received on the fabric link 514 connected to the physical switch "X" 506 onto the egress link 511. For example, the configuration information may be utilized to configure the physical switch "Z" 506 to receive traffic information 201 on the fabric link 514 connected to the physical switch "X" 506 and to forward the traffic information 201 out the egress interface 510 onto the egress link 511. According to another embodiment, one or more virtual switches 4012 may be utilized in place of the physical switch "X" 506 and/or the physical switch "Z" 506.

Filtering and Forwarding

At operation "D," the physical switch "X" 506 may receive the traffic information 201 entering at the upper ingress interface 508 and filter the traffic information 201. For example, the physical switch "X" 506 may receive "PACKET Q" and "PACKET R" on the upper ingress interface 508 and identify the field for traffic type in the "PACKET R" as matching the traffic type of "web traffic" and identify the field for traffic type in the "PACKET Q" as not matching the traffic type of "web traffic." At operation "E," the physical switch "X" 506 forwards the matching "PACKET R" over the fabric link 514 connected to the physical switch "Z" 506 in response to identifying the match. At operation "F," the physical switch "Z" 506 forwards the "PACKET R" that is received on the fabric link 514 connected to the physical switch "X" 506 over the fabric link 514 that is connected to the server machine 4002 and specifically to the virtual tool 4010 that is hosted by the virtual machine 4008 that is hosted by the server machine 4002. In another example, the physical switch "Z" 506 forwards the "PACKET R" that is received on the fabric link 514 connected to the physical switch "X" 506 out an egress interface 510 (not shown) onto an egress link 511 (not shown) that is connected to a tool 106 (not shown) in a tool farm 504 (not shown). According to another embodiment, one or more virtual switches 4012 may be utilized in place of the physical switch "X" 506 and/or the physical switch "Z" 506.

FIG. 7 is a block diagram illustrating a system 700, according to an embodiment. The system 700 further illustrates components and operation of the physical switch 506. The physical switch 506 may include a receiving module 702, a processing module 704, filtering information 706, and a switching mesh 708 (e.g., application specific integrated circuit (ASIC)). The receiving module 702 may receive the configuration information from the controller computer 512. The processing module 704 may utilize the configuration information to configure the switching mesh 708. Merely for example, the physical switch 506 may include ports that are numbered from the top left, moving clockwise, including a first ingress interface 508 at port "0," a first fabric link 514 at port "1," a second fabric link 514 at port "2," a third fabric link 514 at port "3," and a second ingress interface 508 at port "4." Accordingly, the processing module 704 may utilize the port numbering scheme and the configuration information to forward the traffic information 201. Other port numbering schemes are also appropriate.

Illustrated on the left is traffic information 201 in the form of a packet including a header, payload, and trailer. The contents of the packet may be matched as a precondition for forwarding. One having ordinary skill in the art recognizes that standard byte and bit offsets from the beginning of the packet contain protocol-specific information that may be matched. To this end, the receiving module 702 may receive the configuration information and the processing module 704 may utilize the configuration information to program the switching mesh 708 to match the protocol-specific information. In addition, the switching mesh 708 may be programmed to match non-protocol-specific information. Further, the processing module 704 may program the switching mesh 708 to identify whether the filtering information 706 in the form of a first parameter matches the contents of the payload of a packet. More specifically, the switching mesh 708 may identify whether configuration information in the form of a first parameter matches a third byte of a packet that is received on the first ingress interface 508 at port "0." The first parameter may include numeric, alphabetic (e.g., ASCII), or alphanumeric data. In some embodiments, the configuration information may include a rule that is used to filter (e.g., match) the traffic information 201. In some embodiments, the rule may include one or more Boolean operators. For example, the rule may identify a match based on the first parameter matching the third byte of the packet AND a second parameter matching a fifth byte of the packet. Other operators (e.g., OR, EXCLUSIVE OR, etc.) may be utilized. Further, for example, the processing module 704 may program the switching mesh 708 to perform an action in response to identifying a match. For example, the processing module 704 may program the switching mesh 708 to forward a packet out the second fabric link 514 at port "2" in response to identifying a match in the packet that is being received on the first ingress interface 508 at port "0." Further, according to some embodiments, the processing module 704 may program the switching mesh 708 to forward a packet out multiple ports in response to the identification of a match.

In some network monitoring fabrics, the physical switch 506 may be embodied as a white box switch. A white box switch may be acquired from a vendor as a generic switch (e.g., Ethernet) without a network operating system or software applications, thereby enabling the purchaser to install a network operating system and software applications of their choice. Alternatively, the white box switch may be acquired from a vendor that includes the network operating system and/or software applications. Nevertheless, the choice remains with the purchaser. The network operating system and the software applications enable the white box switch to switch (e.g., forward) traffic information 201. According to another embodiment, the physical switch 506 may be embodied as a virtual switch 4012.

Figure 8A:
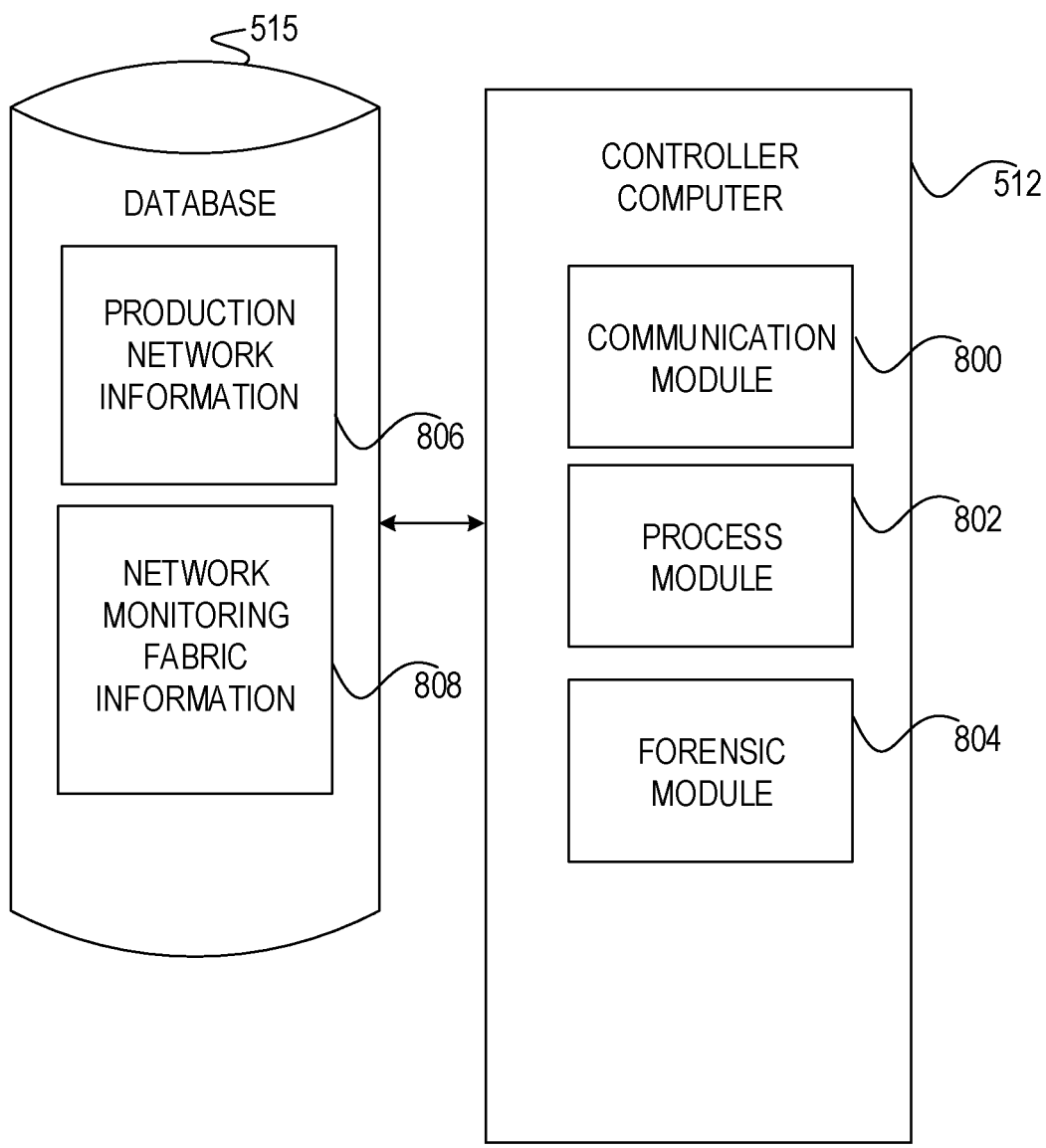
FIG. 8A is a block diagram illustrating a controller computer coupled to a database, according to an embodiment.

FIG. 8A is a block diagram illustrating the controller computer 512 communicatively coupled to the database 515, according to an embodiment. The controller computer 512 may include a communication module 800, a process module 802, and a forensic module 804. The communication module 800 may communicate with the physical switches 506, the server machines, the special service computer 518, and the packet recorder machine 4004 over the control link 516. For example, the communication module 800 may communicate configuration information to the physical switches 506, the server machines, the special service computer 518, and the packet recorder machine 4004. Further, the communication module 800 may receive traffic information 201 from the server machines, the special service computer 518, and the packet recorder machine 4004. The process module 802 may process communications, process commands, store data to the database 515, retrieve data from the database 515, and facilitate the presentation of user interfaces. The forensic module 804 may also be utilized to receive commands from the monitor, query the database 515, generate a user interface, and display user interface on the monitor. The database 515 may include production network information 806 describing the production network 102 and network monitoring fabric information 808 describing the network monitoring fabric 502.

Figure 8B:
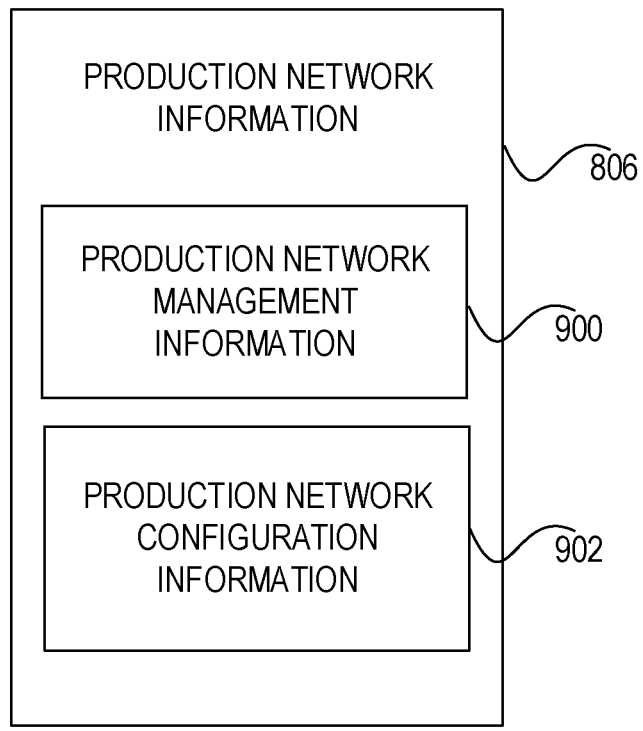
FIG. 8B is a block diagram illustrating production network information, according to an embodiment.

FIG. 8B is a block diagram illustrating production network information 806, according to an embodiment. The production network information 806 describes the production network 102 and includes the production network management information 900 and production network configuration information 902.

Figure 8C:
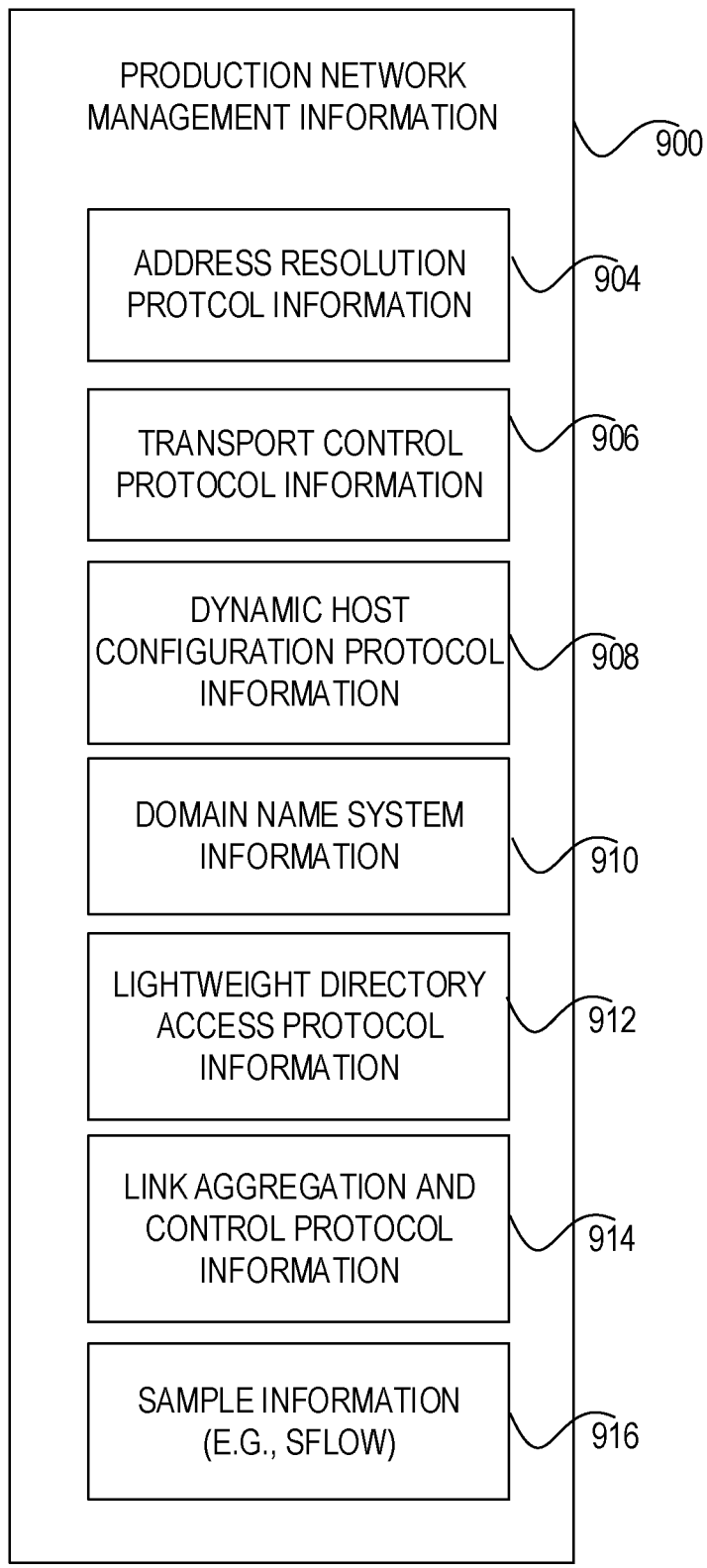
FIG. 8C is a block diagram illustrating production network management information, according to an embodiment.

FIG. 8C is a block diagram illustrating production network management information 900, according to an embodiment. The production network management information 900 generally includes protocol information that is received from the production network 102. The protocol information may include protocol messages and other information that is being communicated in the production network 102. Further, each protocol message that is stored as production network management information 900 may be associated with a physical switch identifier that identifies a physical switch 506 in the network monitoring fabric 502, an ingress interface identifier that identifies an ingress interface 508 in the network monitoring fabric 502, and a monitoring mechanism identifier that identifies a monitoring mechanism (e.g., SPAN port 114, tap 116) in the production network 102. The physical switch identifier, ingress interface identifier, and monitoring mechanism identifier describe a path to an access point in the production network 102 that was utilized to receive the traffic information 201 that includes the protocol message. For example, the monitoring mechanism identifier may identify the monitoring mechanism (e.g., SPAN port 114, tap 116) that received the protocol message from the production network 102, the ingress interface identifier may identify the ingress interface 508 that received the protocol message, and the physical switch identifier may identify the physical switch 506 that received the protocol message. The protocol information may be time-stamped. For example, the protocol information may be time-stamped with a date and time of receipt, as recorded by the special service computer 518. The production network configuration information 902 may include network elements in the production network 102. The production network configuration information 902 may be identified based on the production network management information 900.

The production network management information 900 may include address resolution protocol (ARP) information 904 (e.g., ARP protocol messages), transport control protocol (TCP) information 906 (e.g., TCP protocol messages), dynamic host configuration protocol (DHCP) information 908 (e.g., DHCP protocol messages), domain name system (DNS) information 910 (e.g., DNS protocol messages), lightweight directory access protocol (LDAP) information 912 (e.g., LDAP protocol messages), link aggregation control protocol (LACP) information 914 (e.g., LACP protocol messages), and sample information 916 (e.g., sFlow®) (e.g., sample messages).

The ARP information 904 may be received from the production network 102 as traffic information 201 and stored in the database 515. ARP is a network layer protocol used to convert an Internet protocol (IP) address into a physical address, such as an Ethernet address (e.g., media access control (MAC) address). A host wishing to obtain a physical address broadcasts an ARP request onto the TCP/IP network. The host on the network that has the IP address in the request then replies with its physical hardware address. Accordingly, the ARP information 904 may include an IP address associated with a physical address, such as an Ethernet address (e.g., MAC address).

The TCP information 906 may be received from the production network 102 as traffic information 201 and stored in the database 515. TCP enables two hosts to establish a connection and exchange streams of data. TCP guarantees delivery of data and also guarantees that packets will be delivered in the same order in which they were sent.

The DHCP protocol information 908 may be received from the production network 102 as traffic information 201 and stored in the database 515. DHCP assigns dynamic IP addresses to devices on a network, assigning a different IP address every time a device connects to the network.

The DNS information 910 may be received from the production network 102 as traffic information 201 and stored in the database 515. The DNS is an Internet service that translates domain names into IP addresses.

The LDAP information 912 may be received from the production network 102 as traffic information 201 and stored in the database 515. LDAP is a set of protocols for accessing information directories based on the standards contained within the X.500 standard, but is significantly simpler.

The LACP information 914 may be received from the production network 102 as traffic information 201 and stored in the database 515. LACP may be utilized to identify traffic information 201 that is being communicated over two physical communication links (e.g., production links 110) as being communicated over a single logical communication link.

The sample information (e.g., sFlow®) 916 may be received from the production network 102 as a sampling of the traffic information 201 that is being communicated over the production network 102. The sampling of the traffic information 201 may be stored in the database 515. The sampling of the traffic information 201 may utilize machine learning algorithms including a K-Means learning algorithm, a Naive Bayes Filter machine learning algorithm, a C4.5 machine learning algorithm, a C5.0 machine learning algorithm, a J48 machine learning algorithm, and/or a random forest machine learning algorithm. Merely for example, the machine learning algorithm may be embodied as sFlow®, an industry standard technology for monitoring high speed switched networks. sFlow® may provide visibility into the utilization of networks enabling performance optimization, accounting/billing for usage, and defense against security threats.

Figure 8D:
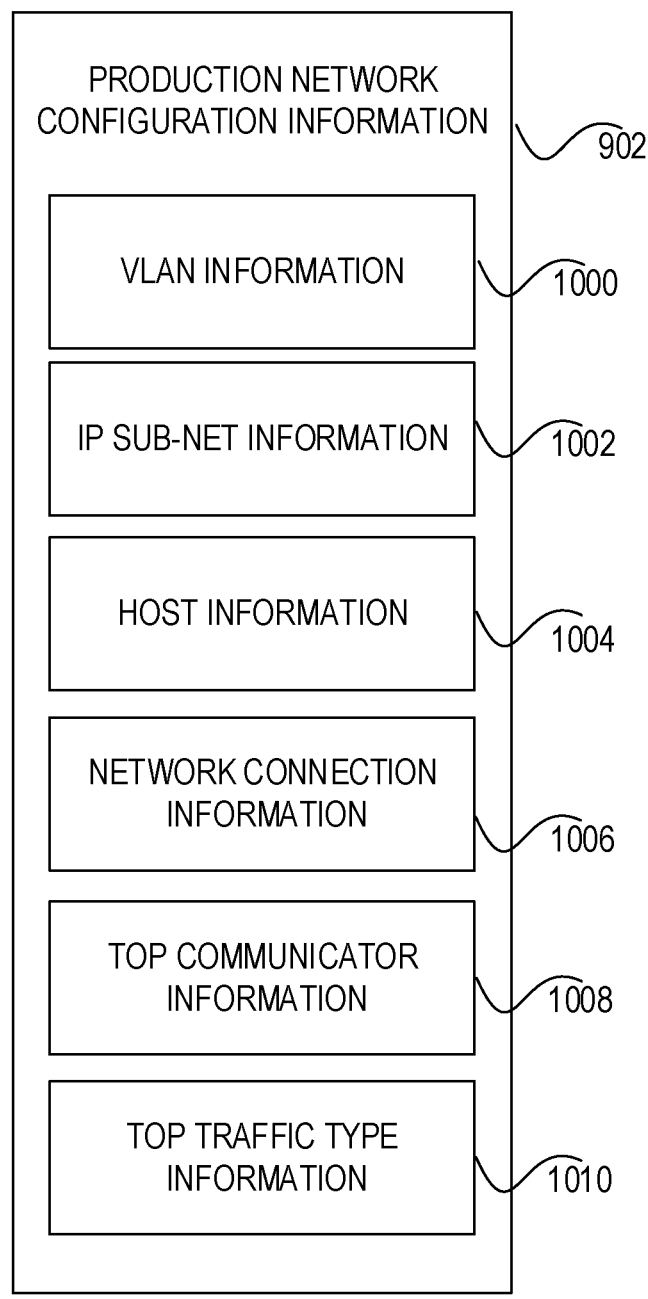
FIG. 8D is a block diagram illustrating production network configuration information, according to an embodiment.

FIG. 8D is a block diagram illustrating the production network configuration information 902, according to an embodiment. The production network configuration information 902 describes network elements in the production network 102. The production network configuration information 902 may be generated based on the production network management information 900. For example, the process module 802 may generate the production network configuration information 902 based on the production network management information 900. The production network configuration information 902 may include virtual local area network (VLAN) information 1000, IP sub-net information 1002 (e.g., IP subnet protocol information), host information 1004, network connection information 1006, top communicator information 1008, and top traffic type information 1010.

The VLAN information 1000 may describe LANs in the production network 102. The VLAN information 1000 may be generated based on the production network management information 900. A VLAN is a group of end stations (e.g., devices 112) with a common set of specifications, independent of the physical location of the end stations. VLANs may include the same attributes as physical LANs but enable the grouping of end stations (e.g., devices 112) notwithstanding the physical location of the end station not being on the same LAN segment. The VLAN information 1000 may include device identifiers and LAN identifiers. The VLAN information 1000 may be generated by the process module 802 based on the production network management information 900 and may be utilized by the forensic module 804 to generate and display portions of the user interfaces described in FIG. 12 through FIG. 18.

The IP subnet protocol information 1002 may describe IP sub-networks in the production network 102. The IP subnet protocol information 1002 may be generated based on the production network management information 900. A sub-network, or subnet, is a logical, visible subdivision of an IP network. The practice of dividing a network into two or more networks is called subnetting. Accordingly, the IP subnet protocol information 1002 may associate each subnet with one or more devices (e.g., device 112) that are included in the subnet. The IP subnet protocol information 1002 may be generated by the process module 802 based on the production network management information 900 and may be utilized by the forensic module 804 to generate and display portions of the user interfaces described in FIG. 12A through FIG. 12G.

The host information 1004 may describe hosts in the production network 102. The host information 1004 may be generated based on the production network management information 900. A host may include a device (e.g., device 112) that is utilized to provide access to a website or other data on the device (e.g., device 112). Accordingly, the host information 1004 may include a host name in association with an IP address, a media access control (e.g., MAC) address, a vendor identifier, a VLAN identifier, and other information. The host information 1004 may be generated by the process module 802 based on the production network management information 900 and may be utilized by the forensic module 804 to generate and display portions of the user interfaces described in FIG. 12A through FIG. 12G.

The network connection information 1006 may describe network connections in the production network 102. The network connection information 1006 may be generated based on the production network management information 900. The network connection information 1006 may include a network address of a TCP client host, a name of the TCP client host (e.g., universal resource identifier), a network address of a TCP server host, and the name of the TCP server host (e.g., universal resource identifier). The network connection information 1006 may be generated by the process module 802 based on the production network management information 900 and may be utilized by the forensic module 804 to generate and display portions of the user interfaces described in FIG. 12A through FIG. 12G.

The top communicator information 1008 may describe the top communicators in the production network 102. The top communicator information 1008 may be generated based on the production network management information 900. The top communicator information 1008 may include a list of most active hosts in the production network 102. For example, the top communicator information 1008 may include a list of the ten most active hosts in the production network 102. The most active hosts may be identified based on the number of connections, the length in time of the connections, and/or the number of packets originated or received. The top communicator information 1008 may be based on the other types of production network configuration information 902.

The top traffic type information 1010 describes the top types of traffic information 201 being communicated in the production network 102. The types of traffic information 201 in the production network 102 may include database traffic (e.g., query and response), web traffic, voice traffic, and other applications and services. Further, the types of traffic information 201 may be classified according to classifiers including port number, deep packet inspection, statistical classification, and the like. The port type of traffic information 201 may include traffic information 201 that is transmitted from a port or received on a port. The port type of traffic information 201 may be classified according to speed, applications and services, and other classifiers. The deep packet inspection type of traffic information 201 may include traffic information 201 that is identified based on a packet inspection of the payload of the packet. Deep packet inspection may detect applications and services regardless of the port number on which they originate or terminate. The statistical type of traffic information 201 may include traffic information 201 that is sampled from the traffic information 201. The statistical type of traffic information 201 may include a statistical analysis of attributes, including a statistical analysis of byte frequencies, a statistical analysis of packet sizes, and a statistical analysis of packet inter-arrival times. The top traffic type information 1010 may be generated by the process module 802 based on the production network management information 900 and may be utilized by the forensic module 804 to generate and display portions of the user interfaces described in FIG. 12A through FIG. 12G.

Figure 8E:
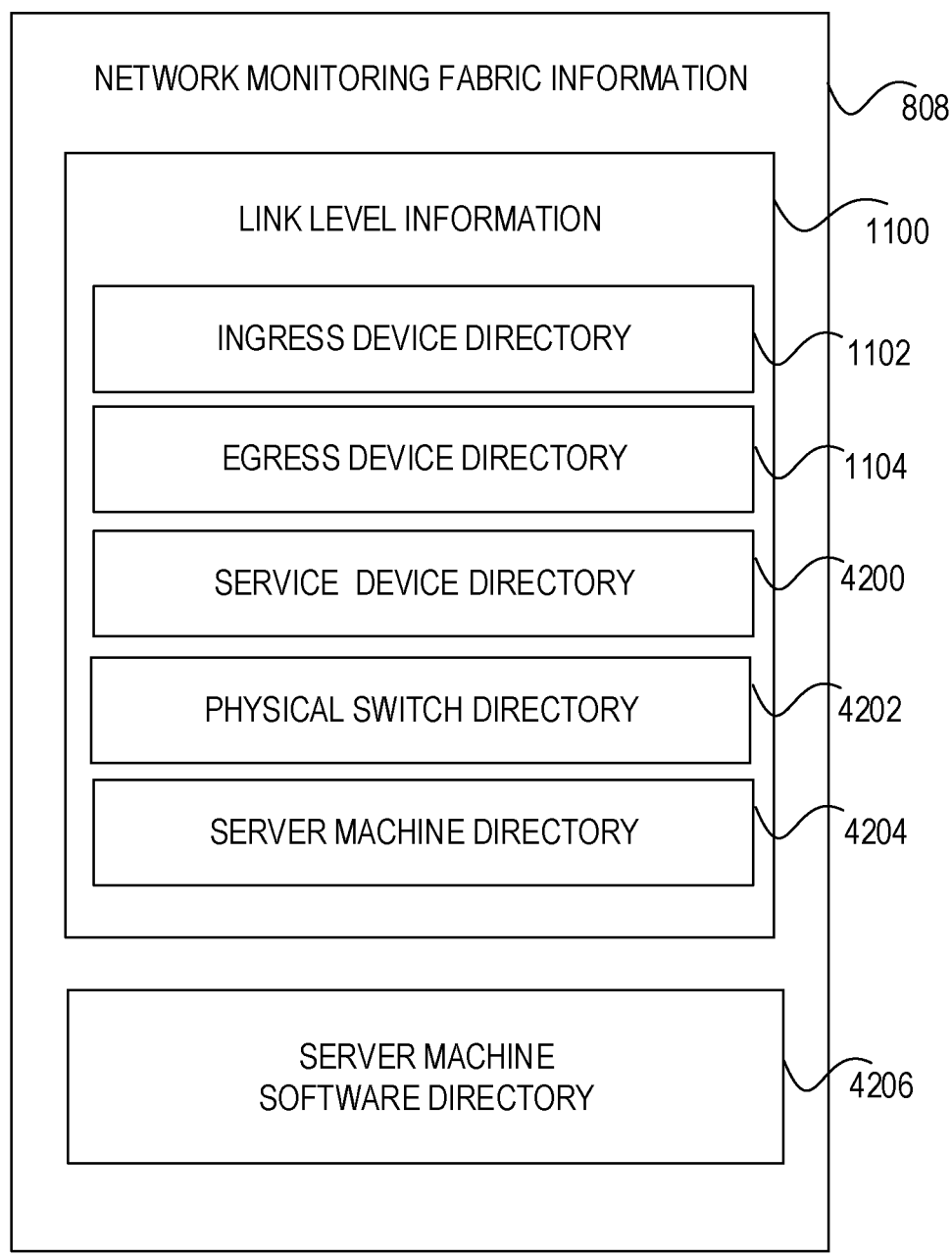
FIG. 8E is a block diagram illustrating network monitoring fabric information, according to some example embodiments.

FIG. 8E is a block diagram illustrating the network monitoring fabric information 808, according to some example embodiments. The network monitoring fabric information 808 may include link level information 1100 and a server machine software directory 4206. The link level information 1100 may describe network elements that are immediately connected to the network monitoring fabric 502 and network elements included in the network monitoring fabric 502. For example, the process module 802 may automatically detect physical devices connected to the ports on the network monitoring fabric 502 and physical devices in the network monitoring fabric 502 by processing link-level protocol (LLP) packets.

The link level information 1100 includes an ingress device directory 1102, an egress device directory 1104, a service device directory 1106, a physical switch directory 4202, and a server machine directory 4204. The ingress device directory 1102 may include device identifiers that identify devices (e.g., monitoring devices (e.g., taps 116, SPAN ports 114)) connected to ingress interfaces 508. The egress device directory 1104 may include device identifiers that identify devices connected to egress interfaces 510 (e.g., client machines 104). The service device directory 1106 may include device identifiers that identify special service devices included in the network monitoring fabric 502 including packet recorder machine identifiers that identify packet recorder machines 4004 and special service computer identifiers that identify special service computers 518. The server machine directory 4204 may include device identifiers that identify server machines 4002 included in the network monitoring fabric 502 including packet recorder machine identifiers that identify server machines 4002.

The server machine software directory 4206 stores software that may be loaded onto server machines 4002. For example, the server machine software directory 4206 may store operating system software, library software, virtual tool monitor software, a virtual tool market including virtual tool software, and the like for downloading to a server machine 4002.

Figure 8F:
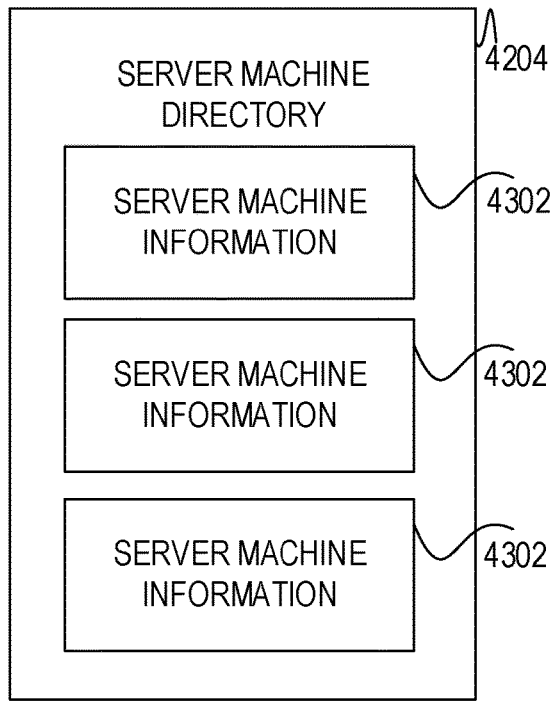
FIG. 8F is a block diagram illustrating a server machine directory, according to some example embodiments.

FIG. 8F is a block diagram illustrating a server machine directory 4204, according to some example embodiments. The server machine directory 4204 may include one or more entries of server machine information 4302. Each server machine information 4302 corresponds to a server machine 4002 detected on the network monitoring fabric.

Figure 8G:
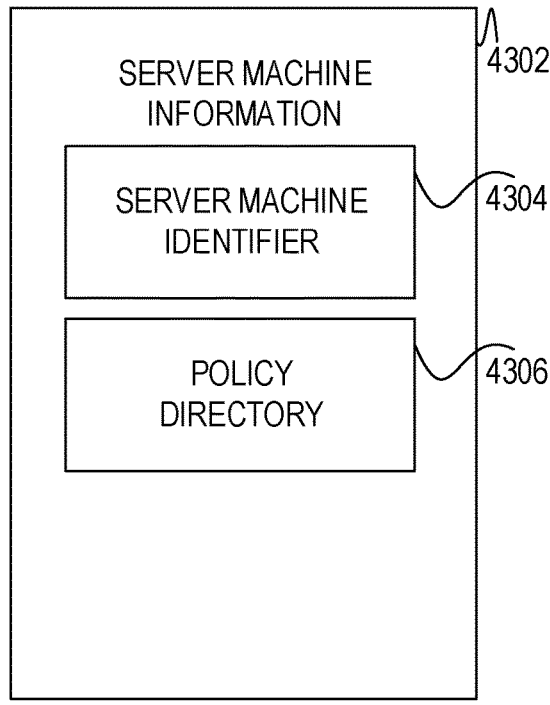
FIG. 8G is a block diagram illustrating server machine information, according to some example embodiments.

FIG. 8G is a block diagram illustrating server machine information 4302, according to some example embodiments. The server machine information 4302 stores information describing a single server machine. The server machine information 4302 includes a server machine identifier 4304 and a policy directory 4306. The server machine identifier 4304 uniquely identifies the server machine 4002 on the network monitoring fabric. The policy directory 4306 stores all policy instances associated with the server machine 4002.

Figure 8H:
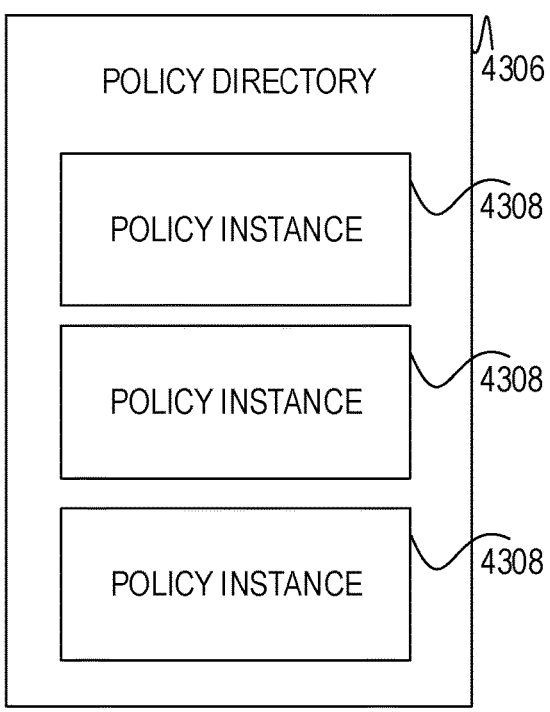
FIG. 8H is a block diagram illustrating a policy directory, according to some example embodiments.

FIG. 8H is a block diagram illustrating a policy directory 4306, according to some example embodiments. The policy directory 4306 stores policy instances 4308. A policy instance 4308 is added to the policy directory 4306 with an execution of the "add policy" command. A policy instance 4308 is deleted from the policy directory with an execution of the "delete policy" command.

Figure 8I:
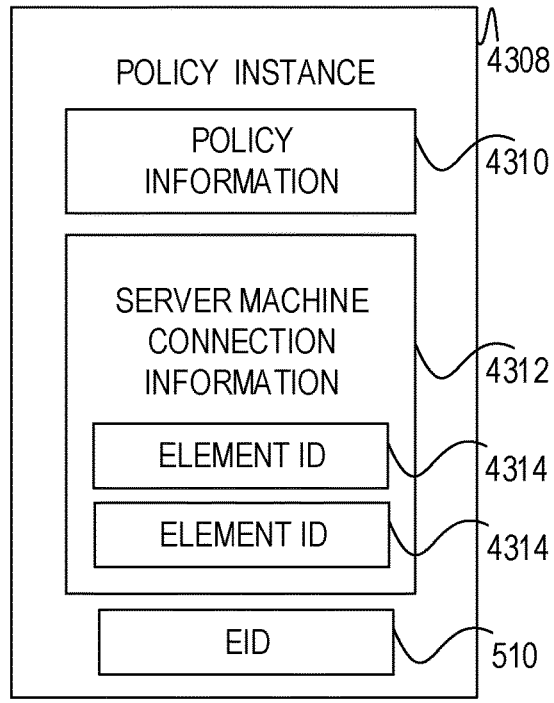
FIG. 8I is a block diagram illustrating a policy instance, according to some example embodiments.

FIG. 8I is a block diagram illustrating a policy instance 4308, according to some example embodiments. The policy instance 4308 stores information for a single policy. The policy instance 4308 may include policy information 4310, server machine connection information 4312, and an optional egress identifier that identifies an egress interface 510. The policy information 4310 may store the parameters received with an "add policy" command. The server machine connection information 4312 may include element identifiers 4314 that identify a sequence of server machine elements that are connected to transport the traffic information 201 through the server machine 4002 to a virtual tool 4010. The element identifiers 4314 may include a network interface card identifier that identifies a network interface card 4118, a virtual switch identifier that identifies a virtual switch 4012, a virtual network interface card identifier that identifies a virtual network interface card 4098, a virtual machine identifier that identifies a virtual machine 4008, a docker container identifier that identifies a docker container, or a virtual tool identifier that identifies a virtual tool 4010, as described in association with the "add policy" command 4054 illustrated in FIG. 5C.

For example, the server machine connection information 4312 may include a server machine identifier, a network interface identifier, a virtual network interface identifier, a virtual machine identifier, and a virtual tool identifier. The server machine identifier and the network interface identifier may cause the process module 802 to configure the identified network interface card 4118 to receive the traffic information 201 for the identified virtual tool 4010 from a fabric link 514 connected to the network interface card 4118 at the identified server machine 4002. For example, the network interface card 4118 may be configured to match information in a packet being communicated on the fabric link 514, like the switching mesh 708 as described in FIG. 7. Next, the network interface identifier and the virtual network interface identifier may cause the process module 802 to configure a first connection between the identified network interface card 4118 and the identified virtual network interface card 4098 to communicate the traffic information 201 for the identified virtual tool 4010. Next, the virtual network interface identifier and the virtual machine identifier cause the process module 802 to configure a second connection between the identified virtual network interface card 4098 and the identified virtual machine 4008 to communicate the traffic information 201 for the identified virtual tool 4010. Finally, the identified virtual machine 4008 includes the virtual tool 4010 that processes the traffic information 201.

In another example, a virtual switch 4012 may be included in the server machine connection information 4312. For example, the server machine connection information 4312 may include a virtual switch identifier identifying a virtual switch 4012 as being utilized to transport the traffic information 201 through the server machine 4002 to a virtual tool 4010. More broadly, at a server machine 4002, the traffic information 201 may be received, via a fabric link 514, by a network interface card 4118 that, in turn, communicates the traffic information 201 to a virtual switch 4012 that, in turn, communicates the traffic information 201 to a virtual machine 4008 that, in turn, hosts a virtual tool 4010 that processes the traffic information 201.

Pipeline

In one embodiment, the traffic information 201 may be communicated through a pipeline including one or more virtual tools 4010. The pipeline may be described by the server machine connection information 4312 in a policy instance 4308. For example, the pipeline may include a virtual tool 4010 (e.g., first virtual tool) that, in turn, communicates output to a virtual tool 4010 (e.g., second virtual tool) (e.g., analytics) on the same or different server machines 4002. In this embodiment, the server machine connection information 4312 includes the element identifiers 4314 describing multiple virtual tools 4010 in the pipeline. In some embodiments, each virtual tool 4010 of a pipeline may be described in a different policy instance 4308.

Stand Alone Analytics

In one embodiment, the policy instance 4308 may further include an optional egress interface identifier. The egress interface identifier identifies an egress interface 510 on the network monitoring fabric 502 that is connected to an egress link 511 that is connected a tool 106 (e.g., stand-alone analytics) in the tool farm 504. The egress interface identifier may cause the process module 802 to configure the server machine 4002 and the network monitoring fabric 502 to communicate the output of the virtual tool 4010 (or the last virtual tool 4010 in a pipeline) to exit the network monitoring fabric 502 at the identified egress interface 510 to be processed by the tool 106. For example, the egress interface identifier may cause the process module 802 include a return path for the above described first and second connections (e.g., exiting the server machine 4002). Further, for example, the egress interface identifier may cause the process module 802 to forward the output of the virtual tool 4010 over the network monitoring fabric 502 (e.g., one or more switches) to exit the network monitoring fabric 502 at the identified egress interface 510 to be processed by the tool 106 (analytics) in the tool farm 504.

Figure 8J:
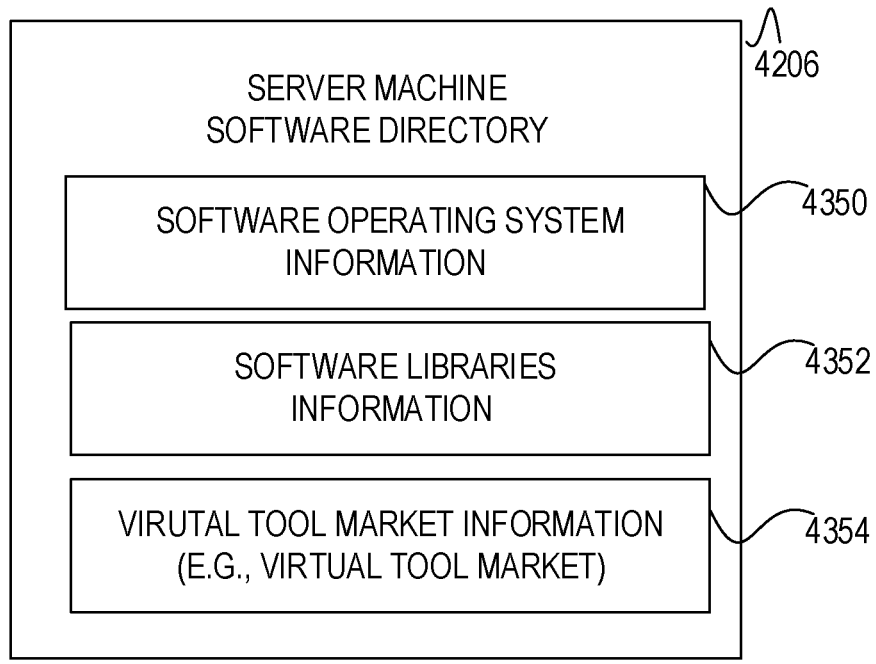
FIG. 8J is a block diagram illustrating server machine software directory, according to some example embodiments.

FIG. 8J is a block diagram illustrating server machine software directory 4206, according to some example embodiments. The server machine software directory 4206 may store software associated with and for execution on the server machine 4002. The server machine software directory 4206 includes software operating system information 4350 storing operation systems (e.g., guest operating system 4120, virtual machine operating system 4124, virtual machine monitor 4122) and the like, software libraries information 4352 storing software libraries (e.g., virtual machine libraries, docker libraries, etc.) and the like, and virtual tool market information 4354 (e.g., virtual tool market) storing virtual tools 4010 that have been uploaded to the network monitoring fabric 502.

Figure 8K:
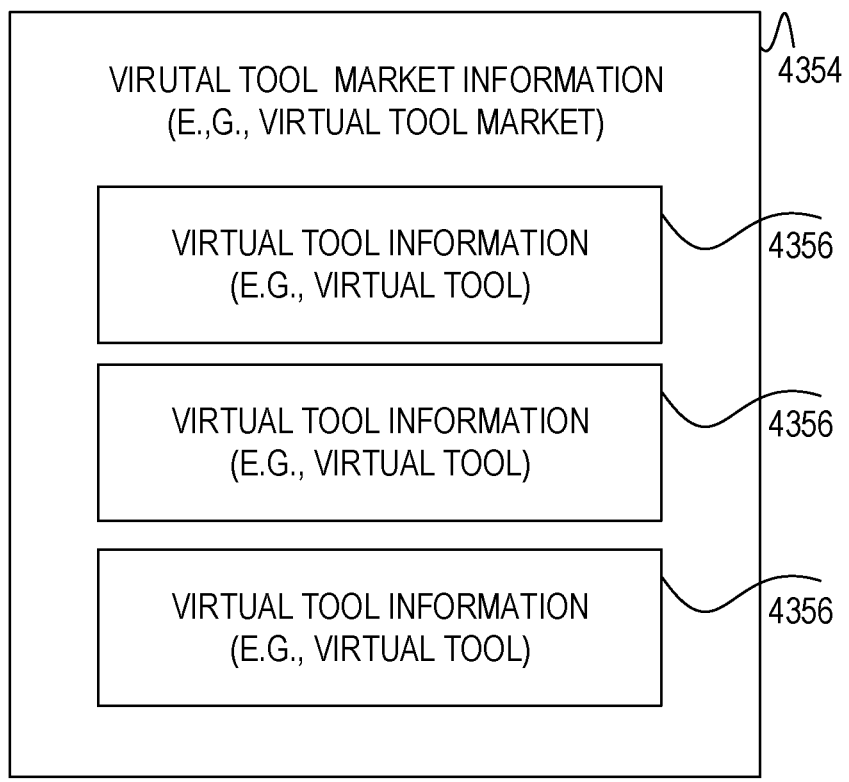
FIG. 8K is a block diagram illustrating virtual tool market information, according to some example embodiments.

FIG. 8K is a block diagram illustrating virtual tool market information 4354, according to some example embodiments. The virtual tool market information 4354 (e.g., virtual tool market) stores one or more entries of virtual tool information 4356. Each entry of virtual tool information 4356 corresponds to a virtual tool 4010 that was uploaded to the database 515.

Figure 8L:
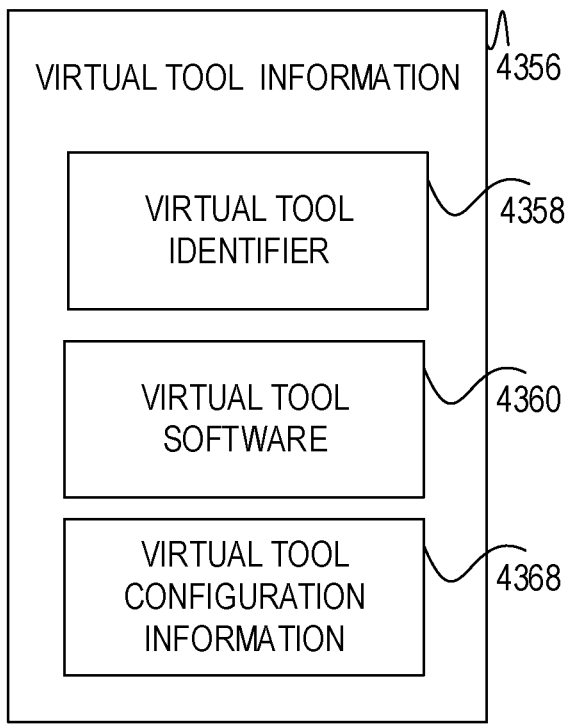
FIG. 8L is a block diagram illustrating virtual tool information, according to some example embodiments.

FIG. 8L is a block diagram illustrating virtual tool information 4356, according to some example embodiments. The virtual tool information 4356 stores information uploaded with the "upload VT" command and information received in association with the "upload VT" command. The virtual tool information 4356 includes a virtual tool identifier 4358, virtual tool software 4360, and virtual tool configuration information 4368. The virtual tool identifier 4358 uniquely identifies the virtual tool 4010 in the network monitoring fabric. The virtual tool software 4360 stores modules, images, executables, source code, binaries, and the like that embody the virtual tool 4010. The virtual tool configuration information 4368 stores configuration parameters received in association with the virtual tool 4010.

Figure 8M:
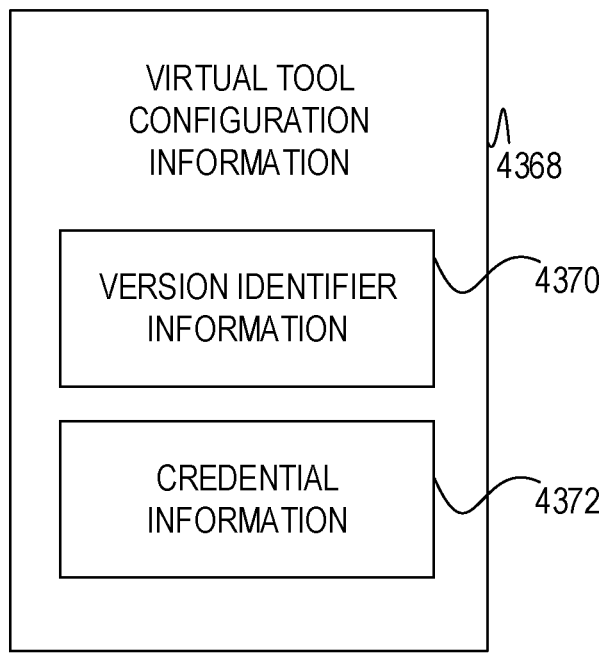
FIG. 8M is a block diagram illustrating virtual tool configuration information, according to some example embodiments.

FIG. 8M is a block diagram illustrating virtual tool configuration information 4368, according to some example embodiments. The virtual tool configuration information 4368 includes version identifier information 4370 and credential information 4372. The version identifier information 4370 stores the version identifier (e.g., version 1.1, 1.2, 3.4, etc.) for the virtual tool 4010. The credential information 4372 stores usernames and passwords that must be received by the virtual tool 4010 to access the virtual tool 4010.

Figure 9A:
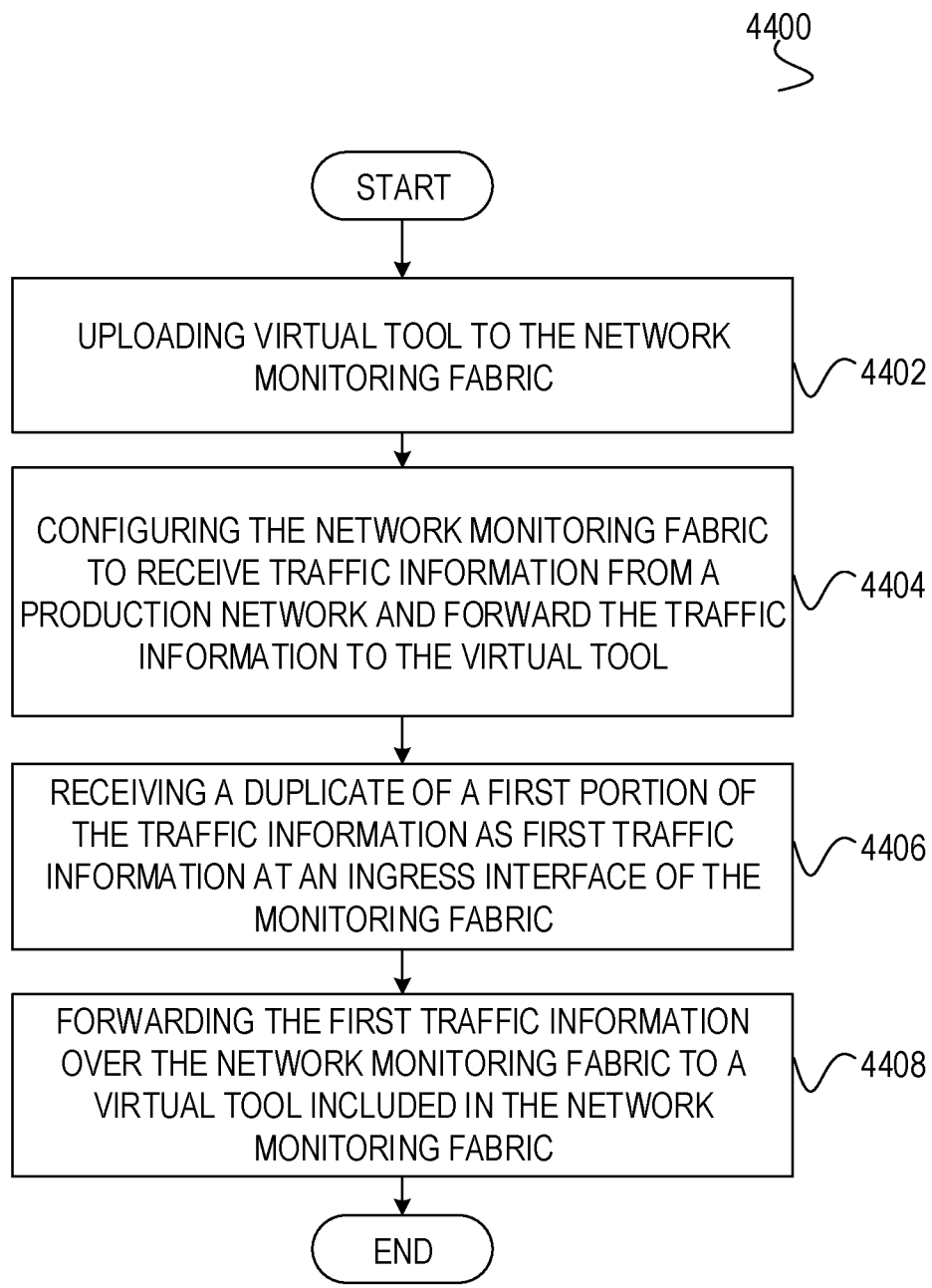
FIG. 9A is a flowchart illustrating a method, according to some example embodiments, to scale a network monitoring fabric.

FIG. 9A is a flowchart illustrating a method 4400, according to some example embodiments, to scale a network monitoring fabric 502. The method 4400 commences at 4402 with the controller computer 512 uploading a virtual tool 4010 to the network monitoring fabric 502. For example, the controller computer 512 may receive an "upload VT" command from a monitor coupled to the controller computer 512 and, responsive to receipt of the command, upload virtual tool information 4356 over a network link 4014 (e.g., connected to Internet) from a vendor computer. An execution of the "upload VT" command is described further in FIG. 9B. Returning to FIG. 9A, the controller computer 512 stores the virtual tool information 4356 (e.g., virtual tool 4010) in the virtual tool market information 4354 (e.g., virtual tool market) in the database 515. In one embodiment, the vendor computer may be operated by a software vendor who is selling or licensing the virtual tool 4010. For example, the software vendor may license the virtual tool 4010 based on the virtual tool 4010 processing a quantity of traffic information 201 (e.g., packets) in a predetermined period. Also for example, the software vendor may license the virtual tool 4010 based on a subscription.

At operation 4404, the controller computer 512 configures the network monitoring fabric 502 (e.g., including a first plurality of switches) to receive traffic information 201 from a production network 102 and forward the traffic information to the virtual tool 4010. For example, the controller computer 512 may receive the "add policy" command from a monitor coupled to the controller computer 512 and, responsive to receipt of the command, configure a server machine 4002 (e.g., first server machine) and one or more switches (e.g., second plurality of switches) to receive and process the first portion of the traffic information 201 from the production network 102 as described further in FIG. 9C.

Figure 9D:
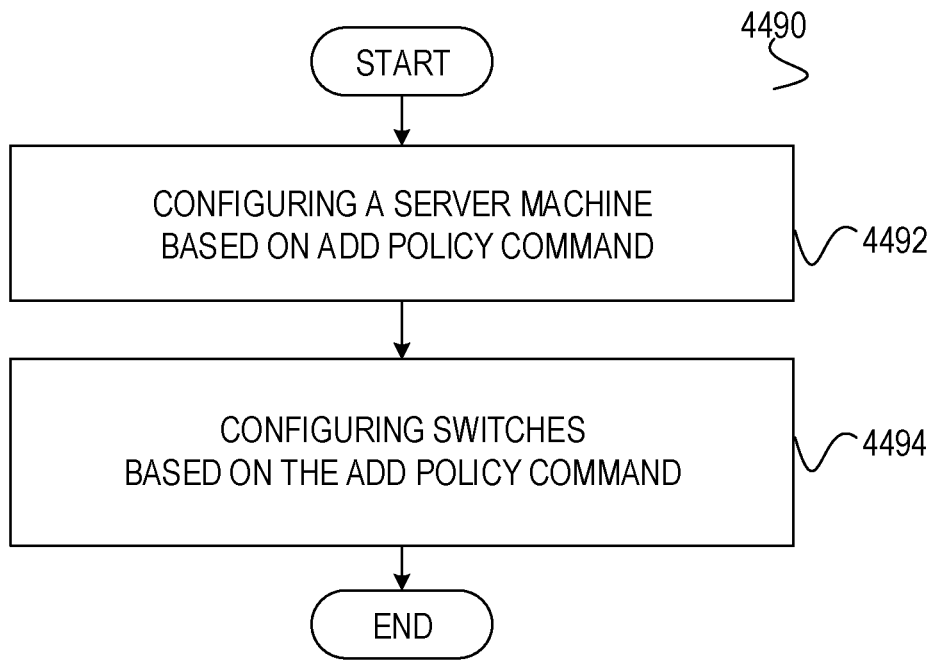
FIG. 9D is a flowchart illustrating a method, according to some example embodiments, to configure a network monitoring fabric.
Figure 9E:
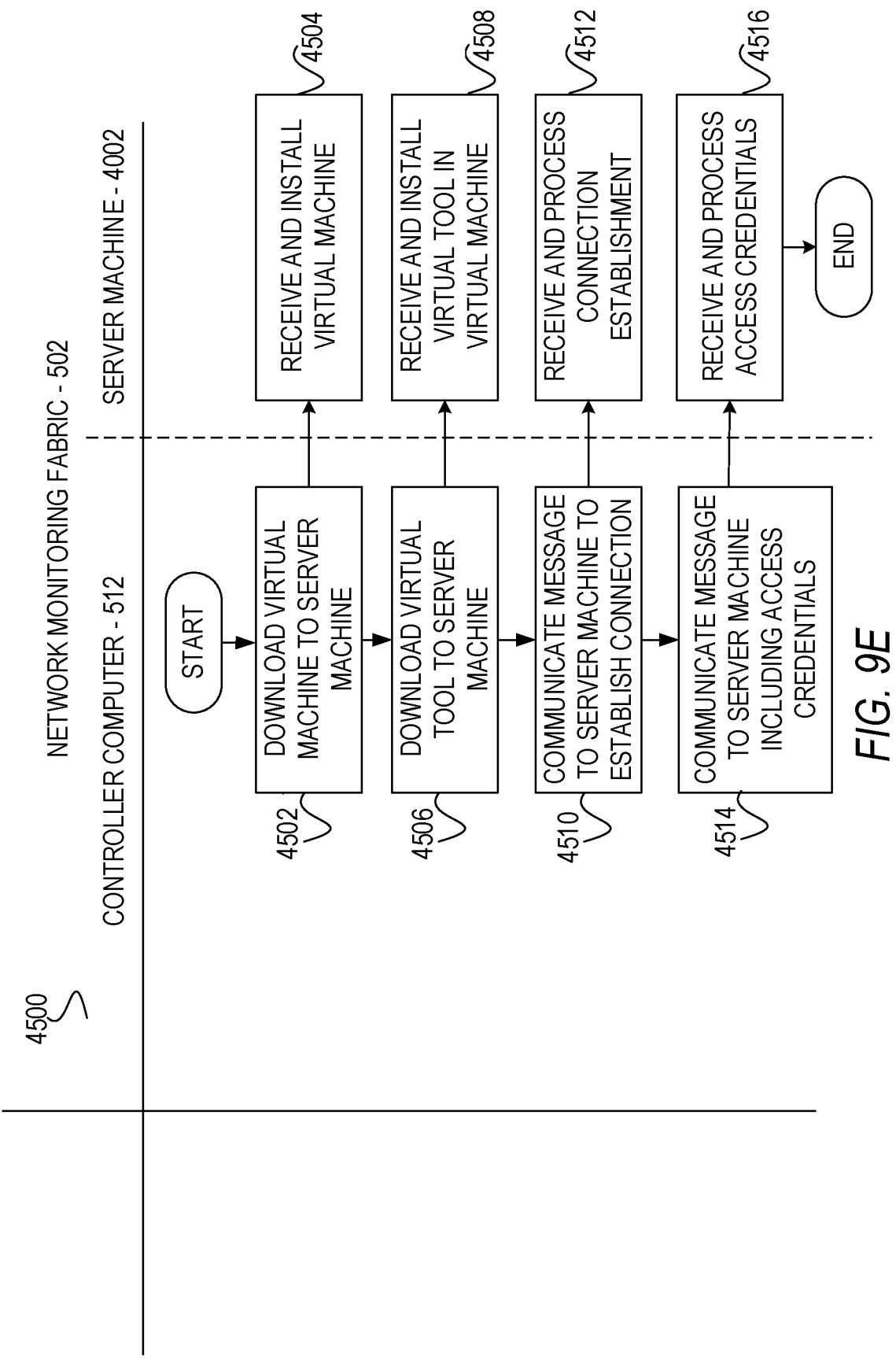
FIG. 9E is a flowchart illustrating a method, according to some example embodiments, to configure a server machine.

Returning to FIG. 9A, for example, the controller computer 512 may configure the server machine 4002 by downloading a virtual machine or docker container to the server machine 4002, downloading the virtual tool 4010 to the server machine 4002, and configuring connections in the server machine 4002, as described further in FIG. 9E. Returning to FIG. 9A, the controller computer 512 further configures the one or more switches (e.g., physical switch 506 and/or virtual switch 4012) in the network monitoring fabric 502 to receive traffic information (e.g., first portion of traffic information 201) from the production network 102 and forward the traffic information 201 over the network monitoring fabric and to the server machine 4002 that includes the virtual tool 4010, as described further in callout 4494 of FIG. 9D.

At operation 4406, at an ingress interface 508 of a switch (e.g., physical switch 506 and/or virtual switch 4012), the switch may receive a duplicate of the traffic information 201 from the production network 102. For example, a monitoring mechanism (e.g., tap 116 or SPAN port 114) in the production network 102 may receive the duplicate of the traffic information 201, being communicated from North to South or South to North, and communicate the duplicate of the traffic information 201 (e.g., first traffic information 201) over an ingress link 507 to the ingress interface 508 at a switch (e.g., physical switch 506 and/or virtual switch 4012).

At operation 4408, the switch (e.g., physical switch 506 or virtual switch 4012) that receives the traffic information 201 (e.g., first traffic information 201) forwards the traffic information 201 over a fabric link 514 to a switch that, in turn, forwards the traffic information 201 over a fabric link 514, and so on until the traffic information 201 is received by a server machine 4002 that, in turn, includes the virtual tool 4010 that processes the traffic information 201.

FIG. 9B is a flowchart illustrating a method 4450, according to an example embodiment, to upload a virtual tool 4010. Operations on the left are performed at a monitor coupled to a controller computer 512. Operations in the middle are performed at the controller computer 512 and operations on the right are performed at a vendor computer 4051. The method 4450 commences at operation 4452, with "upload VT" command being entered at the monitor.

At operation 4454, the communication module 800 at the controller computer 512 receives the command and the process module 802 processes the command. For example, the communication module 800 may receive a network path that identifies a vendor computer 4051 on the Internet and a virtual tool 4010. Further, the communication module 800 may receive a network path that identifies a location for storing the virtual tool 4010 in the database 515.

At operation 4456, the process module 802 uploads the virtual tool 4010 from the vendor computer 4051. For example, the communication module 800 may communicate a request to the vendor computer 4051 that identifies virtual tool 4010 and a request to upload the virtual tool 4010.

At operation 4458, the vendor computer 4051 receives the request to upload the virtual tool 4010 and uploads the virtual tool 4010 to the controller computer 512. For example, the vendor computer 4051 may retrieve virtual tool information 4356 (e.g., virtual tool 4010) from a database 4460 and communicate the virtual tool information 4356 to the controller computer 512.

At operation 4462, at the vendor computer 4051, the communication module 800 may receive the virtual tool information 4356, and the process module 802 may store the virtual tool information 4356 in the virtual tool market information (e.g., virtual tool market) in the database 515 based on the path. For example, the virtual tool information 4356 may include virtual tool software 4360 and at least a portion of the virtual tool configuration information 4368. In addition, the process module 802 may generate a virtual tool identifier 4358 that corresponds to the virtual tool 4010 and store the virtual tool identifier 4358 in the virtual tool information 4356 in the database 515.

FIG. 9C is a flowchart illustrating a method 4470, according to an example embodiment, to add a policy. Operations on the left are performed at a monitor coupled to a controller computer 512 and operations in the middle are performed at the controller computer 512. The method 4470 commences at operation 4472, with the "add policy" command and parameters being received by the monitor.

At operation 4474, at the controller computer 512, the communication module 800 receives the "add policy" command and the parameters. For example, the communication module 800 may receive the "add policy" command and parameters, as described in FIG. 5C, at callout 4054. For example, the communication module 800 may receive an "add policy" command that identifies a virtual tool 4010.

At operation 4476, the process module 802 stores a policy instance 4308 in the policy directory 4306 in the database 515 and configures the network monitoring fabric 502. For example, the process module 802 may store a policy instance 4308, policy information 4310, and server machine connection information 4312 based on the parameters that were received. Further, receiving the "add policy" command and parameters causes the process module 802 to configure the network monitoring fabric 502 to receive traffic information 201. For example, the process module 802 may configure the network monitoring fabric 502 to receive traffic information from the production network 102 and forward the traffic information 201 to the virtual tool 4010 identified with the "add policy" command, as described in operation 4404 of FIG. 9A, and the operations described in FIG. 9D and FIG. 9E.

FIG. 9D is a flowchart illustrating a method 4490, according to some example embodiments, to configure a network monitoring fabric 502. The method 4490 commences, at operation 4492, at the controller computer 412, with the process module 802 configuring a server machine 4002 in the network monitoring fabric 502 based on a policy instance created with the "add policy" command. For example, the process module 802 may configure the server machine 4002, as described in FIG. 9E, responsive to receipt of an "add policy" command and based on the parameters received with the "add policy" command, as described in FIG. 9C and callout 4054 in FIG. 5C.

At operation 4494, the process module 802 configures switches (e.g., physical switch 506 and/or virtual switch 4012) in the network monitoring fabric 502 based on the "add policy" command. For example, the process module 802 may configure switches, based on the parameters received with the "add policy" command, as described in FIG. 9C and FIG. 5C. The process module 802 may configure one or more switches to transport traffic information 201 from an ingress interface 508 to a server machine 4002 based on the policy instance 4308 generated by the "add policy" command. The ingress interface 508 may, in turn, be connected to an ingress link 507 that, in turn, is connected to a monitoring mechanism (e.g., tap 116 or SPAN port 114) in the production network 102.

FIG. 9E is a flowchart illustrating a method 4500, according to some example embodiments, to configure a server machine 4002. Operations in the middle are performed at the controller computer 512 and operations on the right are performed in a server machine 4002. The method 4500 commences at operation 4502, at the controller computer 512, with the process module 802 downloading a virtual machine 4008 over the network monitoring fabric 502, to the server machine 4002. For example, the process module 802 may communicate the virtual machine 4008 over the control link 516 to the control unit 4006 on the server machine 4002 based on a policy instance 4308.

At operation 4504, at the server machine 4002, the control unit 4006 may receive the virtual machine 4008 from over the control link 516 and install (launch) the virtual machine 4008.

At operation 4506, at the controller computer 512, the process module 802 downloads a virtual tool 4010, over the network monitoring fabric 502 to the server machine 4002. For example, the process module 802 may communicate the virtual tool software 4360 and virtual tool configuration information 4368 over the control link 516 to the control unit 4006 on the server machine 4002. The process module 802 may identify the virtual tool software 4360 and virtual tool configuration information 4368 based on the policy instance 4308.

At operation 4508, at the server machine 4002, the control unit 4006 may receive the virtual tool 4010 (virtual tool software 4360 and virtual tool configuration information 4368) from over the control link 516 and install (launch) the virtual tool software 4360 in the virtual machine 4008 on the server machine 4002. In addition, the control unit 4006 configures the virtual tool software 4360 in the virtual machine 4008 with the virtual tool configuration information 4368.

At operation 4510, at the controller computer 512, the process module 802 communicates a connection message, over the network monitoring fabric 502, to the server machine 4002 to establish one or more connections inside the server machine 4002. For example, the process module 802 may communicate the connection message over the control link 516 to the control unit 4006 on the server machine 4002 to cause the control unit 4006 to establish a connection between the network interface card 4118 and the virtual machine 4008 that includes the virtual tool 4010.

At operation 4512, at the server machine 4002, the control unit 4006 receives the connection message from over the control link 516 and, responsive to receiving the connection message, establishes/configures a connection from the network interface card 4118, in the server machine 4002, to the virtual machine 4008, in the server machine 4002.

At operation 4514, at the controller computer 512, the process module 802 communicates an access credential message, over the network monitoring fabric 502, to the server machine 4002. The process module 802 communicates the access credential message to automatically present access credentials to the virtual tool 4010. For example, the process module 802 may store credential information (e.g., username, password) in the access credential message and communicate the access credential message over the control link 516 to the control unit 4006 on the server machine 4002.

At operation 4516, at the server machine 4002, the control unit 4006 receives the access credential message from over the control link 516 and, responsive to receiving the access credential message, automatically presents the credential information to the virtual tool 4010 in the virtual machine 4008.

Figure 9F:
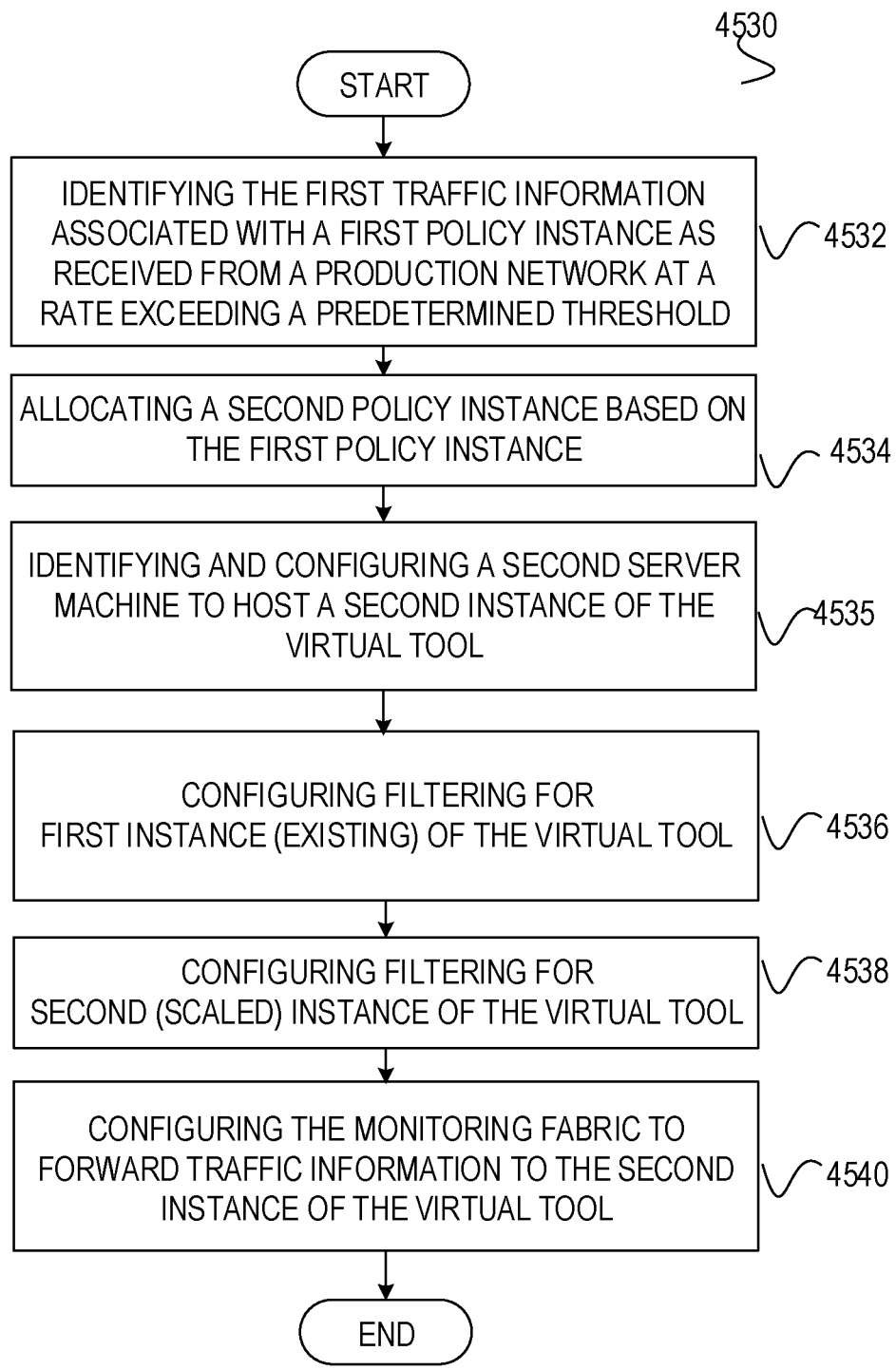
FIG. 9F is a flowchart illustrating a method, according to some example embodiments, to automatically scale a virtual tool.

FIG. 9F is a flowchart illustrating a method 4530, according to some example embodiments, to automatically scale a virtual tool 4010. The method 4530 may automatically scale a virtual tool 4010 based on a predetermined threshold associated with a virtual tool 4010.

The method 4530 commences at operation 4532, at the controller computer 512, with the process module 802 identifying a virtual tool 4010 (e.g., first instance of a first virtual tool), associated with a policy instance 4308 (e.g., first policy instance), is receiving traffic information 201 (e.g., first traffic information) from the production network 102 at a rate that exceeds a predetermined threshold. For example, the process module 802 may monitor the rate of web traffic being received by virtual tools 4010 (e.g., first virtual tool) in the network monitoring fabric 502 that were previously added with an "add policy" command or by automatic scaling and identify a virtual tool 4010 (e.g., first instance of a first virtual tool), associated with a policy instance 4308 (e.g., first policy instance), is receiving traffic information 201 (e.g., first traffic information) from the production network 102 at a rate that exceeds the predetermined threshold.

At operation 4534, the process module 802 may respond to identifying the rate as exceeding a predetermined threshold for the virtual tool 4010 (e.g., first instance of the first virtual tool) by identifying and configuring a server machine (e.g., second server machine) to host a second instance of the virtual tool 4010. For example, the process module 802 may identify the type of virtual tool 2010 for the second policy instance based on the first policy instance.

At operation 4535, the process module 802 may identify and configure a server machine (e.g., second server machine) to host a second instance of the virtual tool 4010. The process module 802 may identify a server machine 4002 by examining each of the server machines in the server machine directory 4204 to determine whether any of the server machines 4002 have enough processing capacity to host the second instance of the first virtual tool 4010. For example, the policy instances 4308 associated with a particular server machine 4002 may indicate whether the server machine 4002 is hosting one or more virtual tools 4010 and the processing burden associated with each of the virtual tools 4010. Responsive to identifying a server machine 4002 with sufficient processing capacity to host the second instance of the first virtual tool, the process module 802 may configure the server machine 4002 as described in association with FIG. 9E.

At operation 4536, the process module 802 may reconfigure the filtering for the first instance of the first virtual tool. For example, the process module 802 reconfigures filtering for the first instance of the first virtual tool by configuring the network monitoring fabric 502 to stop receiving all of the web traffic (e.g., first traffic information), as specified by the policy instance 4308 (e.g., first policy instance), and to start receiving web traffic for the first set of hosts (e.g., second traffic information) (e.g., second portion of the traffic information)(e.g., second traffic information). The process module 802 may configure filtering as generally described in association with FIG. 6.

At operation 4538, the process module 802 may configure the filtering for the second instance of the virtual tool 4010 (e.g., first virtual tool). For example, the process module 802 may configure the filtering for the second instance of the first virtual tool by configuring the network monitoring fabric 502 to receive web traffic for the second set of hosts (e.g., third portion of the traffic information) (e.g., third traffic information). The process module 802 may configure filtering as generally described in association with FIG. 6.

At operation 4540, the process module 802 configures the network monitoring fabric 502 to forward the web traffic for the second set of hosts to the second instance of the first virtual tool. For example, the process module 802 may configure the network monitoring fabric 502 to forward the web traffic for the second set of hosts (e.g., third traffic information) (e.g., third portion of the traffic information) (e.g., traffic information 201) from the switch including the ingress interface 508 to the second instance of the first virtual tool. Recall that one or more switches (e.g., physical switch 506/virtual switch 4012) may be between the switch including the ingress interface 508 and the server machine 4002. In this instance, the traffic information 201 may be forwarded over the one or more switches from the switch including the ingress interface 508 to the server machine 4002 hosting the second instance of the virtual tool. For example, the process module 802 may configure the one or more switches (e.g., physical switches 506/virtual switches 4012) to forward the third traffic information from the switch including the ingress interface 508 to the virtual tool 4010 (e.g., second instance of the first virtual tool) that is hosted in the second server machine. Further recall that the process module 802 need not configure the network monitoring fabric 502 to forward web traffic for the first set of hosts (e.g., second traffic information) (e.g., second portion of the traffic information) (e.g., traffic information 201) as this has already been configured responsive to the "add policy" command.

Figure 9G:
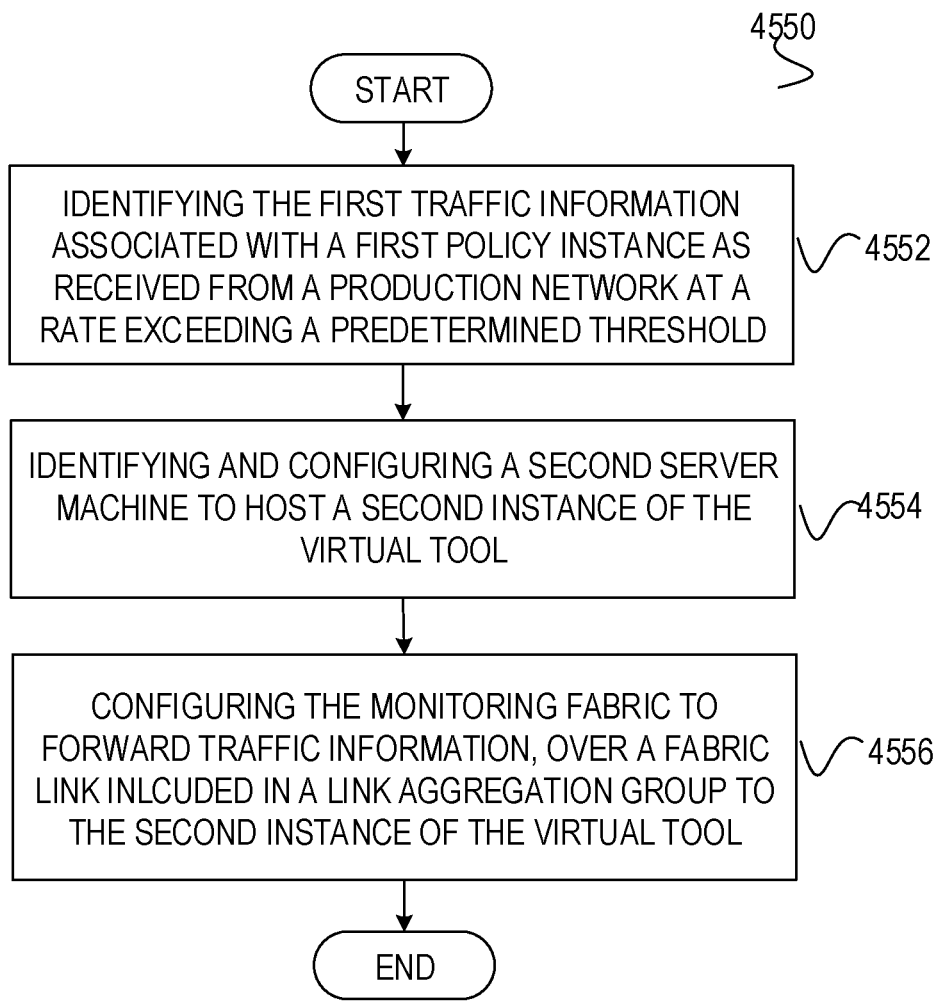
FIG. 9G is a flowchart illustrating a method, according to some example embodiments, to automatically scale a virtual tool.

FIG. 9G is a flowchart illustrating a method 4550, according to some example embodiments, to automatically scale a virtual tool 4010. The method 4550 may automatically scale a virtual tool 4010 based on a predetermined threshold associated with a virtual tool 4010.

The method 4550 commences at operation 4552, at the controller computer 512, with the process module 802 identifying a virtual tool 4010 (e.g., first instance of a first virtual tool), associated with a policy instance 4308 (e.g., first policy instance), is receiving traffic information 201 (e.g., first traffic information) from the production network 102 at a rate that exceeds a predetermined threshold. For example, the controller computer 512 may monitor the rate of web traffic as described in callout 4532 of FIG. 9F At operation 4554, the process module 802 may respond to the identifying the rate as exceeding a predetermined threshold for the virtual tool 4010 (e.g., first instance of the first virtual tool) by identifying and configuring a server machine (e.g., second server machine) to host a second instance of the virtual tool 4010. For example, the process module 802 may identify and configure a server machine (e.g., second server machine) to host a second instance of the virtual tool 4010 as described in callout 4535 of FIG. 9F.

At operation 4556, the process module 802 may configure one or more switches in the network monitoring fabric 502 to forward the first traffic information from the switch 4154, over the second fabric link included in the link aggregation group, to the second instance of the first virtual tool. Recall that the one or more switches (e.g., physical switch 506/virtual switch 4012) may be between the switch including the ingress interface 508 and the second server machine. In this instance, the traffic information 201 may be forwarded from the switch including the ingress interface 508, over a fabric link 514 (e.g., second member of the link aggregation group), via the one or more switches (e.g., third plurality of switches) to the server machine 4002 hosting the second instance of the first virtual tool. Further recall that the process module 802 need not configure the network monitoring fabric 502 to forward traffic information 201 from the switch 4154 to the second instance of the first virtual tool as this has already been configured responsive to the "add policy" command.

FIG. 10A is schematic diagrams illustrating a user interface 4600, according to some example embodiments, to display a tool market. The user interface 4600 displays the virtual tools 4010 that were uploaded with the "upload VT" command to the virtual tool market information 4354 (e.g., virtual tool market). The user interface 4600 may be displayed responsive to execution of the "upload VT" command. For example, the user interface 4600 displays three virtual tools 4010 that were uploaded to the tool market on the network monitoring fabric 502 including an "XYZ Inc.—DATA MONITOR" virtual tool, an "ABC LLC—TOOL" virtual tool, and a "DEF LLC—TOOL" virtual tool. Each of the virtual tools 4010 are associated with a "Description," a "Billing," and an "Image" column. The "Description" column includes a name for the virtual tool 4010. The "Billing" column indicates how billing is computed based on the quantity of traffic processed or a period subscription. The "Image" column indicates if the virtual tool software is available as a virtual machine image, a docker container image, or both.

FIG. 10B is schematic diagram illustrating a user interface 4650, according to some example embodiment, to display traffic information 201 with a virtual tool 401. The user interface 4650 displays traffic information 201 for a unique instance of a virtual tool 4010 executing on the network monitoring fabric 502. For example, the user interface 4650 displays traffic information 201 for the "XYZ—DATA MONITOR" that is executing on the server machine 4002 identified with the server machine identifier 4304 "12" in the network monitoring fabric 502 that is executing on the virtual machine 4008 "1" on the server machine 4002. The XYZ—DATA MONITOR is monitoring traffic originating at hosts identified as "WEB SERVER 21," "WEBSERVER 30," and "WEBSERVER 19." The column marked "AVG BIT/S" displays the traffic information 201 as an acceleration/deceleration and average bits per second. The column marked "AVG PACKETS/S" displays the traffic information 201 as an acceleration/deceleration in packets and as average packets per second. The user interface 4650 is further shown to include a TAB at the bottom marked "ANALYTICS." The tab may be selected to display the same traffic information 201 but as processed with the "ANALYTICS" virtual tool 4010.

Figure 11A:
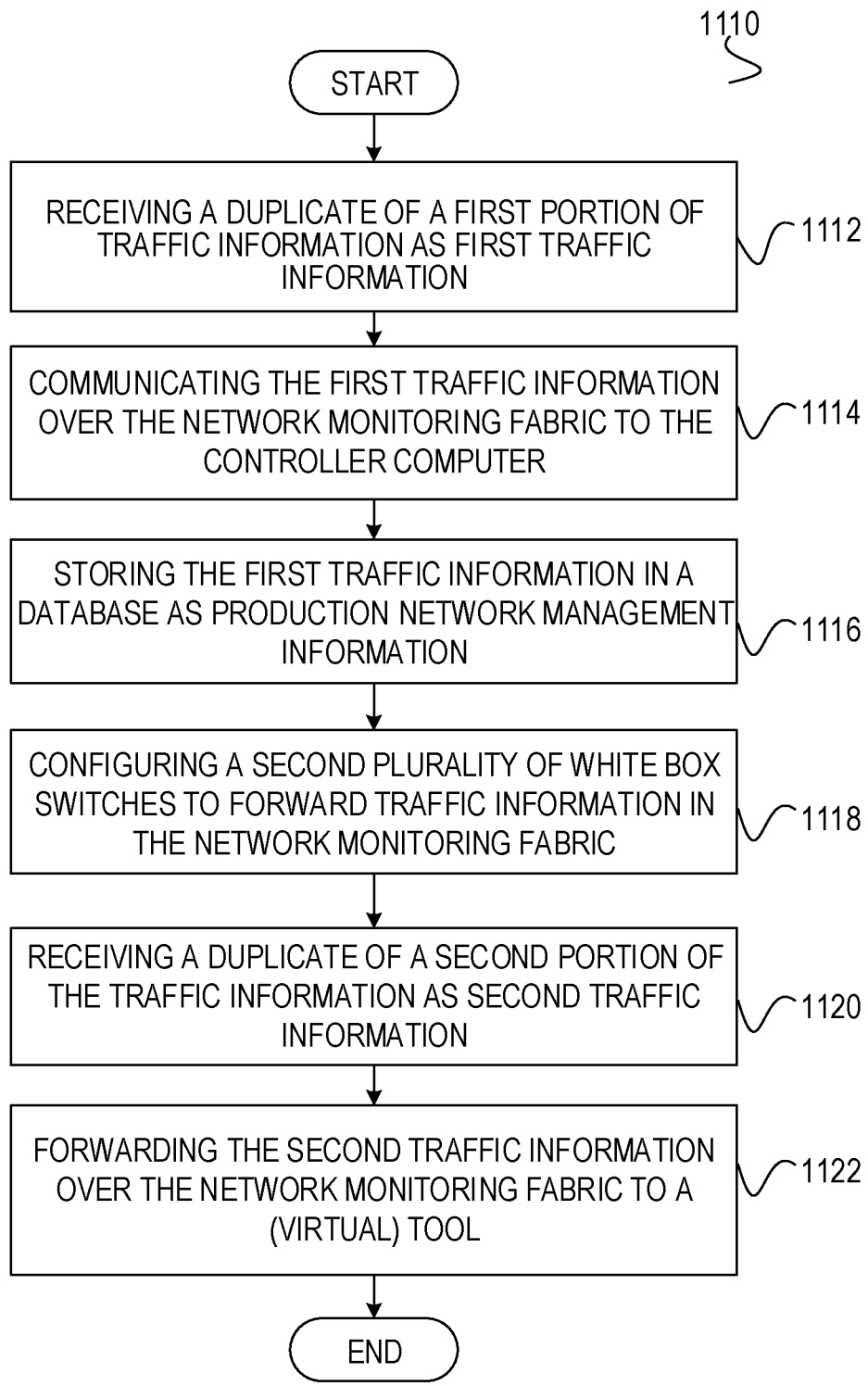
FIG. 11A is a flowchart illustrating a method, according to some example embodiments, to build a network monitoring fabric.

FIG. 11A is a flowchart illustrating a method 1110, according to some example embodiments, to build a network monitoring fabric 502. At operation 1112, the network monitoring fabric 502 receives one or more duplicates of a first portion of traffic information 201 from a production network 102. The network monitoring fabric 502 may receive the one or more duplicates of the first portion of traffic information 201 from the production network 102 as N×first traffic information 201. The N×first traffic information 201 may each be associated with a monitoring mechanism (e.g., tap 116 or SPAN port 114), an ingress interface 508, and a physical switch 506. That is, the same first traffic information 201 may be received as N×first traffic information 201. Recall that the first traffic information 201 may be received from the production network 102 as N×first traffic information 201 for the reason that the first traffic information 201 may be received by N×monitoring mechanisms, as it is communicated through the production network 102.

At operation 1114, the respective switches (physical switch 506 and/or virtual switch 4012) communicate the N×first traffic information 201 (e.g., duplicates of the first portion of traffic information 201) over the network monitoring fabric 502 to a controller computer 512. The operation 1114 is described further in association with FIG. 11B.

At operation 1116, the controller computer 512 may store the N×first traffic information 201 in the database 515 as production network management information 900. The production network management information 900 further identifies the monitoring mechanism (e.g., tap 116 or SPAN port 114), the ingress interface 508, and the physical switch 506 that were utilized to receive the first traffic information 201 into the network monitoring fabric 502. For example, the production network management information 900 may include the N×first traffic information 201 that are respectively stored in association with a monitoring mechanism (e.g., tap 116 or SPAN port 114) identifier, an ingress interface 508 identifier, and a physical switch 506 identifier that identify the components utilized to receive the first traffic information 201.

At operation 1118, the controller computer 512 may be utilized to configure a second plurality of switches to forward traffic information 201 in the network monitoring fabric 502. According to various embodiments, the controller computer 512 may automatically configure the second plurality of switches in response to an automatic analysis of the production network information 806 stored in the database 515. For example, the controller computer 512 may automatically configure multiple (e.g., a second plurality of) switches in the network monitoring fabric 502 to forward a second portion of the traffic information 201, through one or more switches and over various links, as second traffic information 201, to a virtual tool 4010 or to a tool 106 in the tool farm 504 or in response to an automatic analysis of production network information 806. According to another embodiment, an administrator may manually configure one or more (e.g., a second plurality of) switches in the network monitoring fabric 502 to forward a second portion of the traffic information 201, as second traffic information 201, to the virtual tool 4010 or to the tool 106 in the tool farm 504. For example, the administrator may identify a particular type of traffic (e.g., web traffic) as being of interest based on a forensic analysis of the production network information 806 that is stored in the database 515 and configure one or more switches to forward the identified traffic over the network monitoring fabric 502 for further analysis by a tool 106 in the tool farm 504 or by a virtual tool 4010. To this end, the administrator may configure multiple switches to receive a duplicate of a second portion of the traffic information 201 from the production network 102 at a first ingress interface 508 and forward the second portion of the traffic information 201 over a second plurality of switches to a virtual tool 4010 or to exit the network monitoring fabric 502 at an egress interface 510 that is connected to an egress link 511 that, in turn, is connected to a tool 106 in a tool farm 504. The operation 1118 is described further in association with FIG. 11C.

At operation 1120, an ingress interface 508, at a switch (e.g., physical switch 506 or virtual switch 4012), in the network monitoring fabric 502, may receive a duplicate of a second portion of the traffic information 201 from the production network 102 as second traffic information 201. For example, a monitoring mechanism (e.g., tap 116 or SPAN port 114) may receive the duplicate of the second portion of traffic information 201 that is being communicated from North to South or South to North in the production network 102 and communicate the duplicate of the second portion of traffic information 201 over an ingress link 507 to the ingress interface 508, at a switch, where it is received as second traffic information 201.

At operation 1122, the switch that received the second traffic information 201 forwards the second traffic information 201 over a particular fabric link 514 to a switch that, in turn, forwards the second traffic information 201 over a particular fabric link 514, and so on until the second traffic information 201 is received by a virtual tool 4010 or exits the network monitoring fabric 502 through an egress interface 510 that, in turn, is connected to an egress link 511 that is connected to a tool farm 504. In one embodiment, the network monitoring fabric 502 may be configured to forward the second traffic information 201 to multiple virtual tools 4010 and/or out multiple egress interfaces 510 to different tools 106 in the tool farm 504. The operation 1122 is described further in association with FIG. 11D.

Figure 11B:
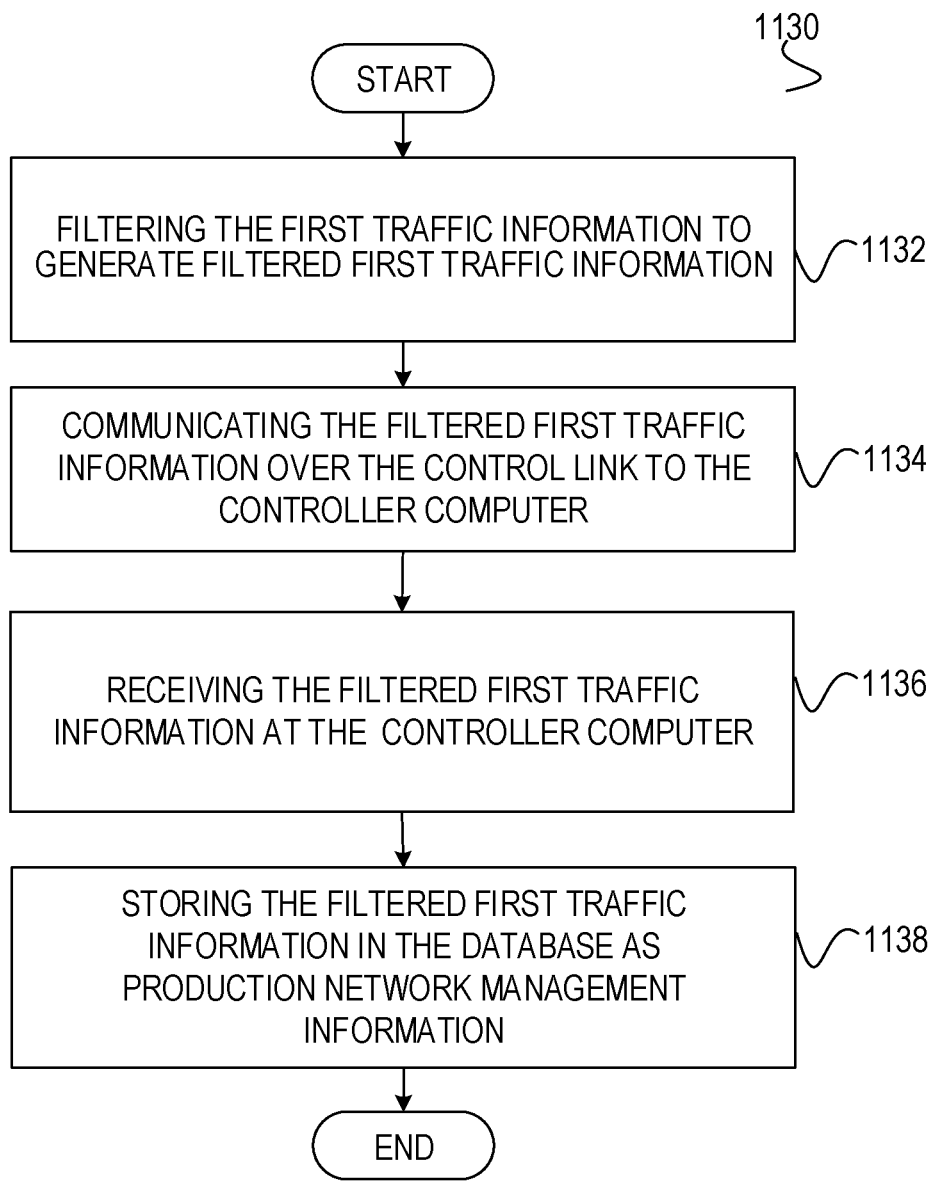
FIG. 11B is a flowchart illustrating a method, according to an example embodiment, to filter first traffic information.

FIG. 11B is a block diagram illustrating a method 1130, according to an example embodiment, to filter first traffic information 201. The method 1130 provides a further description of operation 1114 in FIG. 11A. At operation 1132, a receiving module 702, at a switch (e.g., physical switch 506 or virtual switch 4012), may filter the first traffic information 201 to generate filtered first traffic information 201. Merely for example, the switch may filter the first traffic information 201 to generate filtered first traffic information 201 such as "web traffic." Further, according to various embodiments, N×physical switches 506 may filter the same first traffic information 201.

At operation 1134, the processing module(s) 704, at the switch(es), communicates the filtered first traffic information 201 over the control link 516 to the controller computer 512.

At operation 1136, the communication module 800, at the controller computer 512, receives the filtered first traffic information 201, and at operation 1138, the process module 802 stores the filtered first traffic information 201 in the database 515 as production network management information 900.

Figure 11C:
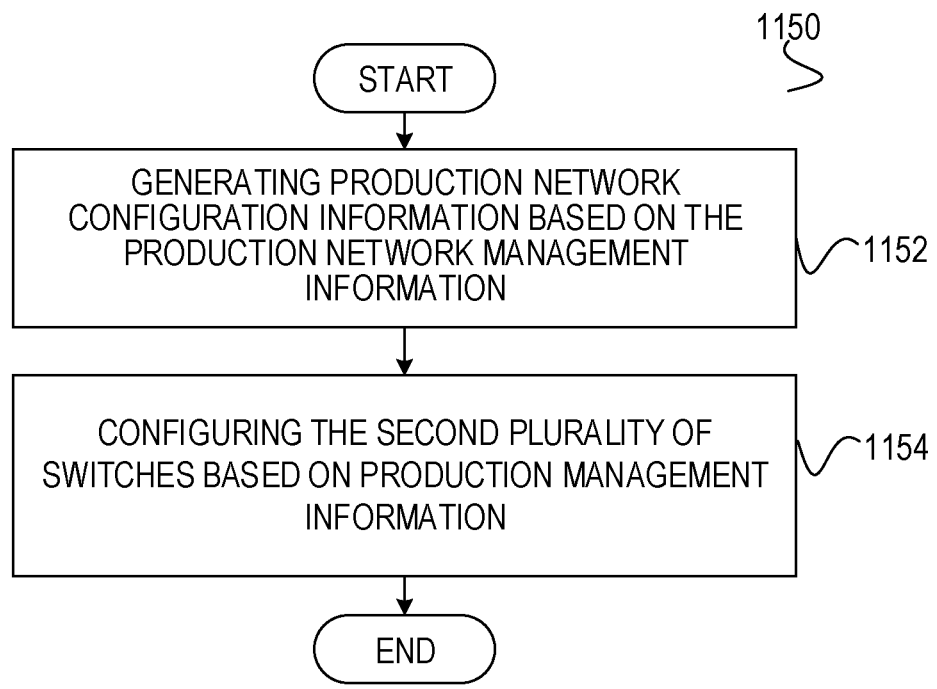
FIG. 11C is a flowchart illustrating a method, according to an example embodiment, to configure switches.

FIG. 11C is a block diagram illustrating a method 1150, according to an example embodiment, to configure switches (e.g., physical switches 506 or virtual switches 4012). The method 1150 provides a further description of operation 1118 in FIG. 11A. At operation 1152, at the controller computer 512, the process module 802 generates production network configuration information 902 based on the production network management information 900. Recall that the production network configuration information 902 describes network elements in the production network 102.

At operation 1154, the process module 802 automatically configures the second plurality of switches in the network monitoring fabric 502 based on production network information 806 to forward the second traffic information 201. Merely for example, the process module 802 may select 1) a particular monitoring mechanism (e.g., tap 116 or SPAN port 114), 2) an ingress interface 508, 3) one or more switches, 4) one or more fabric links 514, and 5) an egress interface 510 to forward the second traffic information 201 from the production network 102 to virtual tool 4010 or the tool farm 504. Recall that the production network information 806 includes production network management information 900 and production network configuration information 902. For example, the process module 802, at the controller computer 512, may configure the second plurality of switches for receiving a duplicate of a second portion of the traffic information 201 at a particular ingress interface 508, as second traffic information 201, and forwarding the second portion of the traffic information 201 over the network monitoring fabric 502 to a virtual tool 4010 or to exit the network monitoring fabric 502 from a particular egress interface 510 that is connected to a tool farm 504, as is described further in association with FIG. 6.

Figure 11D:
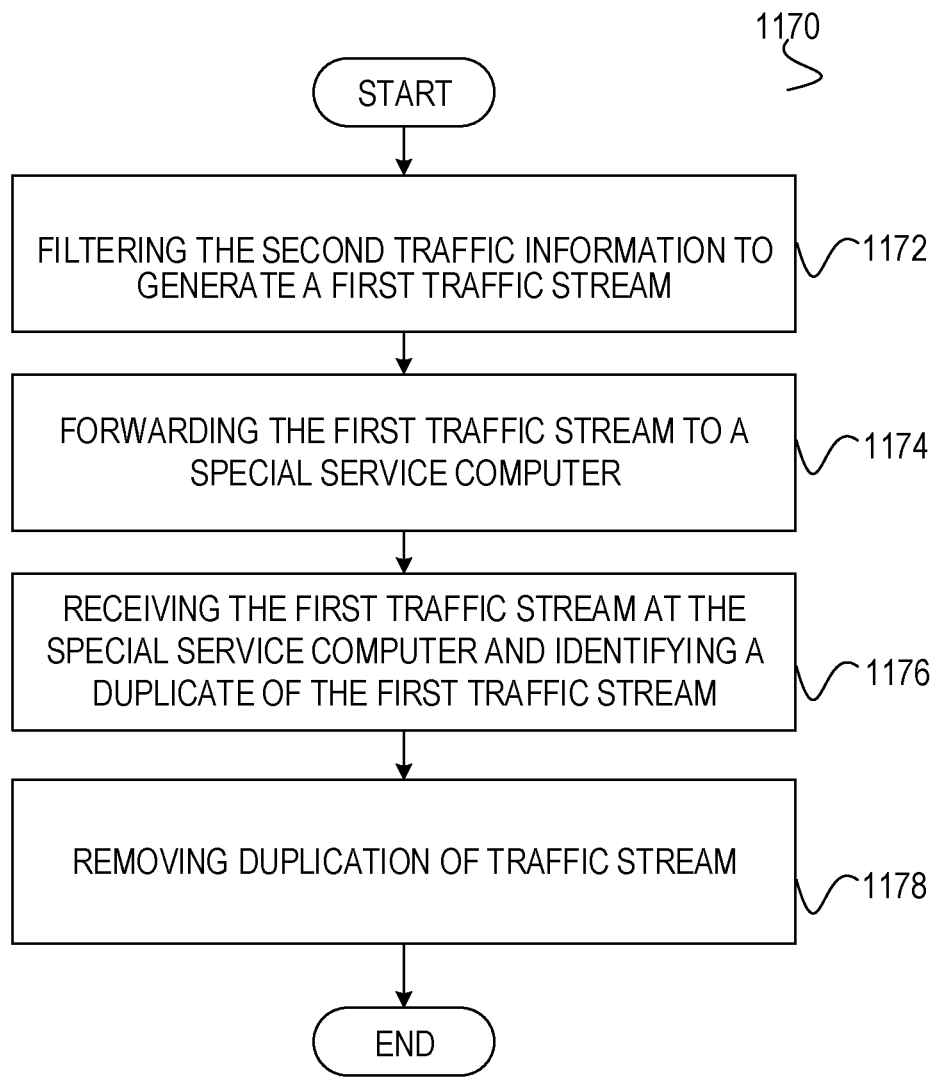
FIG. 11D is a flowchart illustrating a method, according to some example embodiments, to forward traffic information to a special service computer.

FIG. 11D is a block diagram illustrating a method 1170, according to some example embodiments, to forward traffic information 201 to a special service computer. The method 1170 provides a further description of operation 1122 in FIG. 11A. At operation 1172, a switch (e.g., physical switch 506 or virtual switch 4012) may receive traffic information 201 from the production network 102 as a first traffic stream. In some embodiments, the switch may further filter the traffic information 201 to generate the first traffic stream. For example, the switch may receive traffic information 201 from the production network 102 in the form of second traffic information 201 and filter the second traffic information 201 to generate a first traffic stream.

At operation 1174, the switch may forward the first traffic stream to the special service computer 518. For example, the switch may forward the first traffic stream over the network monitoring fabric 502 via other switches and fabric links 514 to the special service computer 518. Other embodiments may utilize the switch to communicate the first traffic stream to the special service computer 518. For example, the switch associated with the ingress interface 508 that receives the second traffic information 201 may communicate the first traffic stream over the control link 516 to the special service computer 518.

At operation 1176, the special service computer 518 receives the first traffic stream and compares the first traffic stream with other traffic streams to identify a duplicate of the first traffic stream. For example, the other traffic streams may include one or more traffic streams from the production network 102 that are presently being forwarded over the network monitoring fabric 502 to the virtual tool 4010 or the tool farm 504, one or more traffic streams from the production network 102 that are candidates for forwarding over the network monitoring fabric 502 to the virtual tool 4010 or to the tool farm 504, one or more traffic streams that are being received from the production network 102, and one or more traffic streams that were previously received from the production network 102 and are presently stored in the database 515.

At operation 1178, the special service computer 518 may remove the identified duplication of the first traffic stream. For example, the special service computer 518 may remove duplication of the first traffic stream by causing the first traffic stream to not be forwarded over the network monitoring fabric 502. Further, for example, the special service computer 518 may remove duplication of the first traffic stream by causing the other traffic stream to not be forwarded over the network monitoring fabric 502.

FIG. 12A is a schematic diagram illustrating a user interface 1200, according to an example embodiment. The user interface 1200 may be generated and communicated to the monitor that is communicatively coupled to the controller computer 512. The user interface 1200 may be generated and communicated by the forensic module 804 in response to the forensic module 804 receiving a command. For example, a network administrator may communicate an "OBSERVED IP command" via the monitor to the controller computer 512 for processing by the forensic module 804. In response to receiving the command, the forensic module 804 may generate the user interface 1200 and communicate the user interface 1200 to the monitor. The user interface 1200 may be generated by the forensic module 804 based on the production network information 806 and the network monitoring fabric information 808. For example, the user interface 1200 may include user interface elements including a switch name (e.g., column marked "Switch Alias") that names a physical switch 506, a switch path identifier (e.g., column marked "Switch") that identifies a path to the physical switch 506, an ingress interface name (e.g., column marked "Interface") that identifies the name of an ingress interface 508, a monitoring mechanism identifier (e.g., column marked "Tap Interface") that identifies a monitoring mechanism including a tap 116 or a SPAN port 114, and a VLAN identifier (e.g., column marked "Observed IPs") that identifies a VLAN in association with IP addresses for devices (e.g., devices 112) on the associated VLAN.

FIG. 12B is a schematic diagram illustrating a user interface 1300, according to an example embodiment. The user interface 1300 may be generated and communicated to the monitor that is communicatively coupled to the controller computer 512. The user interface 1300 may be generated and communicated by the forensic module 804 in response to the forensic module 804 receiving a command. For example, a network administrator may communicate a "DHCP TRACKER command" via the monitor to the controller computer 512 for processing by the forensic module 804. In response to receiving the command, the forensic module 804 may generate the user interface 1300 and communicate the user interface 1300 to the monitor. The user interface 1300 may be generated by the forensic module 804 based on the production network information 806 and the network monitoring fabric information 808. For example, the user interface 1300 may include user interface elements including a server address identifier (e.g., column marked "Server Address") that identifies an address of a DHCP server on the production network 102, a client count (e.g., column marked "Client Count") that counts the number of hosts with an address lease from the DHCP server on the production network 102, a lease time quantity (e.g., column marked "Lease Time") indicating how long the address lease is valid for, a relay flag (e.g., column marked "Relay") indicating that the DHCP server machine acts as a forwarder of DHCP requests and responses, and subnet identifiers (e.g., column marked "Subnets") that identify subnets on the production network 102 in association with the previously mentioned fields.

FIG. 12C is a schematic diagram illustrating a user interface 1400, according to an example embodiment. The user interface 1400 may be generated and communicated to the monitor that is communicatively coupled to the controller computer 512. The user interface 1400 may be generated and communicated by the forensic module 804 in response to the forensic module 804 receiving a command. For example, a network administrator may communicate a "TOPOLOGY command" via the monitor to the controller computer 512 for processing by the forensic module 804. In response to receiving the command, the forensic module 804 may generate the user interface 1400 and communicate the user interface 1400 to the monitor. The user interface 1400 may be generated by the forensic module 804 based on the production network information 806 and the network monitoring fabric information 808. For example, the user interface 1400 may include a switch section (e.g., marked "Switch") that includes user interface elements describing a physical switch 506, an interface section (e.g., marked "Interface") that includes user interface elements describing an ingress interface 508 that is connected to the physical switch 506, a tap configuration section (e.g., marked "Tap Configuration") that includes user interface elements describing a tap 116 that is connected to the ingress interface 508, and a connected device section (e.g., marked "Connected Device") that includes user interface elements describing the port on the production network 102 that is connected to the tap 116.

FIG. 12D is a schematic diagram illustrating a user interface 1500, according to an example embodiment. The user interface 1500 may be generated and communicated to the monitor that is communicatively coupled to the controller computer 512. The user interface 1500 may be generated and communicated by the forensic module 804 in response to the forensic module 804 receiving a command. For example, a network administrator may communicate a "TCP CONNECTIONS command" via the monitor to the controller computer 512 for processing by the forensic module 804. In response to receiving the command, the forensic module 804 may generate the user interface 1500 and communicate the user interface 1500 to the monitor. The user interface 1500 may be generated by the forensic module 804 based on the production network information 806 and the network monitoring fabric information 808. For example, the user interface 1500 may include user interface elements including a TCP client address (e.g., column marked "TCP Client") that includes an address of a TCP client on the production network 102, a Client Name (e.g., column marked "Client Host") that includes a name of a TCP client on the production network 102, a TCP server address (e.g., column marked "TCP Server") that includes an address of a TCP server on the production network 102, a host name (e.g., column marked "Server Host") that includes an address of a host on the production network 102, an application (e.g., column marked "Application") that identifies an application service that the host is accessing, and a connection start (e.g., column marked "Connection Start") that shows when the host started to access the application service.

FIG. 12E is a schematic diagram illustrating a user interface 1600, according to an example embodiment. The user interface 1600 may be generated and communicated to the monitor that is communicatively coupled to the controller computer 512. The user interface 1600 may be generated and communicated by the forensic module 804 in response to the forensic module 804 receiving a command. For example, a network administrator may communicate a "HOSTS TRACKER command" via the monitor to the controller computer 512 for processing by the forensic module 804. In response to receiving the command, the forensic module 804 may generate the user interface 1600 and communicate the user interface 1600 to the monitor. The user interface 1600 may be generated by the forensic module 804 based on the production network information 806 and the network monitoring fabric information 808. For example, the user interface 1600 may include user interface elements including a host name (e.g., column marked "Host Name") that includes the name of a host on the production network 102, an ingress name (e.g., column marked "Filter Interface") that includes the name of an ingress interface 508 on the network monitoring fabric 502, an ingress interface count (e.g., column marked "Filter Interface Count") that counts the number of ingress interfaces 508 on the network monitoring fabric 502 in association with the host name, an IP address (e.g., column marked "IP Address") associated with the host, a MAC address (e.g., column marked "MAC Address") associated with the host, a vendor name (e.g., column marked "Vendor") indicating the vendor that manufactured the hardware device, a VLAN identifier (e.g., column marked "VLAN IDs") indicating the subnet the host resides in, extra information (e.g., column marked "Extra Info") for additional information discovered about the host, a first seen (e.g., column marked "First Seen") indicating when the host first appeared in the production network 102, and a last seen (e.g., column marked "Last Seen") indicating when the host was last seen in the production network 102.

FIG. 12F is a schematic diagram illustrating a user interface 1700, according to an example embodiment. The user interface 1700 may be generated and communicated to the monitor that is communicatively coupled to the controller computer 512. The user interface 1700 may be generated and communicated by the forensic module 804 in response to the forensic module 804 receiving a command. For example, a network administrator may communicate a "DNS QUERIES command" via the monitor to the controller computer 512 for processing by the forensic module 804. In response to receiving the command, the forensic module 804 may generate the user interface 1700 and communicate the user interface 1700 to the monitor. The user interface 1700 may be generated by the forensic module 804 based on the production network information 806 and the network monitoring fabric information 808. For example, the user interface 1700 may include user interface elements including a client IP address (e.g., column marked "Client IP") that is an IP address of a host on the production network 102 making a DNS request to get an IP address of the target host name, client name (e.g., column marked "Client Name") that is the name of the client host (if known) on the production network 102, a target IP address (e.g., column marked "Target IP") that includes the name of the client host on the production network 102 or on any network connected to the production network 102, and a target name (e.g., column marked "Target Name") that includes the URL of the target on the production network 102.

FIG. 12G is a schematic diagram illustrating a user interface 1800, according to an example embodiment. The user interface 1800 may be generated and communicated to the monitor that is communicatively coupled to the controller computer 512. The user interface 1800 may be generated and communicated by the forensic module 804 in response to the forensic module 804 receiving a command. For example, a network administrator may communicate a "DNS TRACKER command" via the monitor to the controller computer 512 for processing by the forensic module 804. In response to receiving the command, the forensic module 804 may generate the user interface 1800 and communicate the user interface 1800 to the monitor. The user interface 1800 may be generated by the forensic module 804 based on the production network information 806 and the network monitoring fabric information 808. For example, the user interface 1800 may include user interface elements including a server address (e.g., column marked "Server Address") that includes the IP address of a server on the production network 102, a server name (e.g., column marked "Server Name") that includes the name of the server, and subnet identifiers (e.g., column marked "Subnets") that include identifiers for subnets on the production network 102.

Machine and Software Architecture

The modules, methods, engines, applications, and so forth described in conjunction with FIGS. 1-12G are implemented in some embodiments in the context of multiple machines and associated software architectures. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 13:
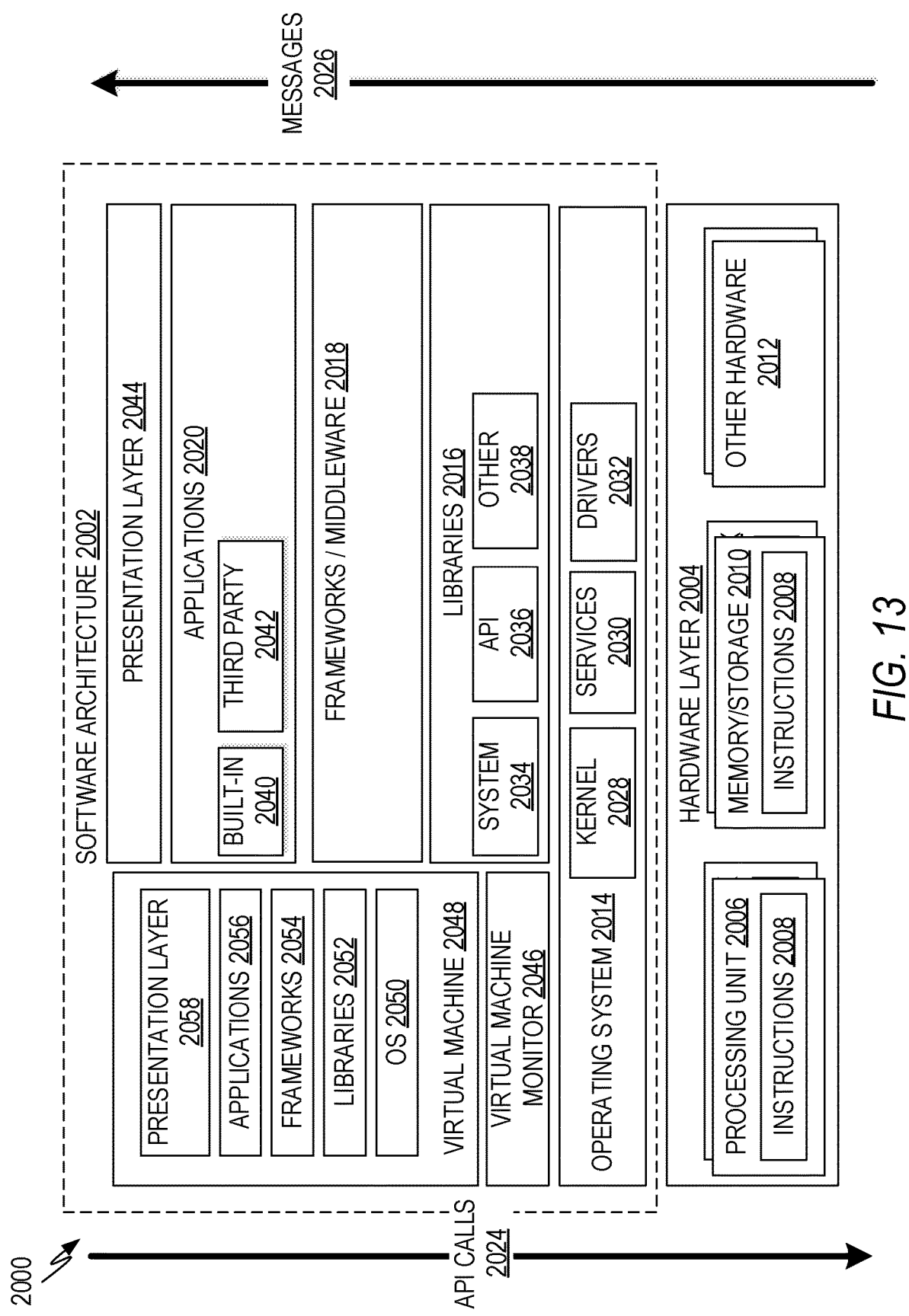
FIG. 13 is a block diagram illustrating a representative software architecture.

FIG. 13 is a block diagram 2000 illustrating a representative software architecture 2002, which may be used in conjunction with various hardware architectures herein described. FIG. 13 is merely a non-limiting example of a software architecture 2002, and it will be appreciated that many other architectures may be implemented to facilitate the functionality described herein. The software architecture 2002 may be executing on hardware such as a machine 2100 of FIG. 14 that includes, among other things, processors 2110, memory/storage 2130, and I/O components 2150. Returning to FIG. 13, a representative hardware layer 2004 is illustrated and can represent, for example, the machine 2100 of FIG. 14. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1-12G. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 13, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke application programming interface (API) calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), augmentative and alternative communication (AAMC), adaptive multi-rate audio codec (AMR), joint photography experts group (JPG), or portable network graphics (PNG)), graphics libraries (e.g., an Open Graphics Library (OpenGL) framework that may be used to render two dimensional (2D) and three dimensional (3D) graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. Third party applications 2042 may include any of the built-in applications as well as a broad assortment of other applications 2020. In a specific example, the third party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/ middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 13, this is illustrated by a virtual machine 2048 (e.g., virtual machine 4008). The virtual machine 2048 creates a software environment where applications/modules can execute as if they were executing on a hardware machine (such as the machine 2100 of FIG. 14, for example). The virtual machine 2048 is hosted by a host operating system (e.g., operating system 2014 in FIG. 13) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Machine Architecture and Machine-Readable Medium

Figure 14:
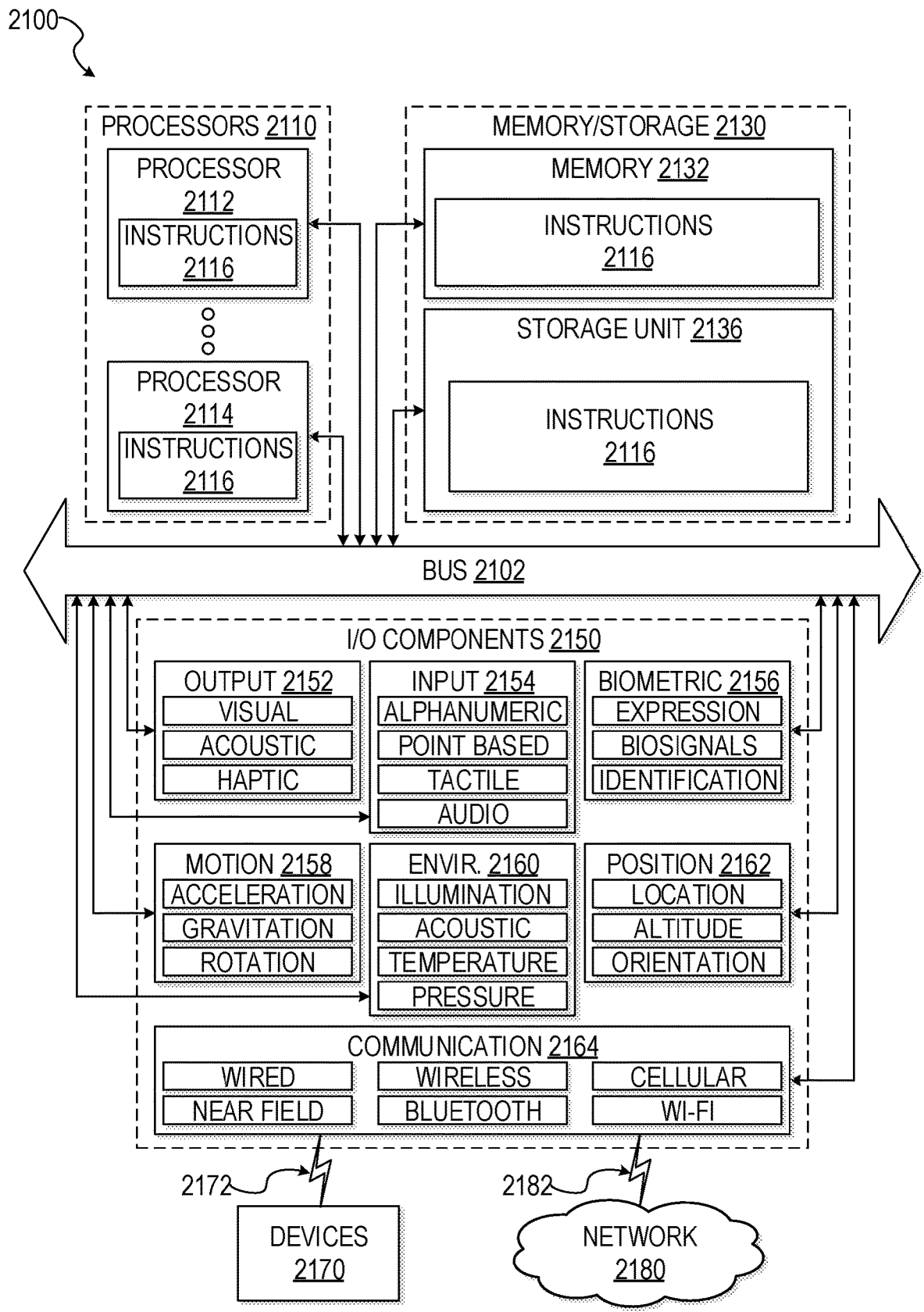
FIG. 14 is a block diagram illustrating components of a machine, according to some example embodiments.

FIG. 14 is a block diagram illustrating components of a machine 2100, according to some example embodiments, able to read instructions from a machine-readable medium (e.g., a machine-readable storage medium) and perform any one or more of the methodologies discussed herein. Specifically, FIG. 14 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may cause the machine 2100 to execute the flow diagrams of FIGS. 9A-9G and FIGS. 11A-11D. Additionally, or alternatively, the instructions 2116 may implement the virtual tool 4010 of FIG. 5D, the tool 106 of FIG. 5B; the receiving module 702, the processing module 704, and the switching mesh 708 of FIG. 7; the communication module 800, the process module 802, and the forensic module 804 of FIG. 8; and so forth, including the modules, engines, and applications in FIG. 5A and FIG. 5B and FIG. 5D-5G and FIG. 6 and FIG. 7 and FIG. 8A and FIG. 8E. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 14 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, "machine-readable medium" means a device able to store the instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 14. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via IP geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peerto-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor and memory having instructions that, when executed, cause the at least one processor to perform operations comprising:
   uploading first virtual tool information, over a network, to a monitoring fabric, the uploading the first virtual tool information including uploading and storing the first virtual tool information in a database, the monitoring fabric including a first plurality of switches including a second plurality of switches, the first virtual tool information including a first virtual tool;
   configuring, by a controller computer, the monitoring fabric to receive a first portion of traffic information from a production network, the configuring the monitoring fabric including configuring a first server machine and the second plurality of switches to receive the first portion of the traffic information from the production network, the configuring the first server machine including configuring a first instance of the first virtual tool on the first server machine to enable the first instance of the first virtual tool to receive the first portion of the traffic information, the configuring the second plurality of switches further including enabling the second plurality of switches to communicate the first portion of traffic information, over the monitoring fabric, to the first virtual tool;
   receiving a duplicate of the first portion of the traffic information from the production network as first traffic information, the first traffic information being received at a first ingress interface providing access to the monitoring fabric; and
   forwarding, by the plurality of second switches, the first traffic information in the monitoring fabric, the forwarding including forwarding the first traffic information to the first instance of the first virtual tool.

2. The system of claim 1, wherein the configuring the first server machine further comprises:
   downloading, from the controller computer, a first virtual machine over the monitoring fabric to the first server machine, the downloading the first virtual machine being from the controller computer to the first server machine;
   downloading, from the controller computer, the first instance of the first virtual tool information over the monitoring fabric to the first virtual machine, the downloading the first instance of the first virtual tool information being from the controller computer to the first virtual machine, the first instance of the first virtual tool information including a first instance of a first virtual tool module and a first instance of a first version of first virtual tool configuration information;
   communicating a first server message to the first server machine, the first server message causing the first server machine to establish a first connection between a network interface card included in the first server machine and a virtual network interface card included in the first virtual machine, the first connection enabling the first server machine to receive and communicate the first traffic information to the first instance of the first virtual tool; and
   communicating a second server message to the first instance of the first virtual tool, the second server message including access credential information for the first instance of the first virtual tool, the access credential information including a username and a password.

3. The system of claim 2, wherein the first instance of first virtual tool information includes a first instance of a first version of virtual tool configuration information; and
   wherein the operations further comprise:
   downloading a second version of the first instance of the first virtual tool configuration information to the first virtual machine, the downloading the second version of the first instance of the first virtual tool configuration information being from the controller computer to the first virtual machine, the second version of the first instance of the first virtual tool configuration information including virus detection information.

4. The system of claim 3, wherein the first instance of first virtual tool information includes a first instance of a first version of virtual tool metadata information, wherein the first instance of the first version of the virtual tool metadata information includes a payment method, wherein the payment method is selected from a group including a subscription and a quantity of traffic information.

5. The system of claim 1, wherein the first traffic information is being forwarded, over a first fabric link included in a link aggregation group, to the first instance of the first virtual tool and wherein the first plurality of switches further includes a third plurality of switches, wherein the operations further comprise:
 identifying the first traffic information is being received from the production network at a rate that exceeds a predetermined threshold; and
 configuring the third plurality of switches to forward the first traffic information, over a second fabric link included in the link aggregation group, to a second instance of the first virtual tool.

6. The system of claim 1, wherein the first plurality of switches includes a fourth plurality of switches; and
 wherein the operations are further comprising:
 configuring the monitoring fabric to receive fourth traffic information from a packet recorder machine included in the monitoring fabric, the configuring the monitoring fabric including configuring, by the controller computer, the fourth plurality of switches and a third server machine to facilitate a first instance of a second virtual tool to receive the fourth traffic information, the third server machine, including the second virtual tool, being included in the monitoring fabric.

7. The system of claim 1, wherein the first virtual tool includes an image, wherein the image is selected from a group of images including a virtual machine image and a container image.

8. The system of claim 1, wherein the operations further comprise:
 uploading a second virtual tool to the monitoring fabric, the uploading the second virtual tool including uploading second virtual tool information and storing the second virtual tool information in a database, wherein the storing the second virtual tool information in a database includes storing the second virtual tool information in a virtual tool store.

9. The system of claim 1, wherein the first server machine includes at least one component, wherein the at least one component is selected from a group of components including a central processing unit (CPU), a graphics processing unit (GPU), a field-programmable gate array (FPGA) and an application specific integrated circuit (ASIC), wherein the first server machine utilizes the at least one component to machine learn.

10. A method comprising:
 uploading first virtual tool information, over a network, to a monitoring fabric, the uploading the first virtual tool information including uploading and storing the first virtual tool information in a database, the monitoring fabric including a first plurality of switches including a second plurality of switches, the first virtual tool information including a first virtual tool, the uploading being performed by at least one processor;
 configuring, by a controller computer, the monitoring fabric to receive a first portion of traffic information from a production network, the configuring the monitoring fabric including configuring a first server machine and the second plurality of switches to receive the first portion of the traffic information from the production network, the configuring the first server machine including configuring a first instance of the first virtual tool on the first server machine to enable the first instance of the first virtual tool to receive the first portion of the traffic information, the configuring the second plurality of switches further including enabling the second plurality of switches to communicate the first portion of traffic information, over the monitoring fabric, to the first virtual tool, the configuring being performed by at least one processor;
 receiving a duplicate of the first portion of the traffic information from the production network as first traffic information, the first traffic information being received at a first ingress interface providing access to the monitoring fabric; and
 forwarding, by the plurality of second switches, the first traffic information in the monitoring fabric, the forwarding including forwarding the first traffic information to the first instance of the first virtual tool.

11. The method of claim 10, wherein the configuring the first server machine further comprises:
 downloading, from the controller computer, a first virtual machine over the monitoring fabric to the first server machine, the downloading the first virtual machine being from the controller computer to the first server machine;
 downloading, from the controller computer, the first instance of the first virtual tool information over the monitoring fabric to the first virtual machine, the downloading the first instance of the first virtual tool information being from the controller computer to the first virtual machine, the first instance of the first virtual tool information including a first instance of a first virtual tool module and a first instance of a first version of first virtual tool configuration information;
 communicating a first server message to the first server machine, the first server message causing the first server machine to establish a first connection between a network interface card included in the first server machine and a virtual network interface card included in the first virtual machine, the first connection enabling the first server machine to receive and communicate the first traffic information to the first instance of the first virtual tool; and
 communicating a second server message to the first instance of the first virtual tool, the second server message including access credential information for the first instance of the first virtual tool, the access credential information including a username and a password.

12. The method of claim 11, wherein the first instance of first virtual tool information includes a first instance of a first version of virtual tool configuration information; and
 wherein the operations further comprise:
 downloading a second version of the first instance of the first virtual tool configuration information to the first virtual machine, the downloading the second version of the first instance of the first virtual tool configuration information being from the controller computer to the first virtual machine, the second version of the first instance of the first virtual tool configuration information including virus detection information.

13. The method of claim 12, wherein the first instance of first virtual tool information includes a first instance of a first version of virtual tool metadata information, wherein the first instance of the first version of the virtual tool metadata information includes a payment method, wherein the payment method is selected from a group including a subscription and a quantity of traffic information.

14. The method of claim 10, wherein the first traffic information is being forwarded, over a first fabric link included in a link aggregation group, to the first instance of the first virtual tool and wherein the first plurality of switches further includes a third plurality of switches, wherein the operations further comprise:
 identifying the first traffic information is being received from the production network at a rate that exceeds a predetermined threshold; and
 configuring the third plurality of switches to forward the first traffic information, over a second fabric link included in the link aggregation group, to a second instance of the first virtual tool.

15. The method of claim 10, wherein the first plurality of switches includes a fourth plurality of switches; and
 wherein the operations further comprise:
 configuring the monitoring fabric to receive fourth traffic information from a packet recorder machine included in the monitoring fabric, the configuring the monitoring fabric including configuring, by the controller computer, the fourth plurality of switches and a third server machine to facilitate a first instance of a second virtual tool to receive the fourth traffic information, the third server machine, including the second virtual tool, being included in the monitoring fabric.

16. The method of claim 10, wherein the first traffic information includes at least one of web traffic, database traffic, and link level traffic; and
 wherein the operations further comprise:
 filtering the first traffic information to generate a first traffic stream;
 communicating the first traffic stream to a special service computer;
 identifying, at the special service computer, a duplication of the first traffic stream; and
 removing the duplication of the first traffic stream.

17. The method of claim 10, wherein the operations are further comprising:
 receiving first virtual tool interface information, over the monitoring fabric, at the controller computer; and
 displaying a first virtual tool interface on a monitor, the first virtual tool interface including first virtual tool interface information, wherein the receiving the first virtual tool interface information includes receiving the first virtual tool interface information from the first instance of the first virtual tool.

18. The method of claim 10, wherein the operations are further comprising:
 receiving first virtual tool interface information, over the monitoring fabric, at the controller computer; and
 displaying a first virtual tool interface on a monitor, the first virtual tool interface including the first virtual tool interface information, wherein the receiving the first virtual tool information includes receiving the first virtual tool interface information from a server machine performing analytic operations.

19. A non-transitory machine-readable medium and storing a set of instructions that, when executed by a processor, causes a machine to perform operations comprising:
 uploading first virtual tool information, over a network, to a monitoring fabric, the uploading the first virtual tool information including uploading and storing the first virtual tool information in a database, the monitoring fabric including a first plurality of switches including a second plurality of switches, the first virtual tool information including a first virtual tool;
 configuring, by a controller computer, the monitoring fabric to receive a first portion of traffic information from a production network, the configuring the monitoring fabric including configuring a first server machine and the second plurality of switches to receive the first portion of the traffic information from the production network, the configuring the first server machine including configuring a first instance of the first virtual tool on the first server machine to enable the first instance of the first virtual tool to receive the first portion of the traffic information, the configuring the second plurality of switches further including enabling the second plurality of switches to communicate the first portion of traffic information, over the monitoring fabric, to the first virtual tool;
 receiving a duplicate of the first portion of the traffic information from the production network as first traffic information, the first traffic information being received at a first ingress interface providing access to the monitoring fabric; and
 forwarding, by the plurality of second switches, the first traffic information in the monitoring fabric, the forwarding including forwarding the first traffic information to the first instance of the first virtual tool.

20. The non-transitory machine-readable medium of claim 19, wherein the configuring the first server machine further comprises:
 downloading, from the controller computer, a first virtual machine over the monitoring fabric to the first server machine, the downloading the first virtual machine being from the controller computer to the first server machine;
 downloading, from the controller computer, the first instance of the first virtual tool information over the monitoring fabric to the first virtual machine, the downloading the first instance of the first virtual tool information being from the controller computer to the first virtual machine, the first instance of the first virtual tool information including a first instance of a first virtual tool module and a first instance of a first version of first virtual tool configuration information;
 communicating a first server message to the first server machine, the first server message causing the first server machine to establish a first connection between a network interface card included in the first server machine and a virtual network interface card included in the first virtual machine, the first connection enabling the first server machine to receive and communicate the first traffic information to the first instance of the first virtual tool; and
 communicating a second server message to the first instance of the first virtual tool, the second server message including access credential information for the first instance of the first virtual tool, the access credential information including a username and a password.

* * * * *